US012675121B2

(12) United States Patent     (10) Patent No.:   US 12,675,121 B2

Fujii     (45) Date of Patent:     Jul. 7, 2026

(54) TRAVEL CONTROL SYSTEM FOR AGRICULTURAL MACHINE CAPABLE OF PERFORMING REMOTELY-MANIPULATED TRAVELING

(71) Applicant: Kubota Corporation, Osaka (JP)

(72) Inventor: Takafumi Fujii, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 137 days.

(21) Appl. No.: 18/753,105

(22) Filed: Jun. 25, 2024

(65) Prior Publication Data

US 2024/0345603 A1     Oct. 17, 2024

Related U.S. Application Data

(63) Continuation of application No. PCT/JP2022/044334, filed on Dec. 1, 2022.

(30) Foreign Application Priority Data

Dec. 28, 2021    (JP) ................................. 2021-213619
Dec. 28, 2021    (JP) ................................. 2021-213620

(51) Int. Cl.
    *G05D 1/82*       (2024.01)
    *A01B 69/04*      (2006.01)
             (Continued)

(52) U.S. Cl.
    CPC ............. *G05D 1/82* (2024.01); *A01B 69/008* (2013.01); *G05D 1/225* (2024.01); *G06Q 50/02* (2013.01);
             (Continued)

(58) Field of Classification Search
None
See application file for complete search history.

(56) References Cited

U.S. PATENT DOCUMENTS

| | | | |
|---|---|---|---|
| 4,421,177 A | 12/1983 | Schlapman et al. | |
| 2015/0112537 A1* | 4/2015 | Kawamata | ........... G05D 1/0274 |
| | | | 701/23 |

(Continued)

FOREIGN PATENT DOCUMENTS

| | | |
|---|---|---|
| JP | H09160642 A | 6/1997 |
| JP | 2016082948 A | 5/2016 |

(Continued)

OTHER PUBLICATIONS

Official Communication issued in International Patent Application No. PCT/JP2022/044334, mailed on Jan. 17, 2023, 4 pages.

*Primary Examiner* — Tamara L Weber

(74) *Attorney, Agent, or Firm* — Keating & Bennett, LLP

(57)          ABSTRACT

A travel control system for an agricultural machine capable of performing remotely-manipulated traveling including a storage to store a position of a permitted area in which the remotely-manipulated traveling is permitted conditionally, and a controller operable in a remote manipulation mode in which travel of the agricultural machine is controlled by remote manipulation. In the remote manipulation mode, when a state of the agricultural machine does not satisfy a condition required for the remotely-manipulated traveling in the permitted area, the controller is configured or programmed to disable a remote manipulation to cause the agricultural machine to travel in the permitted area.

19 Claims, 26 Drawing Sheets

(51) Int. Cl.
  G05D 1/225 (2024.01)
  G06Q 50/02 (2012.01)
  G05D 105/15 (2024.01)
  G05D 107/20 (2024.01)

(52) U.S. Cl.
  CPC ..... *G05D 2105/15* (2024.01); *G05D 2107/21*
    (2024.01)

(56) References Cited

U.S. PATENT DOCUMENTS

| | | | |
|---|---|---|---|
| 2017/0248946 A1 | 8/2017 | Ogura et al. | |
| 2019/0104674 A1* | 4/2019 | Sawaki | A01B 79/005 |
| 2021/0127550 A1 | 5/2021 | Ohrstrom et al. | |
| 2021/0165414 A1* | 6/2021 | Aizawa | E02F 3/437 |
| 2021/0362718 A1 | 11/2021 | Ikenori | |
| 2022/0412047 A1 | 12/2022 | Hama et al. | |
| 2023/0045958 A1 | 2/2023 | Arimune | |
| 2023/0363302 A1* | 11/2023 | Kaufmann | B60W 30/10 |

FOREIGN PATENT DOCUMENTS

| | | |
|---|---|---|
| JP | 2017-200125 A | 11/2017 |
| JP | 2019202614 A | 11/2019 |
| JP | 2020103144 A | 7/2020 |
| JP | 2021-029218 A | 3/2021 |
| JP | 2021-073602 A | 5/2021 |
| JP | 2021-088835 A | 6/2021 |
| WO | 2016/017367 A1 | 2/2016 |
| WO | 2021161678 A1 | 8/2021 |

* cited by examiner

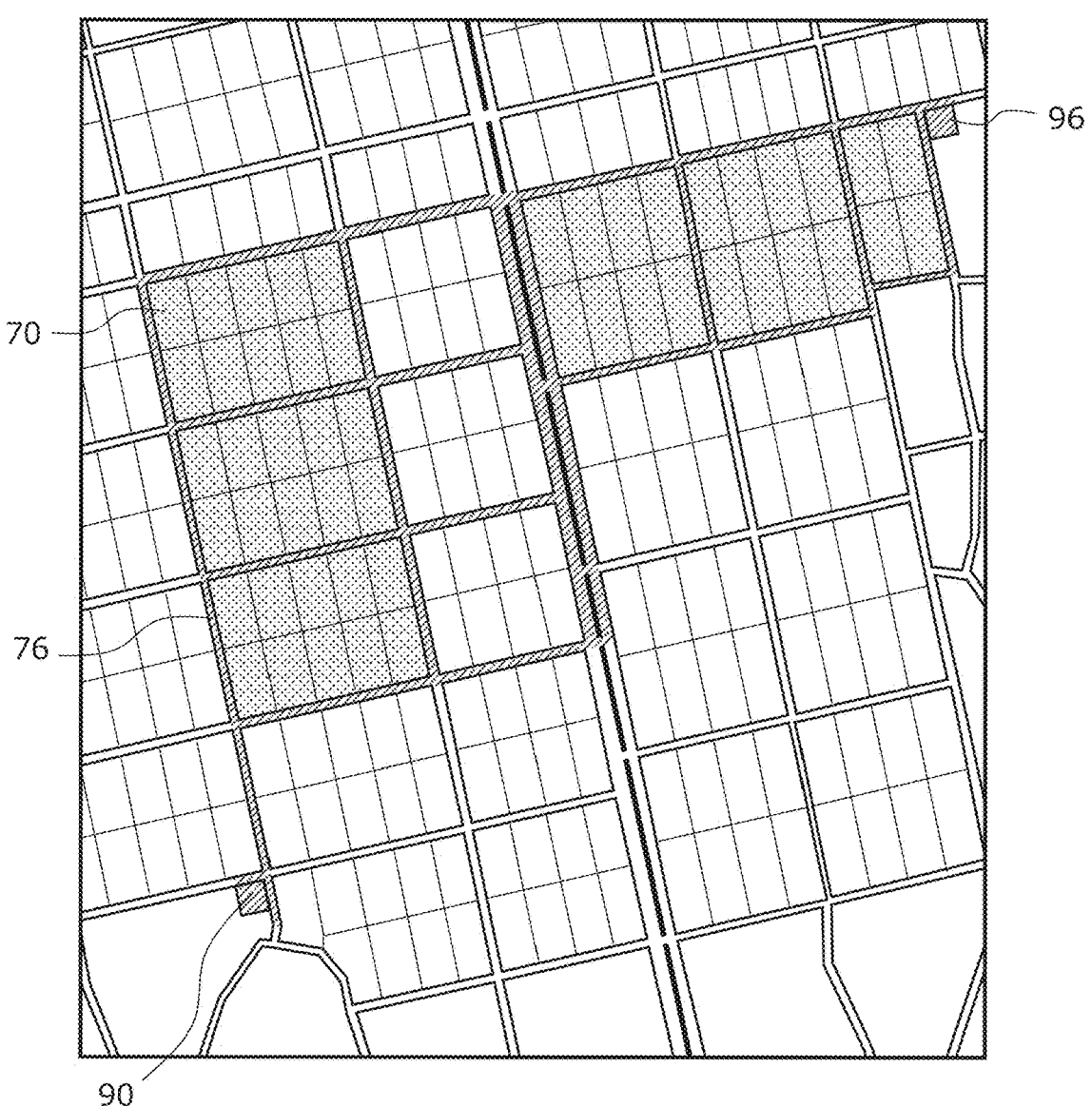

*FIG. 12*

| AREA | PERMISSION CONDITIONS |
|---|---|
| FIRST PERMITTED AREA (FIELD) | (a1) AN IMPLEMENT SUITABLE FOR SCHEDULED AGRICULTURAL WORK IS ATTACHED<br>(a2) THE CURRENT TIME IS IN A SCHEDULED PERIOD OF TIME OF WORK |
| SECOND PERMITTED AREA (ROAD) | (b1) THE HEIGHT OF AN IMPLEMENT IS GREATER THAN OR EQUAL TO A REFERENCE HEIGHT<br>(b2) THE SUPPLY OF POWER TO AN IMPLEMENT IS OFF<br>(b3) THE LEFT AND RIGHT BRAKES ARE LINKED TOGETHER |

*FIG. 13*

| AGRICULTURAL MACHINE | DATE/TIME | FIELD | TASK | IMPLEMENT |
|---|---|---|---|---|
| WORK VEHICLE A | JUNE 21, 2021, 8:00 ~ 11:00 | FIELD A | SPRAYING AGRICULTURAL CHEMICALS | IMPLEMENT A |
| WORK VEHICLE A | JUNE 21, 2021, 12:00 ~ 14:00 | FIELD B | SPRAYING AGRICULTURAL CHEMICALS | IMPLEMENT A |
| WORK VEHICLE A | JUNE 21, 2021, 15:00 ~ 18:00 | FIELD C | TILLING | IMPLEMENT B |
| WORK VEHICLE A | JUNE 22, 2021, 8:00 ~ 12:00 | FIELD D | TILLING | IMPLEMENT B |
| . . . | . . . | . . . | . . . | . . . |

*FIG. 23*

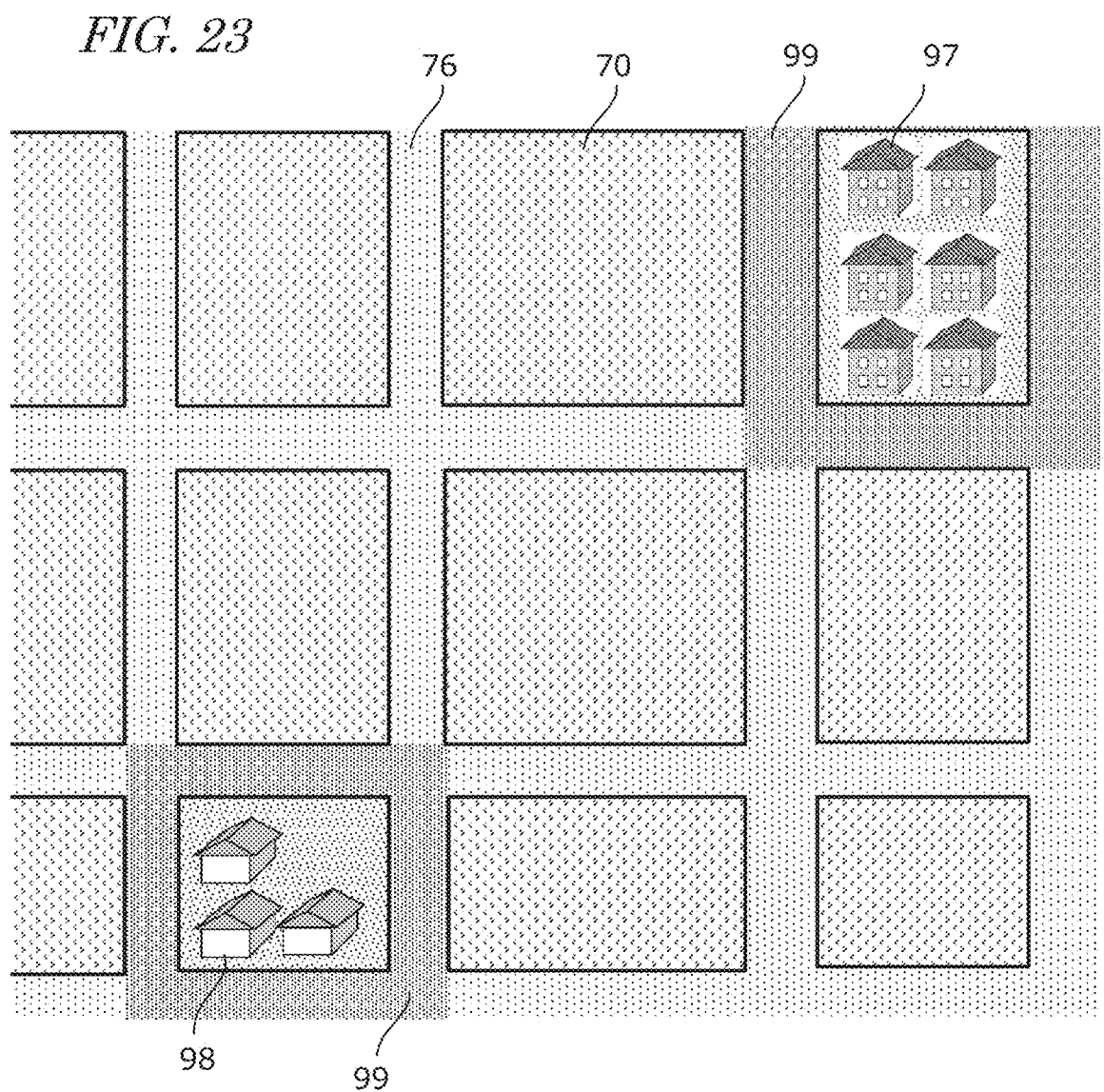

*FIG. 24*

| AREA | DETAILS OF LIMITATIONS |
|---|---|
| FIRST LIMITED AREA (FIELD) | • SPEED IS LIMITED TO VALUE LOWER THAN OR EQUAL TO THAT SUITABLE FOR SCHEDULED AGRICULTURAL WORK<br>• LOWERING OF AN IMPLEMENT BEYOND A HEIGHT OR DEPTH SUITABLE FOR SCHEDULED AGRICULTURAL WORK IS LIMITED |
| SECOND LIMITED AREA (ROAD) | • TRAVELING SPEED IS LIMITED TO SPEED LIMIT OR LOWER<br>• LOWERING OF AN IMPLEMENT IS LIMITED |
| THIRD LIMITED AREA (AROUND HOUSES AND LIVESTOCK BARNS) | IN ADDITION TO THE ABOVE LIMITATIONS<br>• THE NUMBER OF REVOLUTIONS OF AN ENGINE IS LIMITED |

*FIG. 27*

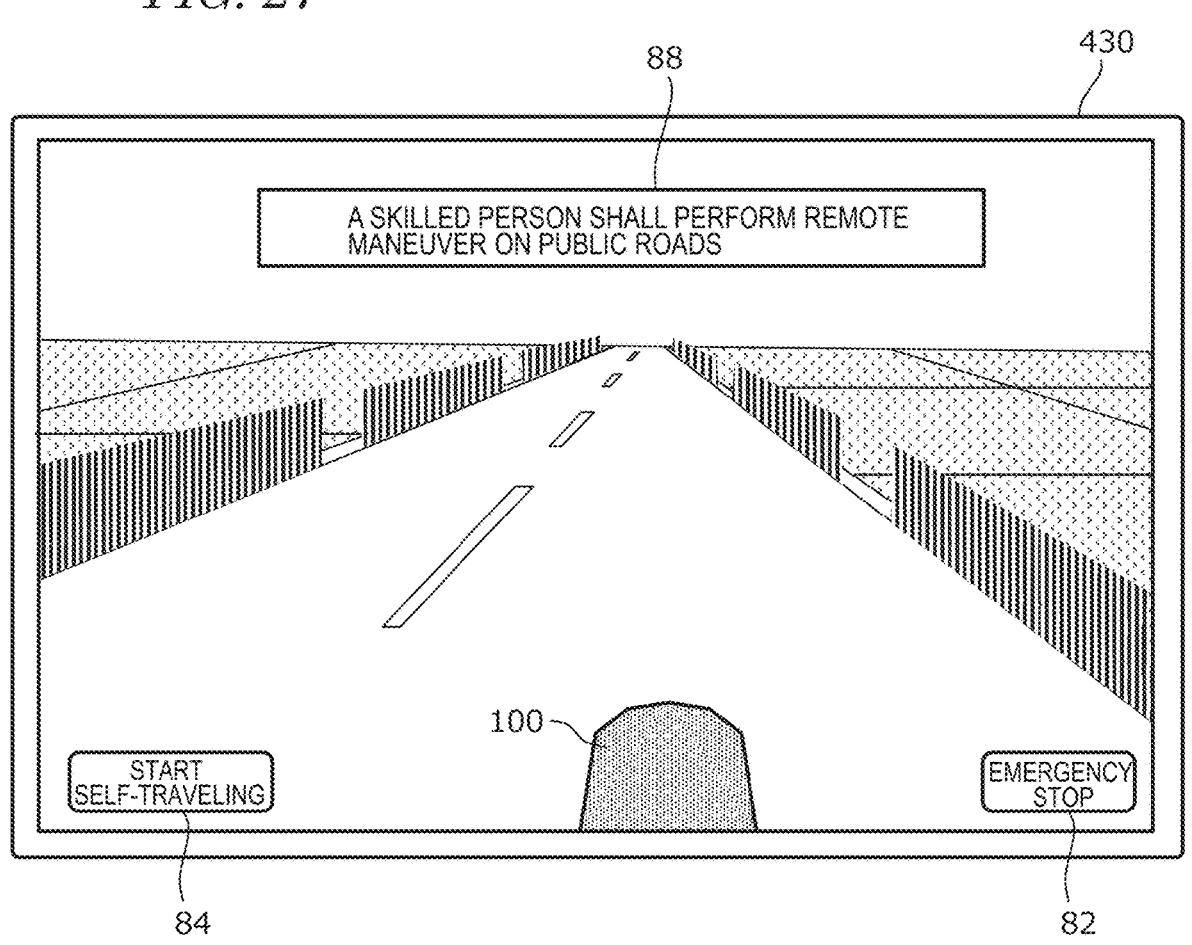

| AREAS | RECOMMENDED TYPE OF OPERATOR |
|---|---|
| FIELDS (ENTRANCES/EXITS) | PERSON WITH ADVANCED SKILLS |
| FIELDS (OTHER THAN ENTRANCES/EXITS) | PERSON WITH AT LEAST ENTRY-LEVEL SKILLS |
| PUBLIC ROADS (MUCH TRAFFIC) | PERSON WITH ADVANCED SKILLS |
| AGRICULTURAL ROADS | PERSON WITH AT LEAST INTERMEDIATE-LEVEL SKILLS |
| USER'S PRIVATE LANDS | PERSON WITH AT LEAST ENTRY-LEVEL SKILLS |
| GARAGES | PERSON WITH ADVANCED SKILLS |

*FIG. 28*

TRAVEL CONTROL SYSTEM FOR AGRICULTURAL MACHINE CAPABLE OF PERFORMING REMOTELY-MANIPULATED TRAVELING

CROSS REFERENCE TO RELATED APPLICATIONS

This application claims the benefit of priority to Japanese Patent Application Nos. 2021-213619 and 2021-213620 filed on Dec. 28, 2021 and is a Continuation Application of PCT Application No. PCT/JP2022/044334 filed on Dec. 1, 2022. The entire contents of each application are hereby incorporated herein by reference.

BACKGROUND OF THE INVENTION

1. Field of the Invention

The present disclosure relates to travel control systems for agricultural machines capable of performing remotely-manipulated traveling.

2. Description of the Related Art

Research and development has been directed to the automation of agricultural machines to be used in agricultural fields. For example, work vehicles, such as tractors, combines, and rice transplanters, which automatically travel within fields by utilizing a positioning system, e.g., a GNSS (Global Navigation Satellite System), are coming into practical use. Research and development is also under way for work vehicles which automatically travel not only within fields, but also outside the fields. Technologies for remotely manipulating agricultural machines are also being developed.

Japanese Laid-Open Patent Publication No. 2021-073602 and Japanese Laid-Open Patent Publication No. 2021-029218 each disclose an example of system to cause an unmanned work vehicle to automatically travel between two fields separated from each other with a road being sandwiched therebetween. International Publication WO2016/017367 discloses an example of a device that remotely manipulates a work vehicle that travels autonomously.

SUMMARY OF THE INVENTION

Example embodiments of the present invention provide systems for inhibiting agricultural machines from traveling in unintended areas or states during remote manipulation.

A travel control system according to an example embodiment of the present disclosure is for an agricultural machine capable of performing self-traveling and remotely-manipulated traveling. The travel control system includes a storage to store the position of a permitted area in which the remotely-manipulated traveling is permitted conditionally, and a controller operable in a remote manipulation mode in which travel of the agricultural machine is controlled by remote manipulation. In the remote manipulation mode, when a state of the agricultural machine does not satisfy a condition under which the remotely-manipulated traveling is permitted in the permitted area, the controller is configured or programmed to disable a remote manipulation to cause the agricultural machine to travel in the permitted area.

A travel control system according to another example embodiment of the present disclosure is for an agricultural machine capable of performing remotely-manipulated traveling. The agricultural machine is a work vehicle having an implement attached thereto. The travel control system includes a storage to store the position of a permitted area in which the remotely-manipulated traveling is permitted conditionally, and a controller operable in a remote manipulation mode in which travel of the agricultural machine is controlled by remote manipulation. When a type or state of the implement does not satisfy a condition under which the remotely-manipulated traveling is permitted in the permitted area, the controller is configured or programmed to disable a remote manipulation to cause the agricultural machine to travel in the permitted area.

An agricultural machine according to still another example embodiment of the present disclosure includes the travel control system according to an example embodiment described above, and a travel device to be controlled by the controller.

General or specific aspects of the present disclosure may be implemented using a device, a system, a method, an integrated circuit, a computer program, a non-transitory computer-readable storage medium, or any combination thereof. The computer-readable storage medium may be inclusive of a volatile storage medium, or a non-volatile storage medium. The device may include a plurality of devices. In the case where the device includes two or more devices, the two or more devices may be disposed within a single apparatus, or divided over two or more separate apparatuses.

According to example embodiments of the present disclosure, agricultural machines can be inhibited from traveling in unintended areas or states during remote manipulation.

The above and other elements, features, steps, characteristics and advantages of the present invention will become more apparent from the following detailed description of the example embodiments with reference to the attached drawings.

BRIEF DESCRIPTION OF THE DRAWINGS

FIG. 3 is a block diagram showing an example configuration of the work vehicle and the implement.

FIG. 11 is a diagram showing an example of setting of a permitted area in an environment in which a work vehicle travels.

FIG. 12 is a table showing an example of a permission condition for remotely-manipulated traveling in each of a first permitted area and a second permitted area.

FIG. 13 is a diagram showing an example of a schedule of agricultural work.

FIG. 23 is a table showing an example of setting of limited areas.

FIG. 24 is a table showing an example of details of operation limitations in each limited area.

FIG. 27 is a diagram showing an example of display indicating a recommended operator type.

FIG. 28 is a diagram showing an example of a table indicating a correspondence relationship between areas in which a work vehicle is located and recommended operator types for remote maneuver.

DETAILED DESCRIPTION OF THE EXAMPLE EMBODIMENTS

Figure 1:
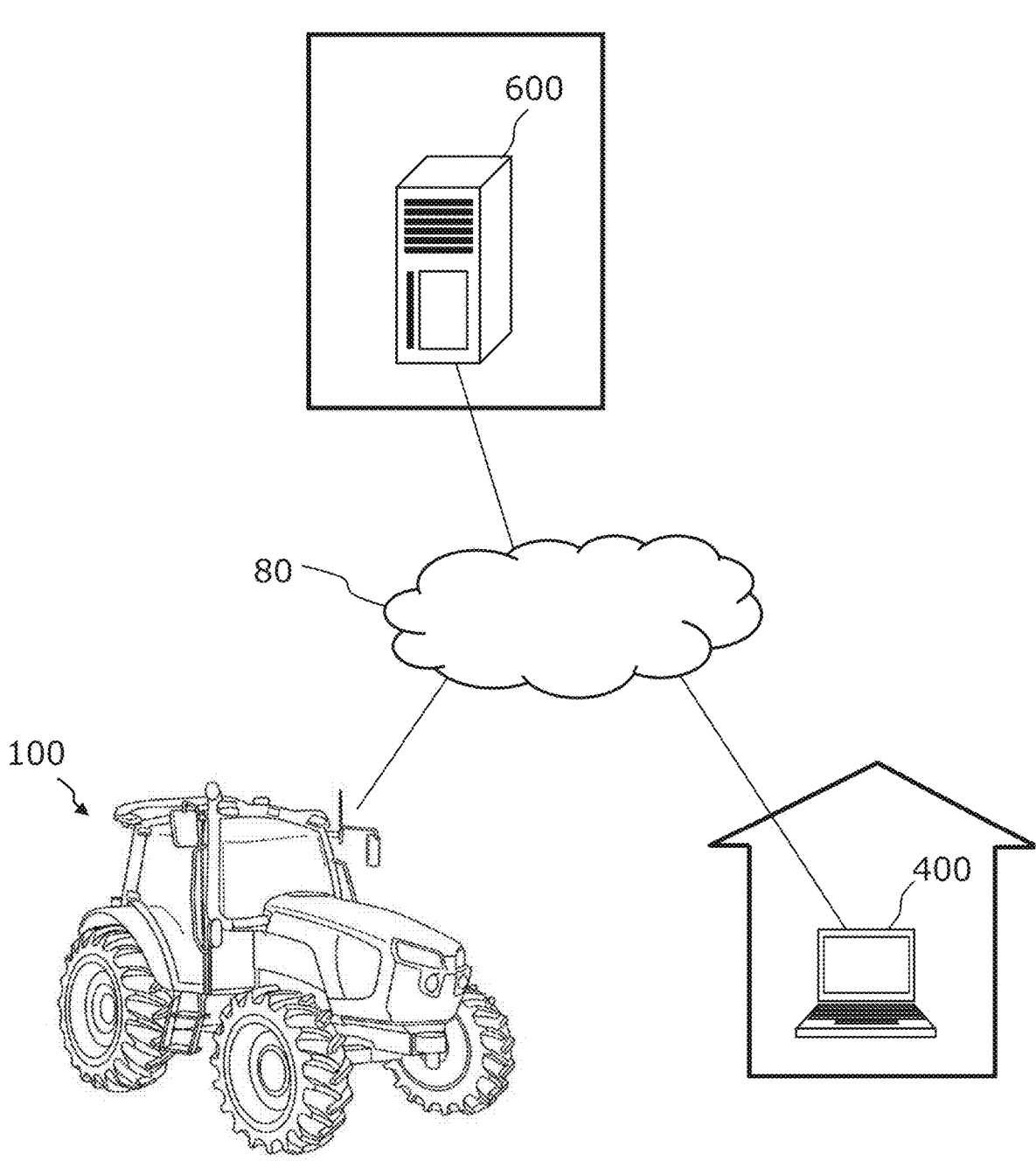
FIG. 1 is a diagram providing an overview of an agricultural management system according to an illustrative example of the present disclosure.

In the present disclosure, an "agricultural machine" refers to a machine for agricultural applications. Examples of agricultural machines include tractors, harvesters, rice transplanters, vehicles for crop management, vegetable transplanters, mowers, seeders, spreaders, and mobile robots for agriculture. Not only may a work vehicle (such as a tractor) function as an "agricultural machine" alone by itself, but also a combination of a work vehicle and an implement that is attached to, or towed by, the work vehicle may function as an "agricultural machine". For the ground surface within a field, the agricultural machine performs agricultural work such as tilling, seeding, preventive pest control, manure spreading, planting of crops, or harvesting. Such agricultural work or tasks may be referred to as "groundwork", or simply as "work" or "tasks". Travel of a vehicle-type agricultural machine performed while the agricultural machine also performs agricultural work may be referred to as "tasked travel".

"Self-driving" refers to controlling the movement of an agricultural machine by the action of a controller, rather than through manual operations of a driver. An agricultural machine that performs self-driving may be referred to as a "self-driving agricultural machine" or a "robotic agricultural machine". During self-driving, not only the movement of the agricultural machine, but also the operation of agricultural work (e.g., the operation of a work machine) may be controlled automatically. In the case where the agricultural machine is a vehicle-type machine, travel of the agricultural machine via self-driving will be referred to as "self-traveling". The controller may be configured or programmed to control at least one of steering that is required in the movement of the agricultural machine, adjustment of the moving speed, or beginning and ending a move. In the case of controlling a work vehicle having an implement attached thereto, the controller may be configured or programmed to control raising or lowering of the implement, beginning and ending of an operation of the implement, and so on. A move based on self-driving may include not only moving of an agricultural machine that goes along a predetermined path toward a destination, but also moving of an agricultural machine that follows a target of tracking. An agricultural machine that performs self-driving may also move partly based on the user's instructions. Moreover, an agricultural machine that performs self-driving may operate not only in a self-driving mode but also in a manual driving mode, where the agricultural machine moves through manual operations of the driver. When performed not manually but through the action of a controller, the steering of an agricultural machine will be referred to as "automatic steering". A portion of, or the entirety of, the controller may reside outside the agricultural machine. Control signals, commands, data, etc., may be communicated between the agricultural machine and a controller residing outside the agricultural machine. An agricultural machine that performs self-driving may move autonomously while sensing the surrounding environment, without any person being involved in the controlling of the movement of the agricultural machine. An agricultural machine that is capable of autonomous movement is able to travel in the field or outside the field (e.g., on roads) in an unmanned manner. During an autonomous move, operations of detecting and avoiding obstacles may be performed.

"Remote manipulation" (also referred to as "remote maneuver") refers to manipulation of an agricultural machine using a remote manipulation device. Remote manipulation may be performed by an operator (e.g., a system manager or a user of an agricultural machine) who is located away from an agricultural machine. "Remotely-manipulated traveling" means that an agricultural machine travels in response to a signal transmitted from a remote manipulation device. The remote manipulation device may be inclusive of devices having a signal transmission function such as personal computers (PCs), laptop computers, tablet computers, smartphones, or remote controls. The operator can give an agricultural machine a command to start, stop, accelerate, decelerate, change traveling direction, or the like by operating the remote manipulation device. The mode in which a controller controls travel of an agricultural machine in response to these commands is referred to as a "remote manipulation mode".

A "permitted area" refers to an area in which remotely-manipulated traveling of an agricultural machine is permitted. Permitted areas may include an area in which remotely-manipulated traveling of an agricultural machine is permitted conditionally. A permitted area in which remotely-manipulated traveling is permitted conditionally may be referred to as a "conditionally permitted area". Meanwhile, a permitted area in which remotely-manipulated traveling is permitted unconditionally may be referred to as an "unconditionally permitted area". All permitted areas may be a "conditionally permitted area" or only a portion of permitted areas may be a "conditionally permitted area". In some example embodiments, all permitted areas may be an "unconditionally permitted area". In the remote manipulation mode, when an agricultural machine is located in a conditionally permitted area, then if a permission condition related to the conditionally permitted area is not satisfied, the remote manipulation to cause the agricultural machine to travel in the permitted area is disabled. For example, if a state of the agricultural machine (e.g., a work vehicle) or a type or state of an implement attached to the work vehicle does not satisfy a condition under which remotely-manipulated traveling is permitted in the conditionally permitted area, the remote manipulation to cause the agricultural machine to travel in the permitted area may be disabled. For example, when an agricultural machine is caused by remote manipulation to enter from a permitted area in which remotely-manipulated traveling is permitted to a conditionally permitted area in which remotely-manipulated traveling is not permitted, the agricultural machine may be stopped, and the remote manipulation of instructing to travel further inside may be disabled. It should be noted that when an agricultural machine enters from a permitted area in which remotely-manipulated traveling is permitted to a conditionally permitted area in which a permission condition for remotely-manipulated traveling is not satisfied, the remote manipulation to cause the agricultural machine to move from the conditionally permitted area back to the previous permitted area (e.g., by reverse motion) may be permitted. Thus, the remote manipulation for moving an agricultural machine that has entered a conditionally permitted area in which remotely-manipulated traveling is not permitted, back to a permitted area in which remotely-manipulated traveling is permitted, is not considered to correspond to the "remote manipulation to cause an agricultural machine in a conditionally permitted area".

A "forbidden area" refers to an area in which remotely-manipulated traveling is forbidden. In the remote manipulation mode, when an agricultural machine is located in a forbidden area, the remote manipulation to cause the agricultural machine to travel in the forbidden area is disabled. For example, when an agricultural machine enters from a permitted area in which remotely-manipulated traveling is permitted into a forbidden area, the agricultural machine is stopped, and the remote manipulation of instructing to travel further inside may be disabled. It should be noted that when an agricultural machine enters from a permitted area in which remotely-manipulated traveling is permitted to a forbidden area, the remote manipulation to cause the agricultural machine to move from the forbidden area back to the previous permitted area (e.g., by reverse motion) may be permitted. Thus, the remote manipulation for moving an agricultural machine that has entered a forbidden area, back to a permitted area in which remotely-manipulated traveling is permitted, is not considered to correspond to the "remote manipulation to cause an agricultural machine in a forbidden area".

A "limited area" refers to an area in which remotely-manipulated traveling is allowed, and some limitation is imposed on operation of an agricultural machine during remotely-manipulated traveling. Limitations may, for example, include at least one of a limitation on traveling speed, a limitation on the number of revolutions of an engine, and a limitation on operation related to an implement.

A "work plan" is data defining a plan of one or more tasks of agricultural work to be performed by an agricultural machine. The work plan may include, for example, information representing the order of the tasks of agricultural work to be performed by an agricultural machine or the field where each of the tasks of agricultural work is to be performed. The work plan may include information representing the time and the date when each of the tasks of agricultural work is to be performed. In particular, the work plan including information representing the time and the date when each of the tasks of agricultural work is to be performed is referred to as a "work schedule" or simply as a "schedule". The work schedule may include information representing the time when each task of agricultural work is to be begun and/or ended on each of working days. The work plan or the work schedule may include information representing, for each task of agricultural work, the contents of the task, the implement to be used, and/or the types and amounts of agricultural supplies to be used. As used herein, "agricultural supplies" refers to goods used for agricultural work to be performed by an agricultural machine. The agricultural supplies may also be referred to simply as "supplies". The agricultural supplies may include goods consumed by agricultural work such as, for example, agricultural chemicals, fertilizers, seeds, or seedlings. The work plan may be created by a processor communicating with the agricultural machine to manage the agricultural machine or a processor mounted on the agricultural machine. The processor can be configured or programmed to create a work plan based on, for example, information input by the user (agricultural business executive, agricultural worker, etc.) manipulating a terminal device. In this specification, the processor communicating with the agricultural machine to manage the agricultural machine will be referred to as a "management device". The management device may manage agricultural work of a plurality agricultural machines. In this case, the management device may create a work plan including information on each task of agricultural work to be performed by each of the plurality of agricultural machines. The work plan may be downloaded to each of the agricultural machines and stored in a storage in each of the agricultural machines. In order to perform the scheduled agricultural work in accordance with the work plan, each agricultural machine can automatically move to a field and perform the agricultural work.

An "environment map" is data representing, with a predetermined coordinate system, the position or the region of an object existing in the environment where the agricultural machine moves. The environment map may be referred to simply as a "map" or "map data". The coordinate system defining the environment map is, for example, a world coordinate system such as a geographic coordinate system fixed to the globe. Regarding the object existing in the environment, the environment map may include information other than the position (e.g., attribute information or other types of information). The "environment map" encompasses various type of maps such as a point cloud map and a lattice map. Data on a local map or a partial map that is generated or processed in a process of constructing the environment map is also referred to as a "map" or "map data".

An "agricultural road" is a road used mainly for agriculture. An "agricultural road" is not limited to a road paved with asphalt, and encompasses unpaved roads covered with soil, gravel or the like. An "agricultural road" encompasses roads (including private roads) on which only vehicle-type agricultural machines (e.g., work vehicles such as tractors, etc.) are allowed to travel and roads on which general vehicles (automobiles, trucks, buses, etc.) are also allowed to travel. The work vehicles may automatically travel on a general road in addition to an agricultural road. The "general road" is a road maintained for traffic of general vehicles.

A "global path" is data on a path connecting a departure point to a target point of an automatic movement of the agricultural machine, and is generated by a processor performing path planning. Generation of such a global path is referred to as "global path planning". In the following description, the global path will be referred to also as a "target path" or simply as a "path". The global path may be defined by, for example, coordinate values of a plurality of points which the agricultural machine is to pass. Such a point that the agricultural machine is to pass is referred as a "waypoint", and a line segment connecting waypoints adjacent to each other is referred to as a "link".

A "local path" is a path by which the agricultural machine can avoid an obstacle, and is consecutively generated while the agricultural machine is automatically moving along the global path. Generation of such a local path is referred to as "local path planning". The local path is consecutively generated based on data acquired by one or more sensing devices included in the agricultural machine, during a movement of the agricultural machine. The local path may be defined by a plurality of waypoints along a portion of the global path. Note that in the case where there is an obstacle in the vicinity of the global path, the waypoints may be set so as to detour around the obstacle. The length of a link between the waypoints on the local path is shorter than the length of a link between the waypoints on the global path. The device generating the local path may be the same as, or different from, the device generating the global path. For example, the management device managing the agricultural work to be performed by the agricultural machine may generate the global path, whereas the controller mounted on the agricultural machine may generate the local path. In this case, a combination of the management device and the controller may be configured or programmed to function as a "processor" performing the path planning. The controller of the agricultural machine may be configured or programmed to function as a processor performing both of global path planning and local path planning.

Hereinafter, example embodiments of the present disclosure will be described. Note, however, that unnecessarily detailed descriptions may be omitted. For example, detailed descriptions on what is well known in the art or redundant descriptions on what is substantially the same configuration may be omitted. This is to avoid lengthy description, and facilitate the understanding of those skilled in the art. The accompanying drawings and the following description, which are provided by the present inventors so that those skilled in the art can sufficiently understand the present disclosure, are not intended to limit the scope of the claims. In the following description, elements having identical or similar functions are denoted by identical reference numerals.

The following example embodiments are only exemplary, and the techniques according to the present disclosure are not limited to the following example embodiments. For example, numerical values, shapes, materials, steps, orders of steps, layout of a display screen, etc., which are indicated in the following example embodiments are only exemplary, and admit of various modifications so long as it makes technological sense. Any one implementation may be combined with another so long as it makes technological sense to do so.

Example embodiments in which the techniques according to the present disclosure are applied to a work vehicle such as a tractor, which is an example of an agricultural machine, will be mainly described below. The techniques and example embodiments according to the present disclosure are applicable to not only tractors but also other agricultural machines that can perform remotely-manipulated traveling (e.g., rice transplanters, combines, harvesters, vehicles for crop management, vegetable transplanters, mowers, seeders, spreaders, and mobile robots for agriculture). As an example, an example embodiment in which a work vehicle is provided with a travel control system for implementing a self-traveling function and a remote manipulation function will be described below. At least a portion of the functions of the travel control system may be implemented in other devices that communicate with the work vehicle (e.g., a terminal device for remote manipulation, or a server).

FIG. 1 is a diagram providing an overview of an agriculture management system according to an illustrative example embodiment of the present disclosure. The agriculture management system shown in FIG. 1 includes a work vehicle 100, a terminal device 400, and a management device 600. The terminal device 400 is a computer used by a user performing remote monitoring of the work vehicle 100. The management device 600 is a computer managed by a business operator running the agriculture management system. The work vehicle 100, the terminal device 400 and the management device 600 can communicate with each other via the network 80. FIG. 1 shows one work vehicle 100, but the agriculture management system may include a plurality of the work vehicles or any other agricultural machine.

In the present example embodiment, the work vehicle 100 is a tractor. The work vehicle 100 can have an implement attached to its rear and/or its front. While performing agricultural work according to the particular type of implement, the work vehicle 100 is able to automatically travel inside a field. The work vehicle 100 may travel inside the field or outside the field with no implement being attached thereto.

In the present example embodiment, the work vehicle 100 has a self-driving function. In other words, the work vehicle 100 can travel by the action of a controller, rather than manually. The controller according to the present example embodiment is provided inside the work vehicle 100, and is able to control both the speed and steering of the work vehicle 100. The work vehicle 100 can perform self-traveling outside the field (e.g., roads) as well as inside the field.

The mode in which the controller causes the work vehicle 100 to perform self-traveling is referred to as a "self-traveling mode".

The work vehicle 100 further has a remotely-manipulated traveling function. The controller is configured or programmed to control a travel device of the work vehicle 100 in response to remote manipulations performed by the user using the terminal device 400, to change the traveling speed and traveling direction of the work vehicle 100. The work vehicle 100 can perform remotely-manipulated traveling outside fields as well as inside fields. The mode in which the controller causes the work vehicle 100 to perform remotely-manipulated traveling is referred to as a "remote manipulation mode".

The work vehicle 100 includes a device usable for positioning or localization, such as a GNSS receiver or an LiDAR sensor. In the self-traveling mode, based on the position of the work vehicle 100 and information on a target path generated by the management device 600, the controller of the work vehicle 100 is configured or programmed to cause the work vehicle 100 to automatically travel. In addition to controlling the travel of the work vehicle 100, the controller is also configured or programmed to control the operation of the implement. As a result, while automatically traveling inside the field, the work vehicle 100 is able to perform agricultural work by using the implement. In addition, the work vehicle 100 is able to automatically travel along the target path on a road outside the field (e.g., an agricultural road or a general road). In the case of performing self-traveling on a road outside the field, the work vehicle 100 travels while generating, along the target path, a local path along which the work vehicle 100 can avoid an obstacle, based on data output from a sensing device such as a camera or a LiDAR sensor. Inside the field, the work vehicle 100 may travel while generating a local path in substantially the same manner as described above, or may perform an operation of traveling along the target path without generating a local path and halting when an obstacle is detected.

The management device 600 is a computer to manage the agricultural work performed by the work vehicle 100. The management device 600 may be, for example, a server computer that performs centralized management on information regarding the field on the cloud and supports agriculture by use of the data on the cloud. The management device 600 can, for example, create a work plan for the work vehicle 100, and generate a target path for the work vehicle 100 in accordance with the work plan. Alternatively, the management device 600 may generate a target path for the work vehicle 100 in response to the user's operation using the terminal device 400.

The management device 600 generates a target path inside the field and a target path outside the field by different methods from each other. The management device 600 generates a target path inside the field based on information regarding the field. For example, the management device 600 can generate a target path inside the field based on various types of previously registered information such as the outer shape of the field, the area size of the field, the position of the entrance/exit of the field, the width of the work vehicle 100, the width of the implement, the contents of the work, the types of crops to be grown, the region where the crops are to be grown, the growing states of the crops, and the interval between rows or ridges of the crops. The management device 600 generates a target path inside the field based on, for example, information input by the user by use of the terminal device 400 or any other device. The management device 600 generates a path inside the field such that the path covers, for example, the entirety of a work area in which the work is to be performed. Meanwhile, the management device 600 generates a path outside the field in accordance with the work plan or the user's instructions. For example, the management device 600 can generate a target path outside the field based on various types of information such as the order of tasks of agricultural work indicated by the work plan, the position of the field where each task of agricultural work is to be performed, the position of the entrance/exit of the field, the time when each task of agricultural work is to begin and/or end, the state of the road surface, the state of weather or the traffic state. The management device 600 may generate a target path based on information representing the path or the waypoints specified by the user manipulating the terminal device 400, without relying on the work plan. Thus, the management device 600 can generate a target path using various methods, i.e., can perform global path planning.

In addition, the management device 600 may generate or edit an environment map based on data collected by the work vehicle 100 or any other movable body by use of the sensing device such as a LiDAR sensor. The management device 600 transmits data on the work plan, the target path and the environment map thus generated to the work vehicle 100. The work vehicle 100 automatically moves and performs agricultural work based on the data.

It should be noted that global path planning and generation (or editing) of an environment map may be performed by other devices instead of the management device 600. For example, the controller of the work vehicle 100 may perform global path planning, or generation or editing of an environment map.

The terminal device 400 is a computer that is used by a user who is at a remote place from the work vehicle 100. The terminal device 400 shown in FIG. 1A is a laptop computer, but the terminal device 400 is not limited to this. The terminal device 400 may be a stationary computer such as a desktop PC (personal computer), or a mobile terminal such as a smartphone or a tablet computer.

The terminal device 400 may be used to perform remote monitoring of the work vehicle 100 or remote-manipulate the work vehicle 100. For example, the terminal device 400 can display, on a display screen thereof, a video captured by one or more cameras included in the work vehicle 100. The user can watch the video to check the state of the surroundings of the work vehicle 100 and instruct the work vehicle 100 to stop, start, accelerate, decelerate, change traveling direction, and the like.

The terminal device 400 can also display, on the display screen thereof, a setting screen allowing the user to input information necessary to create a work plan (e.g., a schedule of each task of agricultural work) for the work vehicle 100. When the user inputs necessary information to the setting screen and performs a manipulation to transmit the information, the terminal device 400 transmits the input information to the management device 600. The management device 600 creates a work plan based on the information. The terminal device 400 may also be used to register one or more fields where the work vehicle 100 is to perform the agricultural work, the repository for the work vehicle 100, and one or more waiting areas in which the work vehicle 100 temporarily waits. The terminal device 400 may further have a function of displaying, on a display screen thereof, a setting screen allowing the user to input information necessary to set a target path.

Hereinafter, a configuration and an operation of the system according to the present example embodiment will be described in more detail.

Figure 2:
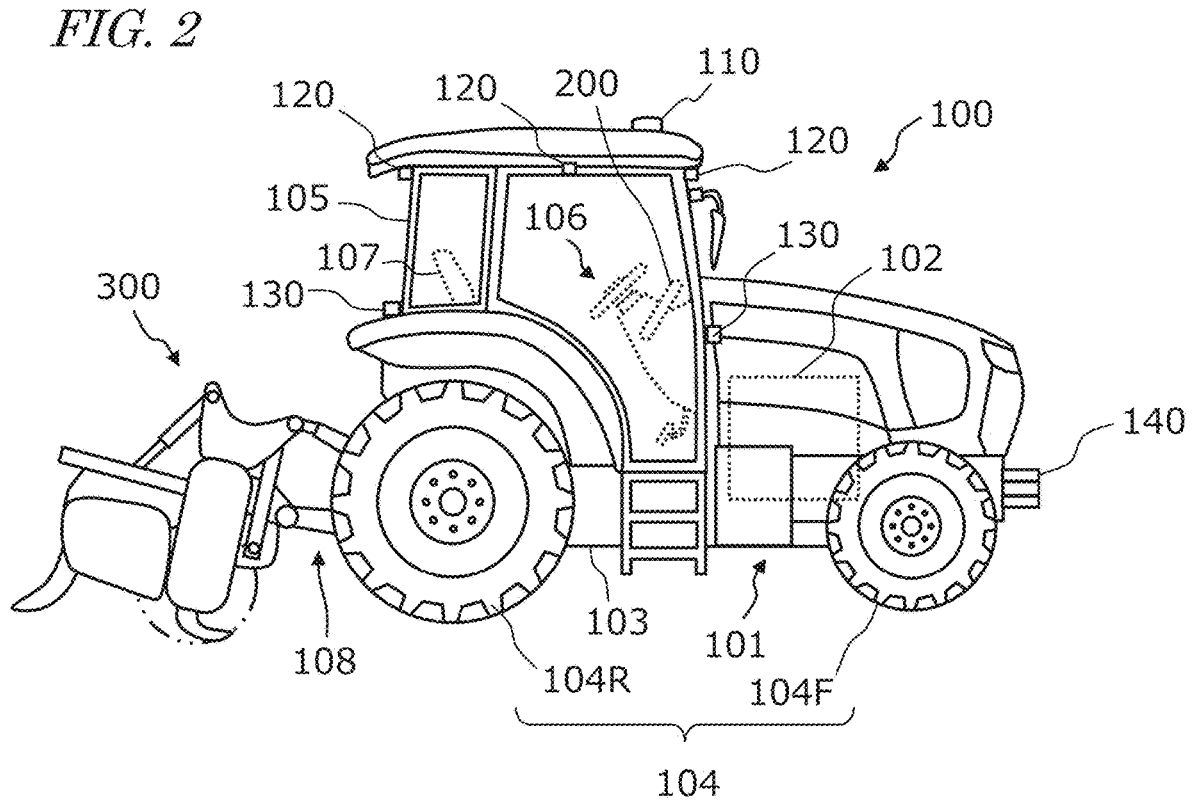
FIG. 2 is a side view schematically showing an example of work vehicle and an example of an implement that is linked to the work vehicle.

FIG. 2 is a side view schematically showing an example of the work vehicle 100 and an example of implement 300 linked to the work vehicle 100. The work vehicle 100 according to the present example embodiment can operate in both a manual driving mode and a self-driving mode. In the self-driving mode, the work vehicle 100 is able to perform unmanned travel. The work vehicle 100 can perform self-driving both inside and outside fields. In the self-driving mode, the controller can operate in a self-traveling mode in which the work vehicle 100 is caused to travel along a preset target path, and in a remote manipulation mode in which the work vehicle 100 is caused to travel in response to the user's operation using the terminal device 400. Switching between the self-traveling mode and the remote manipulation mode may be carried out by the user performing a predetermined operation using the terminal device 400. For example, when the user performs an operation of instructing to start remote manipulation using the terminal device 400 in the self-traveling mode, the controller transitions to the remote manipulation mode. When the user performs an operation of instructing to start self-traveling using the terminal device 400 in the remote manipulation mode, the controller transitions to the self-traveling mode.

As shown in FIG. 2, the work vehicle 100 includes a vehicle body 101, a prime mover (engine) 102, and a transmission 103. In the vehicle body 101, a travel device including tire-mounted wheels 104, and a cabin 105, are provided. The travel device includes four wheels 104, axles for rotating the four wheels, and braking devices (brakes) for slowing or stopping the respective axles. The wheels 104 include a pair of front wheels 104F and a pair of rear wheels 104R. Inside the cabin 105, a driver's seat 107, a steering device 106, an operational terminal 200, and switches for manipulation are provided. In the case where the work vehicle 100 performs tasked travel inside the field, the front wheels 104F and/or the rear wheels 104R may be replaced with a plurality of wheels (crawlers) to which a continuous track is attached, instead of tire-mounted wheels.

The work vehicle 100 can switch between a four-wheel drive (4 W) mode in which all of the front wheels 104F and the rear wheels 104R are a driven wheel, and a two-wheel drive (2 W) mode in which the front wheels 104F or the rear wheels 104R are a driven wheel. The work vehicle 100 can also switch between a state in which the left and right brakes are linked together and a state in which the linkage is removed. When the linkage of the left and right brakes is removed, the left and right wheels 104 can be slowed or stopped separately. As a result, turning with a small turning radius can be performed.

The work vehicle 100 includes a plurality of sensing devices sensing the surroundings of the work vehicle 100. In the example shown in FIG. 2, the sensing devices include a plurality of cameras 120, a LiDAR sensor 140, and a plurality of obstacle sensors 130.

The cameras 120 may be provided at the front/rear/right/left of the work vehicle 100, for example. The cameras 120 image the surrounding environment of the work vehicle 100 and generate image data. The images obtained by the cameras 120 may be transmitted to the terminal device 400, which is responsible for remote monitoring. The images may be used to monitor the work vehicle 100 during unmanned driving. The cameras 120 may also be used to generate images to allow the work vehicle 100, traveling on a road outside the field (an agricultural road or a general road), to recognize objects, obstacles, white lines, road signs, traffic signs or the like in the surroundings of the work vehicle 100.

The LiDAR sensor 140 in the example shown in FIG. 2 is disposed on a bottom portion of a front surface of the vehicle body 101. The LiDAR sensor 140 may be disposed at any other position. While the work vehicle 100 is traveling mainly outside the field, the LiDAR sensor 140 repeatedly outputs sensor data representing the distance and the direction between an object existing in the surrounding environment thereof and each of measurement points, or a two-dimensional or three-dimensional coordinate values of each of the measurement points. The sensor data output from the LiDAR sensor 140 is processed by the controller of the work vehicle 100. The controller can perform localization of the work vehicle 100 by matching the sensor data against the environment map. The controller can further detect an object such as an obstacle existing in the surroundings of the work vehicle 100 based on the sensor data, and generate, along a global path, a local path along which the work vehicle 100 needs to actually proceed. The controller can utilize an algorithm such as, for example, SLAM (Simultaneous Localization and Mapping) to generate or edit an environment map. The work vehicle 100 may include a plurality of LiDAR sensors disposed at different positions with different orientations.

The plurality of obstacle sensors 130 shown in FIG. 2 are provided at the front and the rear of the cabin 105. The obstacle sensors 130 may be disposed at other positions. For example, one or more obstacle sensors 130 may be disposed at any position at the sides, the front or the rear of the vehicle body 101. The obstacle sensors 130 may include, for example, a laser scanner or an ultrasonic sonar. The obstacle sensors 130 may be used to detect obstacles in the surroundings of the work vehicle 100 during self-traveling to cause the work vehicle 100 to halt or detour around the obstacles. The LiDAR sensor 140 may be used as one of the obstacle sensors 130.

The work vehicle 100 further includes a GNSS unit 110. The GNSS unit 110 includes a GNSS receiver. The GNSS receiver may include an antenna to receive a signal(s) from a GNSS satellite(s) and a processor to calculate the position of the work vehicle 100 based on the signal(s) received by the antenna. The GNSS unit 110 receives satellite signals transmitted from the plurality of GNSS satellites, and performs positioning based on the satellite signals. Although the GNSS unit 110 according to the present example embodiment is disposed above the cabin 105, it may be disposed at any other position.

The GNSS unit 110 may include an inertial measurement unit (IMU). Signals from the IMU can be utilized to complement position data. The IMU can measure a tilt or a small motion of the work vehicle 100. The data obtained by the IMU can be used to complement the position data based on the satellite signals, so as to improve the performance of positioning.

The controller of the work vehicle 100 may utilize, for positioning, the sensing data acquired by the sensing devices such as the cameras 120 or the LiDAR sensor 140, in addition to the positioning results provided by the GNSS unit 110. In the case where objects serving as characteristic points exist in the environment that is traveled by the work vehicle 100, as in the case of an agricultural road, a forest road, a general road or an orchard, the position and the orientation of the work vehicle 100 can be estimated with a high accuracy based on data that is acquired by the cameras 120 or the LiDAR sensor 140 and on an environment map that is previously stored in the storage. By correcting or complementing position data based on the satellite signals using the data acquired by the cameras 120 or the LiDAR sensor 140, it becomes possible to identify the position of the work vehicle 100 with a higher accuracy.

The prime mover 102 may be a diesel engine, for example. Instead of a diesel engine, an electric motor may be used. The transmission 103 can change the propulsion and the moving speed of the work vehicle 100 through a speed changing mechanism. The transmission 103 can also switch between forward travel and backward travel of the work vehicle 100.

The steering device 106 includes a steering wheel, a steering shaft connected to the steering wheel, and a power steering device to assist in the steering by the steering wheel. The front wheels 104F are the steered wheels, such that changing their angle of turn (also referred to as "steering angle") can cause a change in the traveling direction of the work vehicle 100. The steering angle of the front wheels 104F can be changed by manipulating the steering wheel. The power steering device includes a hydraulic device or an electric motor to supply an assisting force to change the steering angle of the front wheels 104F. When automatic steering is performed, under the control of a controller disposed in the work vehicle 100, the steering angle may be automatically adjusted by the power of the hydraulic device or the electric motor.

A linkage device 108 is provided at the rear of the vehicle body 101. The linkage device 108 includes, e.g., a three-point linkage (also referred to as a "three-point link" or a "three-point hitch"), a PTO (Power Take Off) shaft, a universal joint, and a communication cable. The linkage device 108 allows the implement 300 to be attached to, or detached from, the work vehicle 100. The linkage device 108 is able to raise or lower the three-point link with a hydraulic device, for example, thus changing the position and/or attitude of the implement 300. Moreover, motive power can be sent from the work vehicle 100 to the implement 300 via the universal joint. While towing the implement 300, the work vehicle 100 allows the implement 300 to perform a predetermined task. The linkage device may be provided frontward of the vehicle body 101. In that case, the implement may be connected frontward of the work vehicle 100.

Although the implement 300 shown in FIG. 2 is a rotary tiller, the implement 300 is not limited to a rotary tiller. For example, any arbitrary implement such as a seeder, a spreader, a transplanter, a mower, a rake implement, a baler, a harvester, a sprayer, or a harrow, may be connected to the work vehicle 100 for use.

The work vehicle 100 shown in FIG. 2 can be driven by human driving; alternatively, it may only support unmanned driving. In that case, elements which are only required for human driving, e.g., the cabin 105, the steering device 106, and the driver's seat 107 do not need to be provided in the work vehicle 100. An unmanned work vehicle 100 may travel via autonomous driving, or by remote manipulation by a user.

Figure 3:
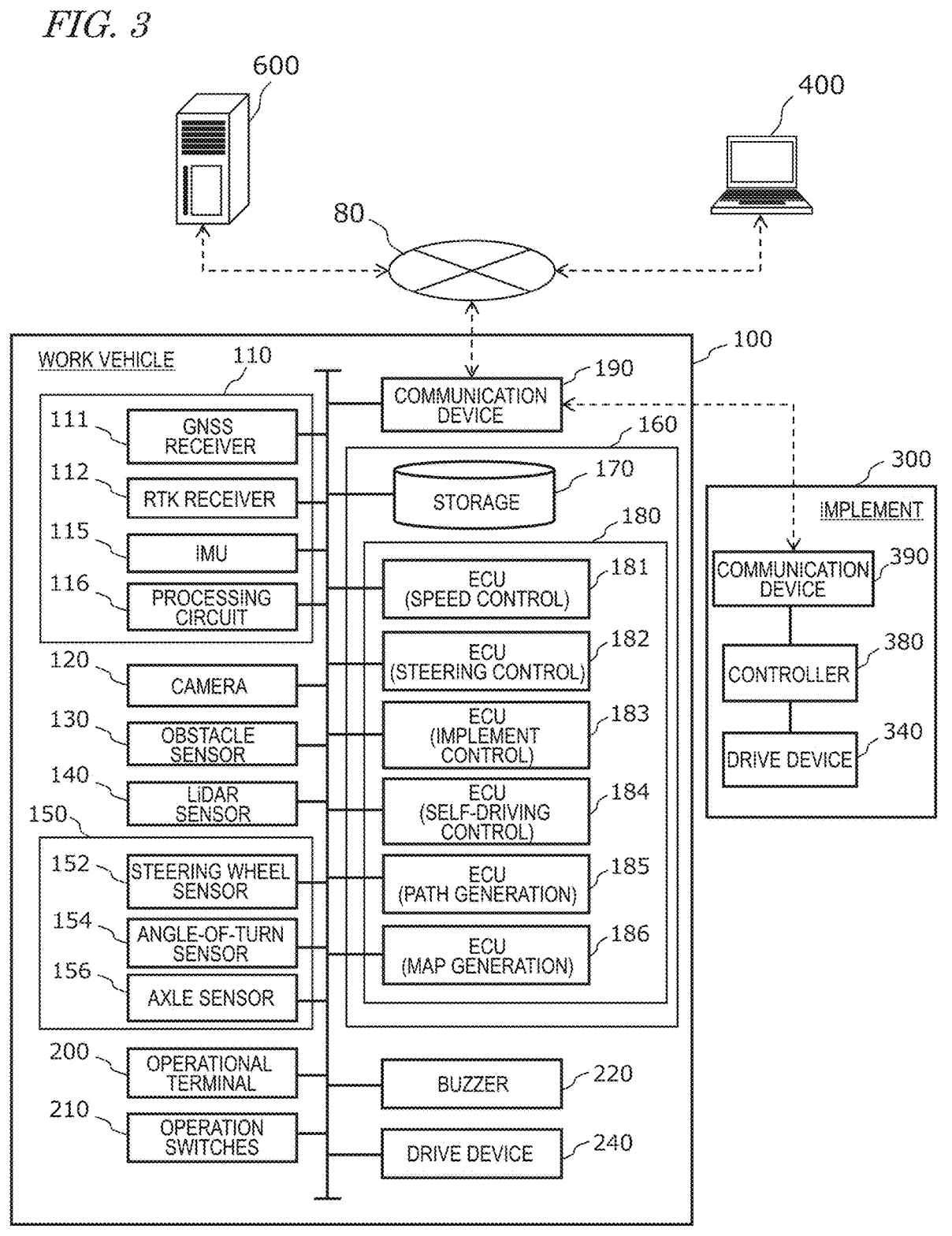

FIG. 3 is a block diagram showing an example configuration of the work vehicle 100 and the implement 300. The work vehicle 100 and the implement 300 can communicate with each other via a communication cable that is included in the linkage device 108. The work vehicle 100 is able to communicate with the terminal device 400 and the management device 600 via the network 80.

In addition to the GNSS unit 110, the cameras 120, the obstacle sensors 130, and the LiDAR sensor 140, and the operational terminal 200, the work vehicle 100 in the example of FIG. 3 includes sensors 150 to detect the operating status of the work vehicle 100, a travel control system 160, a communication device 190, operation switches 210, a buzzer 220, and a drive device 240. These elements are communicably connected with each other via a bus. The GNSS unit 110 includes a GNSS receiver 111, an RTK receiver 112, an inertial measurement unit (IMU) 115, and a processing circuit 116. The sensors 150 include a steering wheel sensor 152, an angle-of-turn sensor 154, and an axle sensor 156. The travel control system 160 includes a storage 170 and a controller 180. The controller 180 includes a plurality of electronic control units (ECU) 181 to 186. The implement 300 includes a drive device 340, a controller 380, and a communication device 390. Note that FIG. 3 shows component elements which are relatively closely related to the operations of self-driving by the work vehicle 100, while other components are omitted from illustration.

The GNSS receiver 111 in the GNSS unit 110 receives satellite signals transmitted from a plurality of GNSS satellites and generates GNSS data based on the satellite signals. The GNSS data is generated in a predetermined format such as, for example, the NMEA-0183 format. The GNSS data may include, for example, the identification number, the angle of elevation, the azimuth angle, and a value representing the reception strength of each of satellites from which the satellite signals are received.

Figure 4:
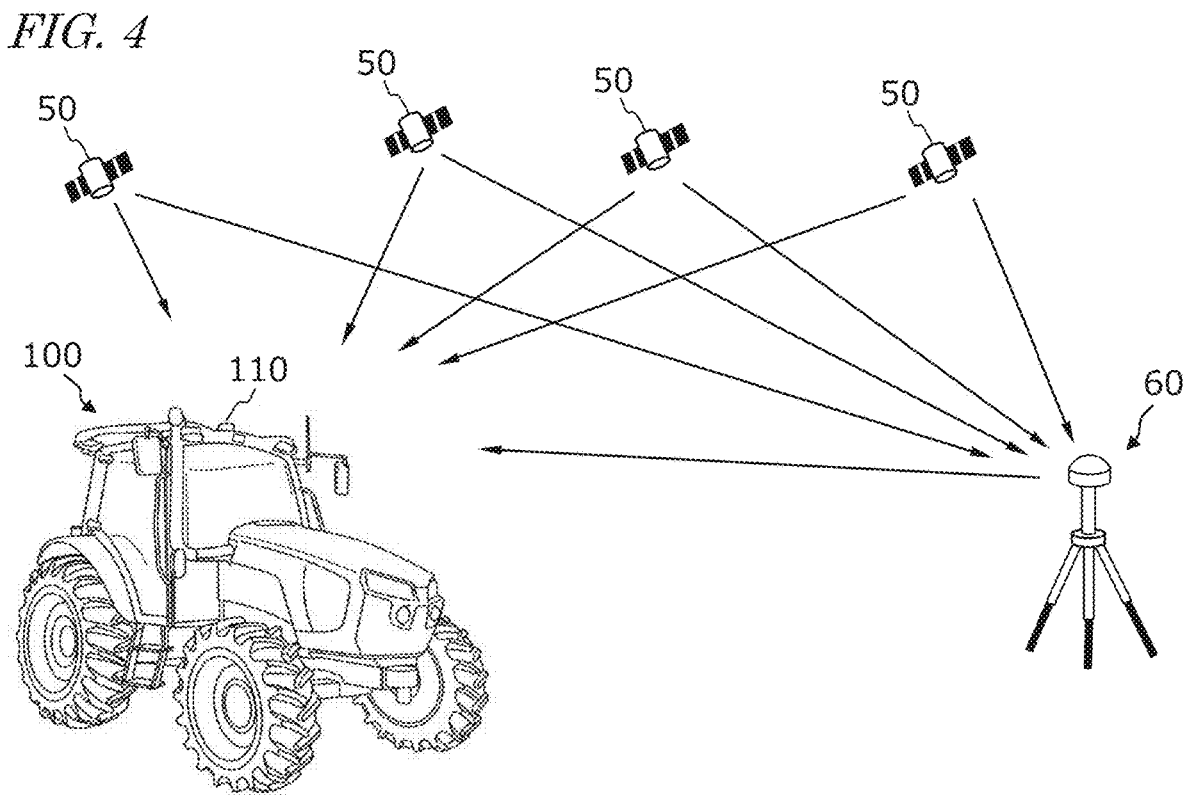
FIG. 4 is a conceptual diagram showing an example of the work vehicle performing positioning based on an RTK-GNSS.

The GNSS unit 110 shown in FIG. 3 performs positioning of the work vehicle 100 by utilizing an RTK (Real Time Kinematic)-GNSS. FIG. 4 is a conceptual diagram showing an example of the work vehicle 100 performing positioning based on the RTK-GNSS. In the positioning based on the RTK-GNSS, not only satellite signals transmitted from a plurality of GNSS satellites 50, but also a correction signal that is transmitted from a reference station 60 is used. The reference station 60 may be disposed near the field that is traveled and worked by the work vehicle 100 (e.g., at a position within 10 km of the work vehicle 100). The reference station 60 generates a correction signal of, for example, an RTCM format based on the satellite signals received from the plurality of GNSS satellites 50, and transmits the correction signal to the GNSS unit 110. The RTK receiver 112, which includes an antenna and a modem, receives the correction signal transmitted from the reference station 60. Based on the correction signal, the processing circuit 116 of GNSS unit 110 corrects the results of the positioning performed by use of the GNSS receiver 111. Use of the RTK-GNSS enables positioning with an accuracy on the order of several centimeters of errors, for example. Positional information (including latitude, longitude, and altitude information) is obtained through the highly accurate positioning by the RTK-GNSS. The GNSS unit 110 calculates the position of the work vehicle 100 as frequently as, for example, one to ten times per second.

Note that the positioning method is not limited to being performed by use of an RTK-GNSS; any arbitrary positioning method (e.g., an interferometric positioning method or a relative positioning method) that provides positional information with the necessary accuracy can be used. For example, positioning may be performed by utilizing a VRS (Virtual Reference Station) or a DGPS (Differential Global Positioning System). In the case where positional information with the necessary accuracy can be obtained without the use of the correction signal transmitted from the reference station 60, positional information may be generated without using the correction signal. In that case, the GNSS unit 110 does not need to include the RTK receiver 112.

Even in the case where the RTK-GNSS is used, at a site where the correction signal from the reference station 60 cannot be acquired (e.g., on a road far from the field), the position of the work vehicle 100 is estimated by another method with no use of the signal from the RTK receiver 112. For example, the position of the work vehicle 100 may be estimated by matching the data output from the LiDAR sensor 140 and/or the cameras 120 against a highly accurate environment map.

The GNSS unit 110 in the present example embodiment further includes the IMU 115. The IMU 115 may include a 3-axis accelerometer and a 3-axis gyroscope. The IMU 115 may include a direction sensor such as a 3-axis geomagnetic sensor. The IMU 115 functions as a motion sensor which can output signals representing parameters such as acceleration, velocity, displacement, and attitude of the work vehicle 100. Based not only on the satellite signals and the correction signal but also on a signal that is output from the IMU 115, the processing circuit 116 can estimate the position and orientation of the work vehicle 100 with a higher accuracy. The signal that is output from the IMU 115 may be used for the correction or complementation of the position that is calculated based on the satellite signals and the correction signal. The IMU 115 outputs a signal more frequently than the GNSS receiver 111. Utilizing this signal that is output highly frequently, the processing circuit 116 allows the position and orientation of the work vehicle 100 to be measured more frequently (e.g., about 10 Hz or above). Instead of the IMU 115, a 3-axis accelerometer and a 3-axis gyroscope may be separately provided. The IMU 115 may be provided as a separate device from the GNSS unit 110.

The cameras 120 are imagers that image the surrounding environment of the work vehicle 100. Each of the cameras 120 includes an image sensor such as a CCD (Charge Coupled Device) or a CMOS (Complementary Metal Oxide Semiconductor), for example. In addition, each camera 120 may include an optical system including one or more lenses and a signal processing circuit. During travel of the work vehicle 100, the cameras 120 image the surrounding environment of the work vehicle 100, and generate image data (e.g., moving image data). The cameras 120 are able to capture moving images at a frame rate of 3 frames/second (fps: frames per second) or greater, for example. The images generated by the cameras 120 may be used when a remote supervisor checks the surrounding environment of the work vehicle 100 with the terminal device 400, for example. The images generated by the cameras 120 may also be used for the purpose of positioning and/or detection of obstacles. As shown in FIG. 2, the plurality of cameras 120 may be provided at different positions on the work vehicle 100, or a single camera 120 may be provided. A visible camera(s) to generate visible light images and an infrared camera(s) to generate infrared images may be separately provided. Both of a visible camera(s) and an infrared camera(s) may be provided as cameras for generating images for monitoring purposes. The infrared camera(s) may also be used for detection of obstacles at nighttime.

The obstacle sensors 130 detect objects around the work vehicle 100. Each of the obstacle sensors 130 may include a laser scanner or an ultrasonic sonar, for example. When an object exists at a position within a predetermined distance from the obstacle sensor 130, the obstacle sensor 130 outputs a signal indicating the presence of the obstacle. The plurality of obstacle sensors 130 may be provided at different positions on the work vehicle 100. For example, a plurality of laser scanners and a plurality of ultrasonic sonars may be disposed at different positions on the work vehicle

100. Providing such a great number of obstacle sensors 130 can reduce blind spots in monitoring obstacles around the work vehicle 100.

The steering wheel sensor 152 measures the angle of rotation of the steering wheel of the work vehicle 100. The angle-of-turn sensor 154 measures the angle of turn of the front wheels 104F, which are the steered wheels. Measurement values by the steering wheel sensor 152 and the angle-of-turn sensor 154 are used for steering control by the controller 180.

The axle sensor 156 measures the rotational speed, i.e., the number of revolutions per unit time, of an axle that is connected to a wheel 104. The axle sensor 156 may be a sensor including a magnetoresistive element (MR), a Hall generator, or an electromagnetic pickup, for example. The axle sensor 156 outputs a numerical value indicating the number of revolutions per minute (unit: rpm) of the axle, for example. The axle sensor 156 is used to measure the speed of the work vehicle 100.

The drive device 240 includes various types of devices required to cause the work vehicle 100 to travel and to drive the implement 300; for example, the prime mover 102, the transmission 103, the steering device 106, the linkage device 108 and the like described above. The prime mover 102 may include an internal combustion engine such as, for example, a diesel engine. The drive device 240 may include an electric motor for traction instead of, or in addition to, the internal combustion engine.

The buzzer 220 is an audio output device to present an alarm sound to alert the user of an abnormality. For example, the buzzer 220 may present an alarm sound when an obstacle is detected during self-driving. The buzzer 220 is controlled by the controller 180.

The storage 170 includes one or more storage mediums such as a flash memory or a magnetic disc. The storage 170 stores various data that is generated by the GNSS unit 110, the cameras 120, the obstacle sensors 130, the LiDAR sensor 140, the sensors 150, and the controller 180. The data that is stored by the storage 170 includes map data on the environment where the work vehicle 100 travels (environment map) and data on a global path for self-driving (target path). The environment map includes information on a plurality of fields where the work vehicle 100 performs agricultural work and roads in the surroundings of the fields. The environment map and the target path may be generated by a processing device (i.e., a processor) in the management device 600. It should be noted that the controller 180 according to the present example embodiment may have a function of generating or editing an environment map and a target path. The controller 180 can edit the environment map and the target path, acquired from the management device 160, in accordance with the environment where the work vehicle 100 travels.

The storage 170 also stores data on a work plan received by the communication device 190 from the management device 600. The work plan includes information on a plurality of tasks of agricultural work to be performed by the work vehicle 100 over a plurality of working days. The work plan may be, for example, data on a work schedule including information on the time when the work vehicle 100 is scheduled to perform each task of agricultural work on each of the working days. The storage 170 also stores a computer program(s) to cause each of the ECUs in the controller 180 to perform various operations described below. Such a computer program(s) may be provided to the work vehicle 100 via a storage medium (e.g., a semiconductor memory, an optical disc, etc.) or through telecommunication lines (e.g., the Internet). Such a computer program(s) may be marketed as commercial software.

In the present example embodiment, the storage 170 further stores the position of a permitted area in which remotely-manipulated traveling of the work vehicle 100 is permitted, and the position of a forbidden area in which remotely-manipulated traveling of the work vehicle 100 is forbidden. All or a portion of a permitted area may be a conditionally permitted area in which remotely-manipulated traveling is permitted conditionally. A permitted area may include an unconditionally permitted area in which remotely-manipulated traveling is permitted uncondition- ally. The storage 170 may store the positions of a plurality of conditionally permitted areas having different permission conditions for remotely-manipulated traveling, and a per- mission condition for remotely-manipulated traveling in each conditionally permitted area. The storage 170 may store the positions of at least permitted areas or forbidden areas. For example, in the case in which the positions of only permitted areas are stored, positions other than permitted areas may be processed as forbidden areas. Conversely, in the case in which the positions of only forbidden areas are stored, positions other than forbidden areas may be pro- cessed as permitted areas (conditionally permitted areas or unconditionally permitted areas). In the present disclosure, in the case in which the positions of forbidden areas are stored, and the other areas are processed as permitted areas, it is considered that the positions of permitted areas are also (indirectly) stored in the storage 170.

The storage 170 may further store the positions of limited areas in which a limitation is imposed on operation in remotely-manipulated traveling. For example, the storage 170 may store the position of a limited area in which a limitation is imposed on traveling speed, the number of revolutions of an engine, operation of an implement 300, or the like during remotely-manipulated traveling, and infor- mation indicating details of the limitation. A plurality of limited areas having different operation limitations may be set. The storage 170 may store the positions of a plurality of limited areas, and information indicating details of a limi- tation in each limited area.

The controller 180 includes the plurality of ECUs. The plurality of ECUs may include, for example, the ECU 181 for speed control, the ECU 182 for steering control, the ECU 183 for implement control, the ECU 184 for self-driving control, the ECU 185 for path generation, and the ECU 186 for map generation.

The ECU 181 controls the prime mover 102, the trans- mission 103 and brakes included in the drive device 240, thus controlling the speed of the work vehicle 100.

The ECU 182 controls the hydraulic device or the electric motor included in the steering device 106 based on a measurement value of the steering wheel sensor 152, thus controlling the steering of the work vehicle 100.

In order to cause the implement 300 to perform a desired operation, the ECU 183 controls the operation of the three- point link, the PTO shaft and the like that are included in the linkage device 108. Also, the ECU 183 generates a signal to control the operation of the implement 300, and transmits this signal from the communication device 190 to the implement 300.

Based on data output from the GNSS unit 110, the cameras 120, the obstacle sensors 130, the LiDAR sensor 140 and the sensors 150, the ECU 184 performs computation and control for achieving self-driving. For example, the ECU 184 specifies the position of the work vehicle 100 based on the data output from at least one of the GNSS unit 110, the cameras 120 and the LiDAR sensor 140. Inside the field, the ECU 184 may determine the position of the work vehicle 100 based only on the data output from the GNSS unit 110. The ECU 184 may estimate or correct the position of the work vehicle 100 based on the data acquired by the cameras 120 or the LiDAR sensor 140. Use of the data acquired by the cameras 120 or the LiDAR sensor 140 allows the accuracy of the positioning to be further improved. Outside the field, the ECU 184 estimates the position of the work vehicle 100 by use of the data output from the LiDAR sensor 140 or the cameras 120. For example, the ECU 184 may estimate the position of the work vehicle 100 by matching the data output from the LiDAR sensor 140 or the cameras 120 against the environment map. During self-driving, the ECU 184 performs computation necessary for the work vehicle 100 to travel along a target path or a local path, based on the estimated position of the work vehicle 100. The ECU 184 sends the ECU 181 a command to change the speed, and sends the ECU 182 a command to change the steering angle. In response to the command to change the speed, the ECU 181 controls the prime mover 102, the transmission 103 or the brakes to change the speed of the work vehicle 100. In response to the command to change the steering angle, the ECU 182 con- trols the steering device 106 to change the steering angle.

The ECU 184 also performs control related to the remotely-manipulated traveling of the work vehicle 100. In the remote manipulation mode, the ECU 184 controls the ECUs 181, 182, and 183 in response to a signal that is received by the communication device 190 from the termi- nal device 400. As a result, operations such as speed control and steering control of the work vehicle 100, raising and lowering of the implement 300, and switching on/off of the implement 300 can be carried out in response to the user's remote manipulation.

While the work vehicle 100 is traveling along the target path, the ECU 185 consecutively generates a local path along which the work vehicle 100 can avoid an obstacle. During travel of the work vehicle 100, the ECU 185 recog- nizes an obstacle existing in the surroundings of the work vehicle 100 based on the data output from the cameras 120, the obstacle sensors 130 and the LiDAR sensor 140. The ECU 185 generates a local path such that the work vehicle 100 avoids the recognized obstacle.

The ECU 185 may have a function of performing global path planning instead of the management device 160. In that case, the ECU 185 may determine a destination of the work vehicle 100 based on the work schedule stored in the storage 170 and determine a target path from the start position of the work vehicle 100 to the destination. The ECU 185 can generate, for example, a path by which the work vehicle 100 can arrive at the destination within the shortest time period, as the target path, based on the environment map including the information on the roads stored in the storage 170. Alternatively, the ECU 185 may generate, as a target path, a path including a particular type(s) of road (e.g., agricul- tural roads, roads along particular objects such as water- ways, and roads on which satellite signals can be satisfac- torily received from a GNSS satellite) with high priority, based on attribute information of roads included in an environment map.

The ECU 186 generates or edits a map of the environment where the work vehicle 100 travels. In the present example embodiment, an environment map generated by an external device such as the management device 600 is transmitted to the work vehicle 100 and recorded in the storage 170.

Instead, the ECU 186 can generate or edit an environment map. Hereinafter, an operation in a case where the ECU 186 generates an environment map will be described. An environment map may be generated based on sensor data output from the LiDAR sensor 140. For generating an environment map, the ECU 186 consecutively generates three-dimensional point cloud data based on the sensor data output from the LiDAR sensor 140 while the work vehicle 100 is traveling. The ECU 186 can generate an environment map by connecting the point cloud data consecutively generated by use of an algorithm such as, for example, SLAM. The environment map generated in this manner is a highly accurate three-dimensional map, and may be used for localization performed by the ECU 184. Based on this three-dimensional map, a two-dimensional map usable for the global path planning may be generated. In this specification, the three-dimensional map that is used for the localization and the two-dimensional map that is used for the global path planning will be both referred to as an "environment map". The ECU 186 can further edit the map by adding, to the map, various types of attribute information on objects (e.g., waterways, rivers, grasses, and trees), the type of a road (e.g., whether or not the road is an agricultural road), the state of the road surface, how easily the road is passable, or the like that is recognized based on the data output from the camera 120 or the LiDAR sensor 140.

Through the actions of these ECUs, the controller 180 realizes self-traveling and remote-operated traveling. During self-traveling, the controller 180 controls the drive device 240 based on the measured or estimated position of the work vehicle 100 and on the generated path. As a result, the controller 180 can cause the work vehicle 100 to travel along the target path. During remotely-manipulated traveling, the controller 180 is configured or programmed to control the drive device 240 in response to the user's operation using the terminal device 400. As a result, the controller 180 can cause the work vehicle 100 to travel in accordance with the user's instruction.

The plurality of ECUs included in the controller 180 can communicate with each other in accordance with a vehicle bus standard such as, for example, a CAN (Controller Area Network). Instead of the CAN, faster communication methods such as Automotive Ethernet (registered trademark) may be used. Although the ECUs 181 to 186 are illustrated as individual blocks in FIG. 3, the function of each of the ECU 181 to 186 may be implemented by a plurality of ECUs. Alternatively, an onboard computer that integrates the functions of at least some of the ECUs 181 to 186 may be provided. The controller 180 may include ECUs other than the ECUs 181 to 186, and any number of ECUs may be provided in accordance with functionality. Each ECU includes a processing circuit including one or more processors.

The communication device 190 is a device including a circuit communicating with the implement 300, the terminal device 400, and the management device 600. The communication device 190 includes circuitry to perform exchanges of signals complying with an ISOBUS standard such as ISOBUS-TIM, for example, between itself and the communication device 390 of the implement 300. This allows the implement 300 to perform a desired operation, or allows information to be obtained from the implement 300. The communication device 190 may further include an antenna and a communication circuit to exchange signals via the network 80 with communication devices of the terminal device 400 and the management device 600. The network 80 may include a 3G, 4G, 5G, or any other cellular mobile communications network and the Internet, for example. The communication device 190 may have the function of communicating with a mobile terminal that is used by a supervisor who is situated near the work vehicle 100. With such a mobile terminal, communication may be performed based on any arbitrary wireless communication standard, e.g., Wi-Fi (registered trademark), 3G, 4G, 5G or any other cellular mobile communication standard, or Bluetooth (registered trademark).

The operational terminal 200 is a terminal for the user to perform a manipulation related to the travel of the work vehicle 100 and the operation of the implement 300, and may also be referred to as a virtual terminal (VT). The operational terminal 200 may include a display device such as a touch screen panel, and/or one or more buttons. The display device may be a display such as a liquid crystal display or an organic light-emitting diode (OLED) display, for example. By manipulating the operational terminal 200, the user can perform various manipulations, such as, for example, switching ON/OFF the self-driving mode, switching ON/OFF the remote manipulation mode, recording or editing an environment map, setting a target path, and switching ON/OFF the implement 300. At least a portion of these manipulations may also be realized by manipulating the operation switches 210. The operational terminal 200 may be configured so as to be detachable from the work vehicle 100. A user who is at a remote place from the work vehicle 100 may manipulate the detached operational terminal 200 to control the operation of the work vehicle 100. Instead of the operational terminal 200, the user may manipulate a computer on which necessary application software is installed, for example, the terminal device 400, to control the operation of the work vehicle 100.

Figure 5:
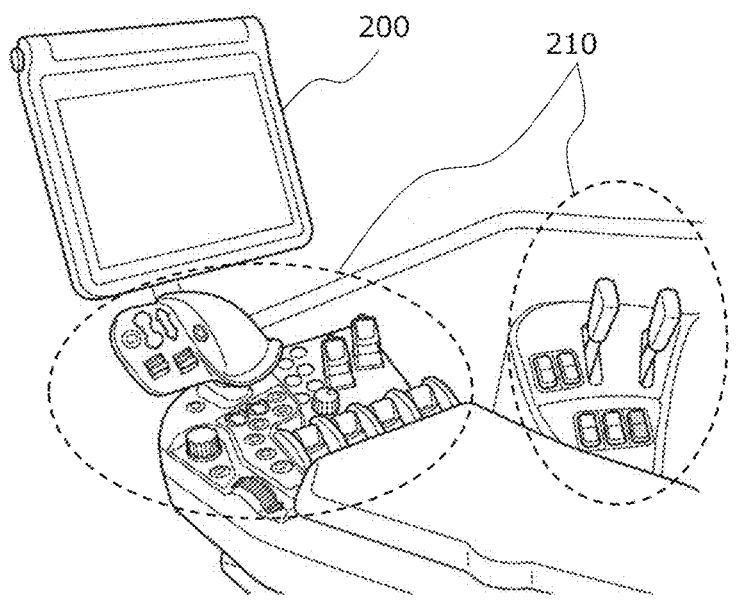
FIG. 5 is a view showing an example of operational terminal and an example of operation switches disposed in a cabin.

FIG. 5 is a diagram showing an example of the operational terminal 200 and an example of the switches 210 both provided in the cabin 105. In the cabin 105, the operation switches 210, including a plurality of switches that are manipulable to the user, are disposed. The operation switches 210 may include, for example, a switch to select the gear shift as to a main gear shift or a range gear shift, a switch to switch between a self-driving mode and a manual driving mode, a switch to switch between forward travel and backward travel, a switch to switch between four-wheel drive and two-wheel drive, a switch to remove the linkage of the left and right brakes, a switch to raise or lower the implement 300, and the like. In the case where the work vehicle 100 only performs unmanned driving and lacks human driving functionality, the work vehicle 100 does not need to include the operation switches 210.

At least a portion of the manipulations that can be carried out by the operation terminal 200 or the operation switches 210 may also be carried out by remote manipulations using the terminal device 400. Any of the operations may be carried out by the user performing a predetermined operation on a screen displayed on the display of the terminal device 400.

The drive device 340 in the implement 300 shown in FIG. 3 performs operations necessary for the implement 300 to perform predetermined work. The drive device 340 includes a device suitable for uses of the implement 300, for example, a hydraulic device, an electric motor, a pump or the like. The controller 380 controls the operation of the drive device 340. In response to a signal that is transmitted from the work vehicle 100 via the communication device 390, the controller 380 is configured or programmed to cause the drive device 340 to perform various operations. Moreover, a signal that is in accordance with the state of the implement 300 may be transmitted from the communication device 390 to the work vehicle 100.

Figure 6:
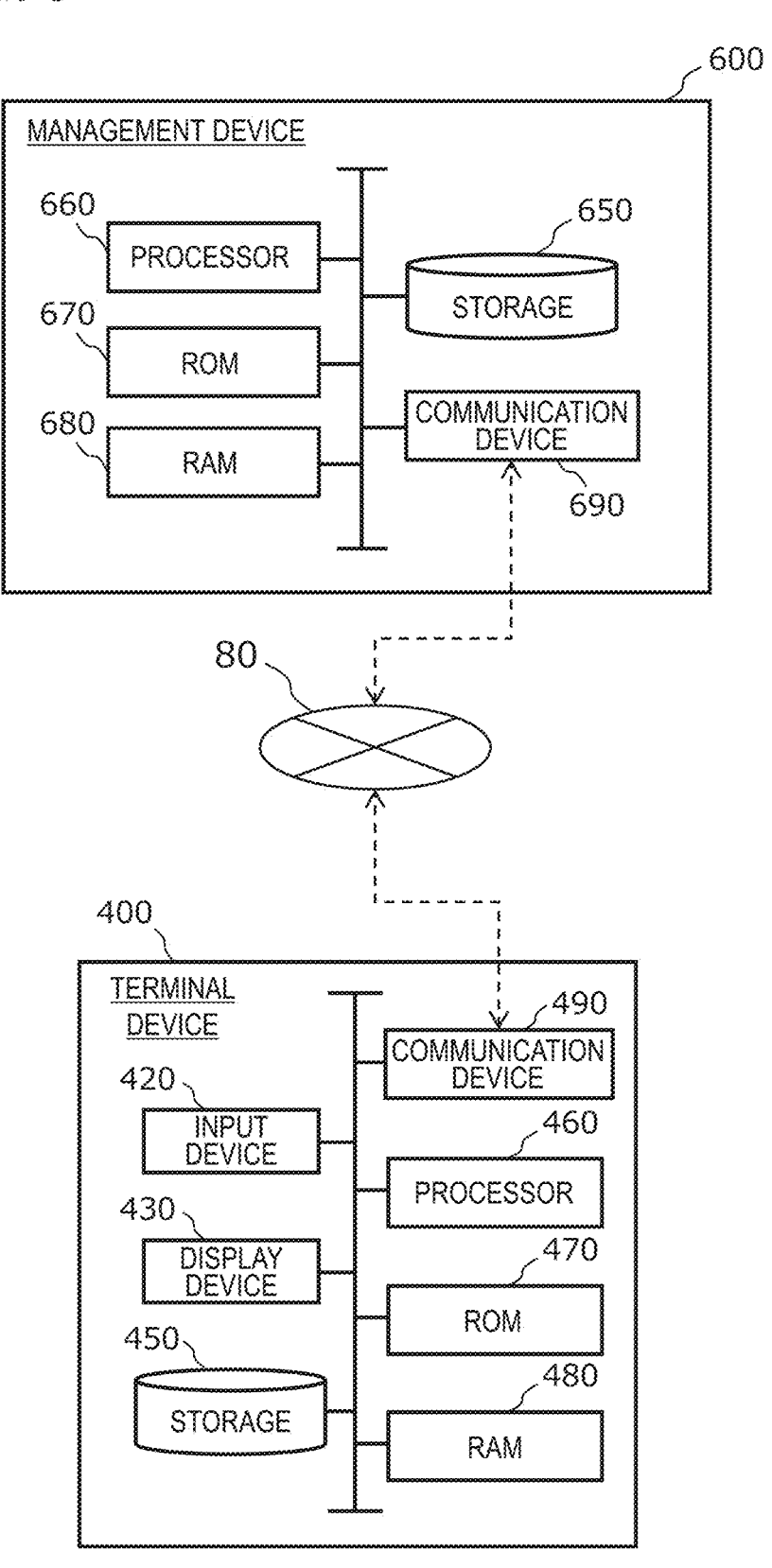
FIG. 6 is a block diagram illustrating hardware configurations of a management device and a terminal device.

Now, a configuration of the management device 600 and the terminal device 400 will be described with reference to FIG. 6. FIG. 6 is a block diagram showing an example of schematic hardware configuration of the management device 600 and the terminal device 400.

The management device 600 includes a storage 650, a processor 660, a ROM (Read Only Memory) 670, a RAM (Random Access Memory) 680, and a communication device 690. These component elements are communicably connected to each other via a bus. The management device 600 may function as a cloud server to manage the schedule of the agricultural work to be performed by the work vehicle 100 in a field and support agriculture by use of the data managed by the management device 600 itself. The user can input information necessary to create a work plan by use of the terminal device 400 and upload the information to the management device 600 via the network 80. The management device 600 can create a schedule of agricultural work, that is, a work plan based on the information. The management device 600 can further generate or edit an environment map and perform global path planning for the work vehicle 100. The environment map may be distributed from a computer external to the management device 600.

The communication device 690 is a communication module to communicate with the work vehicle 100 and the terminal device 400 via the network 80. The communication device 690 can perform wired communication in compliance with communication standards such as, for example, IEEE1394 (registered trademark) or Ethernet (registered trademark). The communication device 690 may perform wireless communication in compliance with Bluetooth (registered trademark) or Wi-Fi, or cellular mobile communication based on 3G, 4G, 5G or any other cellular mobile communication standard.

The processor 660 may be, for example, an integrated circuit including a central processing unit (CPU). The processor 660 may be realized by a microprocessor or a microcontroller. Alternatively, the processor 660 may be realized by an FPGA (Field Programmable Gate Array), a GPU (Graphics Processing Unit), an ASIC (Application Specific Integrated Circuit), an ASSP (Application Specific Standard Product), or a combination of two or more selected from these circuits. The processor 660 consecutively executes a computer program, describing commands to execute at least one process, stored in the ROM 670 and thus realizes a desired process.

The ROM 670 is, for example, a writable memory (e.g., PROM), a rewritable memory (e.g., flash memory) or a memory which can only be read from but cannot be written to. The ROM 670 stores a program to control operations of the processor 660. The ROM 670 does not need to be a single storage medium, and may be an assembly of a plurality of storage mediums. A portion of the assembly of the plurality of storage memories may be a detachable memory.

The RAM 680 provides a work area in which the control program stored in the ROM 670 is once developed at the time of boot. The RAM 680 does not need to be a single storage medium, and may be an assembly of a plurality of storage mediums.

The storage 650 mainly acts as a storage for a database. The storage 650 may be, for example, a magnetic storage or a semiconductor storage. An example of the magnetic storage is a hard disc drive (HDD). An example of the semiconductor storage is a solid state drive (SSD). The storage 650 may be a device independent from the management device 600. For example, the storage 650 may be a storage connected to the management device 600 via the network 80, for example, a cloud storage.

The terminal device 400 shown in FIG. 6 includes an input device 420, a display device (display) 430, a storage 450, a processor 460, a ROM 470, a RAM 480, and a communication device 490. These component elements are communicably connected with each other via a bus. The input device 420 is a device to convert an instruction from the user into data and input the data to a computer. The input device 420 may be, for example, a keyboard, a mouse or a touch panel. The display device 430 may be, for example, a liquid crystal display or an organic EL display. The processor 460, the ROM 470, the RAM 480, the storage 450 and the communication device 490 are substantially the same as the corresponding component elements described above regarding the example of the hardware configuration of the management device 600, and will not be described in repetition.

Now, an operation of the work vehicle 100, the terminal device 400 and the management device 600 will be described.

First, an example operation of self-traveling of the work vehicle 100 will be described. The work vehicle 100 according to the present example embodiment can automatically travel both inside and outside a field. Inside the field, the work vehicle 100 drives the implement 300 to perform predetermined agricultural work while traveling along a preset target path. When detecting an obstacle by the obstacle sensors 130 thereof while traveling inside the field, the work vehicle 100 halts traveling and performs operations of presenting an alarm sound from the buzzer 220, transmitting an alert signal to the terminal device 400 and the like. Inside the field, the positioning of the work vehicle 100 is performed based mainly on data output from the GNSS unit 110. Meanwhile, outside the field, the work vehicle 100 automatically travels along a target path set for an agricultural road or a general road outside the field. While traveling outside the field, the work vehicle 100 performs local path planning based on data acquired by the cameras 120 or the LiDAR 140. When an obstacle is detected outside the field, the work vehicle 100 avoids the obstacle or halts at the point. Outside the field, the position of the work vehicle 100 is estimated based on data output from the LiDAR sensor 140 or the cameras 120 in addition to positioning data output from the GNSS unit 110.

Hereinafter, an operation of the work vehicle 100 performing self-traveling inside the field will be described. An operation of the work vehicle 100 performing self-traveling outside the field will be described later.

Figure 7:
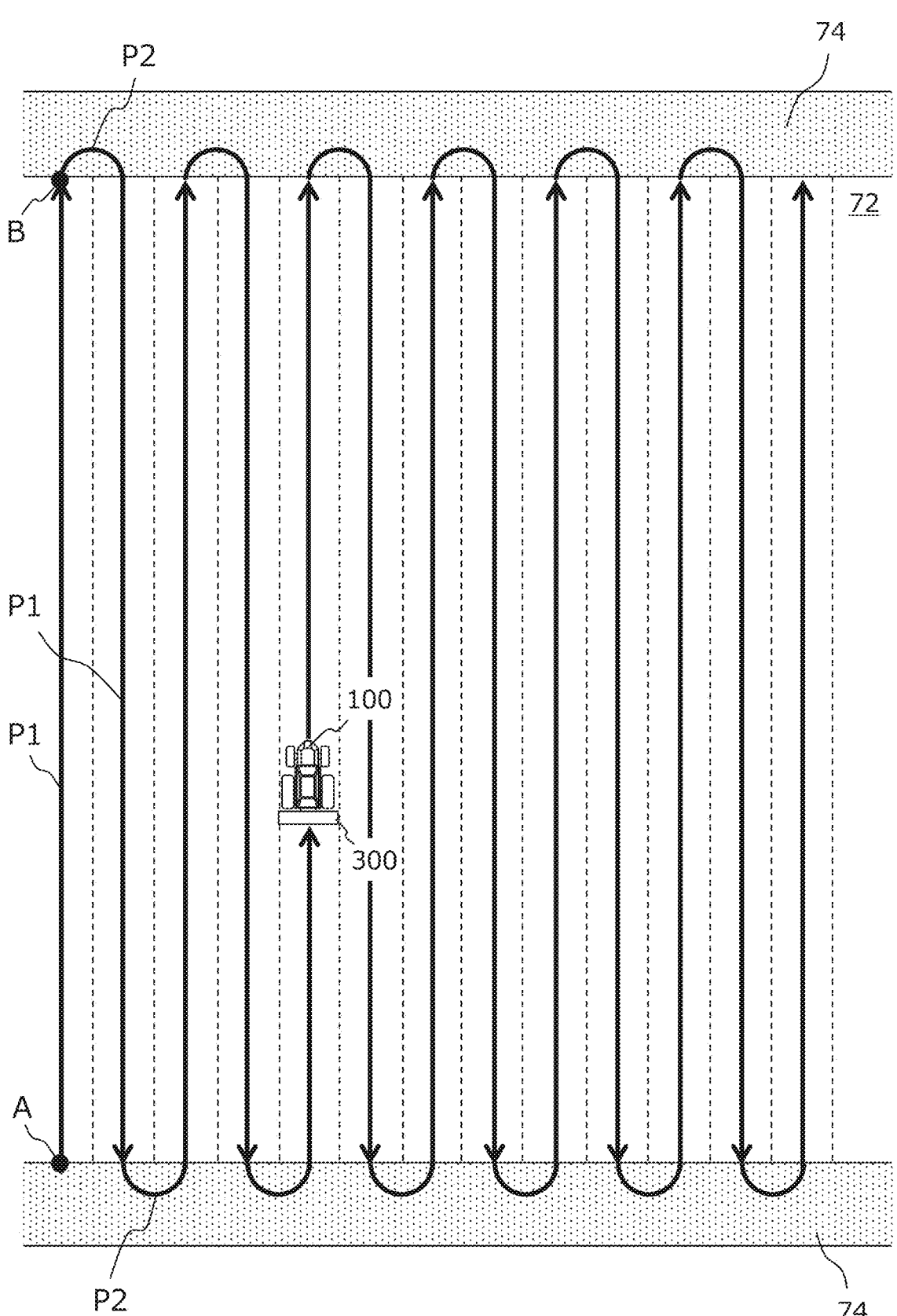
FIG. 7 is a diagram schematically showing an example of the work vehicle automatically traveling along a target path in a field.

FIG. 7 is a diagram schematically showing an example of the work vehicle 100 automatically traveling along a target path in a field. In this example, the field includes a work area 72, in which the work vehicle 100 performs work by using the implement 300, and headlands 74, which are located near an outer edge of the field. The user may specify which regions of the field on the map would correspond to the work area 72 and the headlands 74 in advance. The target path in this example includes a plurality of main paths P1 parallel to each other and a plurality of turning paths P2 interconnecting the plurality of main paths P1. The main paths P1 are located in the work area 72, whereas the turning paths P2 are located in the headlands 74. Although each of the main paths P1 in FIG. 7 is illustrated as a linear path, each main path P1 may also include a curved portion(s). The main paths P1 may, for example, be automatically generated by the user performing an operation of specifying two points (in FIG. 7, points A and B) at or near an end of a field while viewing a map of the field displayed on the operational terminal 200 or the terminal device 400. In that case, the main paths P1 are set in parallel with the line segment connecting the points A and B specified by the user, and a target path in the field is generated by connecting the turning paths P2 to the main paths P1. Broken lines in FIG. 7 depict the working breadth of the implement 300. The working breadth is previously set and recorded in the storage 170. The working breadth may be set and recorded by the user manipulating the operational terminal 200 or the terminal device 400. Alternatively, the working breadth may be automatically recognized and recorded when the implement 300 is connected to the work vehicle 100. The interval between the plurality of main paths P1 may be set so as to be matched to the working breadth. The target path may be generated based on the manipulation made by the user, before self-driving is begun. The target path may be generated so as to cover the entire work area 72 in the field, for example. Along the target path shown in FIG. 7, the work vehicle 100 automatically travels while repeatedly reciprocating from a beginning point of work to an ending point of work. Note that the target path shown in FIG. 7 is merely an example, and the target path may be arbitrarily determined.

Now, an example control by the controller 180 during self-driving in a field will be described.

Figure 8:
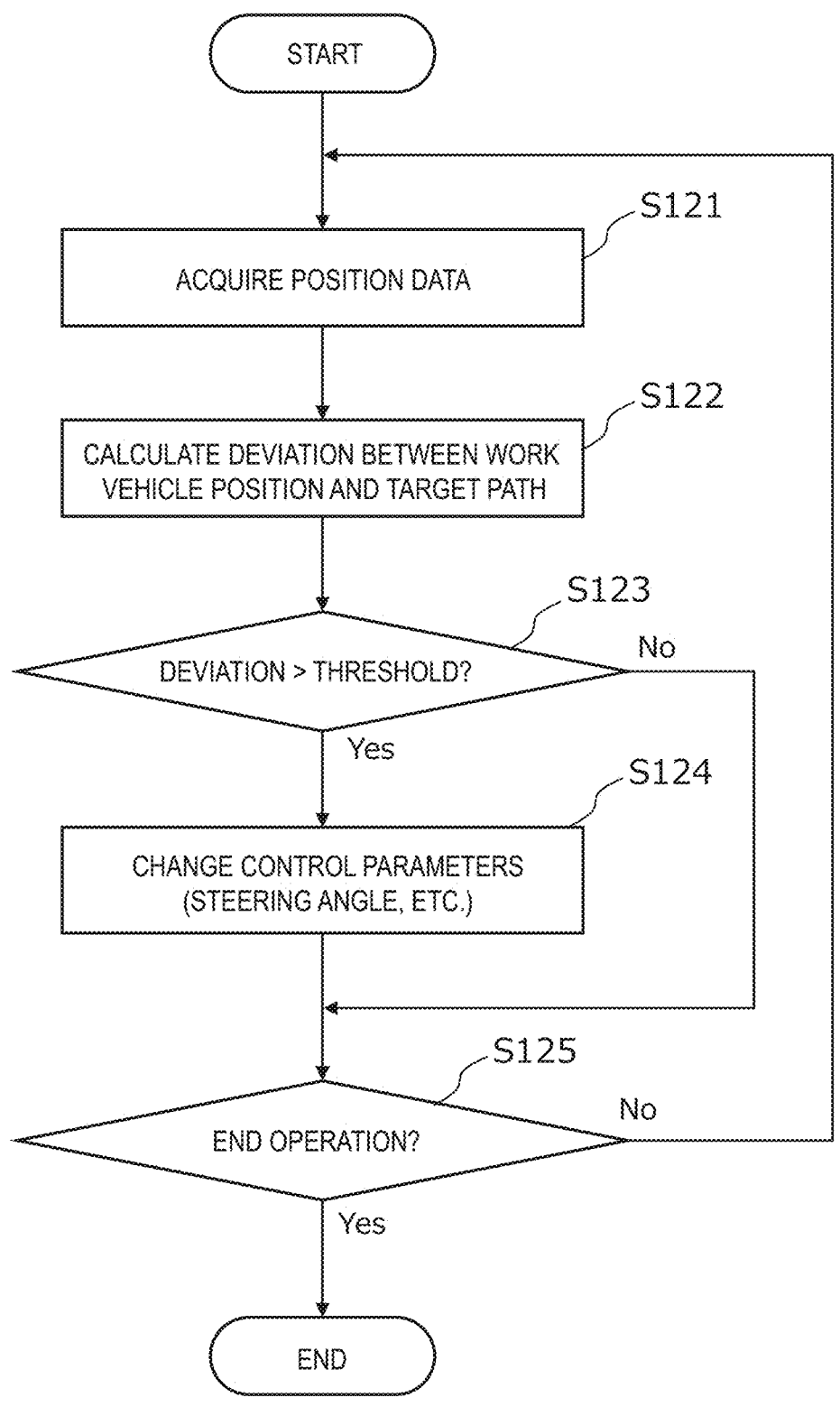
FIG. 8 is a flowchart showing an example operation of steering control during self-driving.

FIG. 8 is a flowchart showing an example operation of steering control to be performed by the controller 180 during self-driving. During travel of the work vehicle 100, the controller 180 is configured or programmed to perform automatic steering by performing the operation from steps S121 to S125 shown in FIG. 7. The speed of the work vehicle 100 will be maintained at a previously-set speed, for example. First, during travel of the work vehicle 100, the controller 180 obtains data representing the position of the work vehicle 100 that is generated by the GNSS unit 110 (step S121). Next, the controller 180 calculates a deviation between the position of the work vehicle 100 and the target path (step S122). The deviation represents the distance between the position of the work vehicle 100 and the target path at that moment. The controller 180 determines whether the calculated deviation in position exceeds the previously-set threshold or not (step S123). If the deviation exceeds the threshold, the controller 180 changes a control parameter of the steering device included in the drive device 240 so as to reduce the deviation, thus changing the steering angle (step S124). If the deviation does not exceed the threshold at step S123, the operation of step S124 is omitted. At the following step S125, the controller 180 determines whether a command to end the operation has been received or not. The command to end the operation may be given when the user has instructed that self-driving be suspended through remote manipulations, or when the work vehicle 100 has arrived at the destination, for example. If the command to end the operation has not been given, the control returns to step S121 and the controller 180 performs substantially the same operation based on a newly measured position of the work vehicle 100. The controller 180 repeats the operation from steps S121 to S125 until a command to end the operation is given. The aforementioned operation is executed by the ECUs 182 and 184 in the controller 180.

In the example shown in FIG. 8, the controller 180 is configured or programmed to control the drive device 240 based only on the deviation between the position of the work vehicle 100 as identified by the GNSS unit 110 and the target path. Alternatively, a deviation in terms of directions may further be considered in the control. For example, when a directional deviation exceeds a previously-set threshold, where the directional deviation is an angle difference between the orientation of the work vehicle 100 as identified by the GNSS unit 110 and the direction of the target path, the controller 180 may change the control parameter of the steering device of the drive device 240 (e.g., steering angle) in accordance with the deviation.

Hereinafter, with reference to FIGS. 9A to 9D, an example of steering control by the controller 180 will be described more specifically.

Figure 9A:
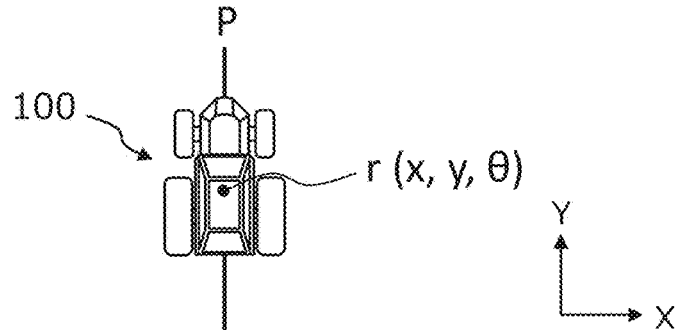
FIG. 9A is a diagram showing an example of the work vehicle traveling along a target path P.
Figure 9B:
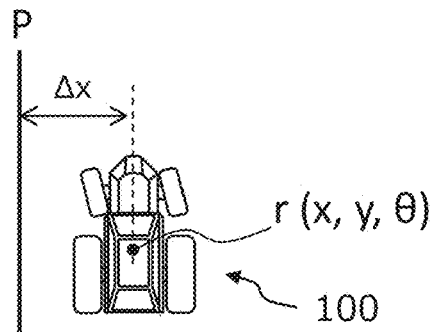
FIG. 9B is a diagram showing an example of the work vehicle at a position which is shifted rightward from the target path P.
Figure 9C:
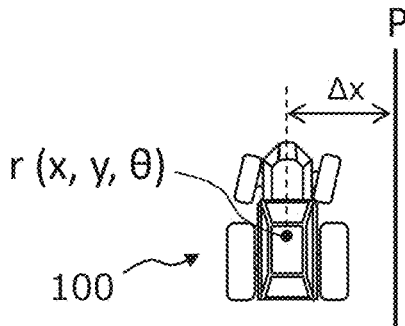
FIG. 9C is a diagram showing an example of the work vehicle at a position which is shifted leftward from the target path P.
Figure 9D:
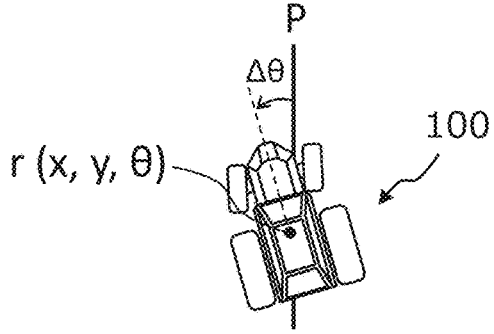
FIG. 9D is a diagram showing an example of the work vehicle oriented in an inclined direction with respect to the target path P.

FIG. 9A is a diagram showing an example of the work vehicle 100 traveling along a target path P. FIG. 9B is a diagram showing an example of the work vehicle 100 at a position which is shifted rightward from the target path P. FIG. 9C is a diagram showing an example of the work vehicle 100 at a position which is shifted leftward from the target path P. FIG. 9D is a diagram showing an example of the work vehicle 100 oriented in an inclined direction with respect to the target path P. In these figures, the pose, i.e., the position and orientation, of the work vehicle 100 as measured by the GNSS unit 110 is expressed as r(x, y, θ). Herein, (x, y) are coordinates representing the position of a reference point on the work vehicle 100 in an XY coordinate system, which is a two-dimensional coordinate system fixed to the globe. In the examples shown in FIGS. 9A to 9D, the reference point on the work vehicle 100 is at a position, on the cabin, where a GNSS antenna is disposed, but the reference point may be at any arbitrary position. θ is an angle representing the measured orientation of the work vehicle 100. Although the target path P is shown parallel to the Y axis in the examples illustrated in these figures, the target path P may not necessarily be parallel to the Y axis, in general.

As shown in FIG. 9A, in the case where the position and orientation of the work vehicle 100 are not deviated from the target path P, the controller 180 maintains the steering angle and speed of the work vehicle 100 without changing them.

As shown in FIG. 9B, when the position of the work vehicle 100 is shifted rightward from the target path P, the controller 180 changes the steering angle so that the traveling direction of the work vehicle 100 will be inclined leftward, thus bringing the work vehicle 100 closer to the path P. Herein, not only the steering angle but also the speed may be changed. The magnitude of the steering angle may be adjusted in accordance with the magnitude of a positional deviation Δx, for example.

As shown in FIG. 9C, when the position of the work vehicle 100 is shifted leftward from the target path P, the controller 180 changes the steering angle so that the traveling direction of the work vehicle 100 will be inclined rightward, thus bringing the work vehicle 100 closer to the path P. In this case, too, not only the steering angle but also the speed may be changed. The amount of change of the steering angle may be adjusted in accordance with the magnitude of the positional deviation Δx, for example.

As shown in FIG. 9D, in the case where the position of the work vehicle 100 is not considerably deviated from the target path P but its orientation is nonetheless different from the direction of the target path P, the controller 180 changes the steering angle so that the directional deviation Δθ will become smaller. In this case, too, not only the steering angle but also the speed may be changed. The magnitude of the steering angle may be adjusted in accordance with the magnitudes of the positional deviation Δx and the directional deviation Δθ, for example. For instance, the amount of change of the steering angle (which is in accordance with the directional deviation Δθ) may be increased as the absolute value of the positional deviation Δx decreases. When the positional deviation Δx has a large absolute value, the steering angle will be changed greatly in order for the work vehicle 100 to return to the path P, so that the directional deviation Δθ will inevitably have a large absolute value. Conversely, when the positional deviation Δx has a small absolute value, the directional deviation Δθ needs to become closer to zero. Therefore, it may be advantageous to introduce a relatively large weight (i.e., control gain) for the directional deviation Δθ in determining the steering angle.

For the steering control and speed control of the work vehicle 100, control techniques such as PID control or MPC (Model Predictive Control) may be applied. Applying these control techniques will make for smoothness of the control of bringing the work vehicle 100 closer to the target path P.

It should be noted that when an obstacle is detected by one or more obstacle sensors 130 during travel, the controller 180 halts the work vehicle 100. At this point, the controller 180 may cause the buzzer 220 to present an alarm sound or may transmit an alert signal to the terminal device 400. In the case where the obstacle is avoidable, the controller 180 may be configured or programmed to control the drive device 240 such that the obstacle is avoided.

The work vehicle 100 according to the present example embodiment can perform self-traveling outside a field as well as inside the field. Outside the field, the controller 180 is able to detect an object located at a relatively distant position from the work vehicle 100 (e.g., another vehicle, a pedestrian, etc.) based on data output from the cameras 120 or the LiDAR sensor 140. The controller 180 is configured or programmed to generate a local path such that the local path avoids the detected object, and performs speed control and steering control along the local path. In this manner, self-traveling on a road outside the field can be realized.

Figure 10:
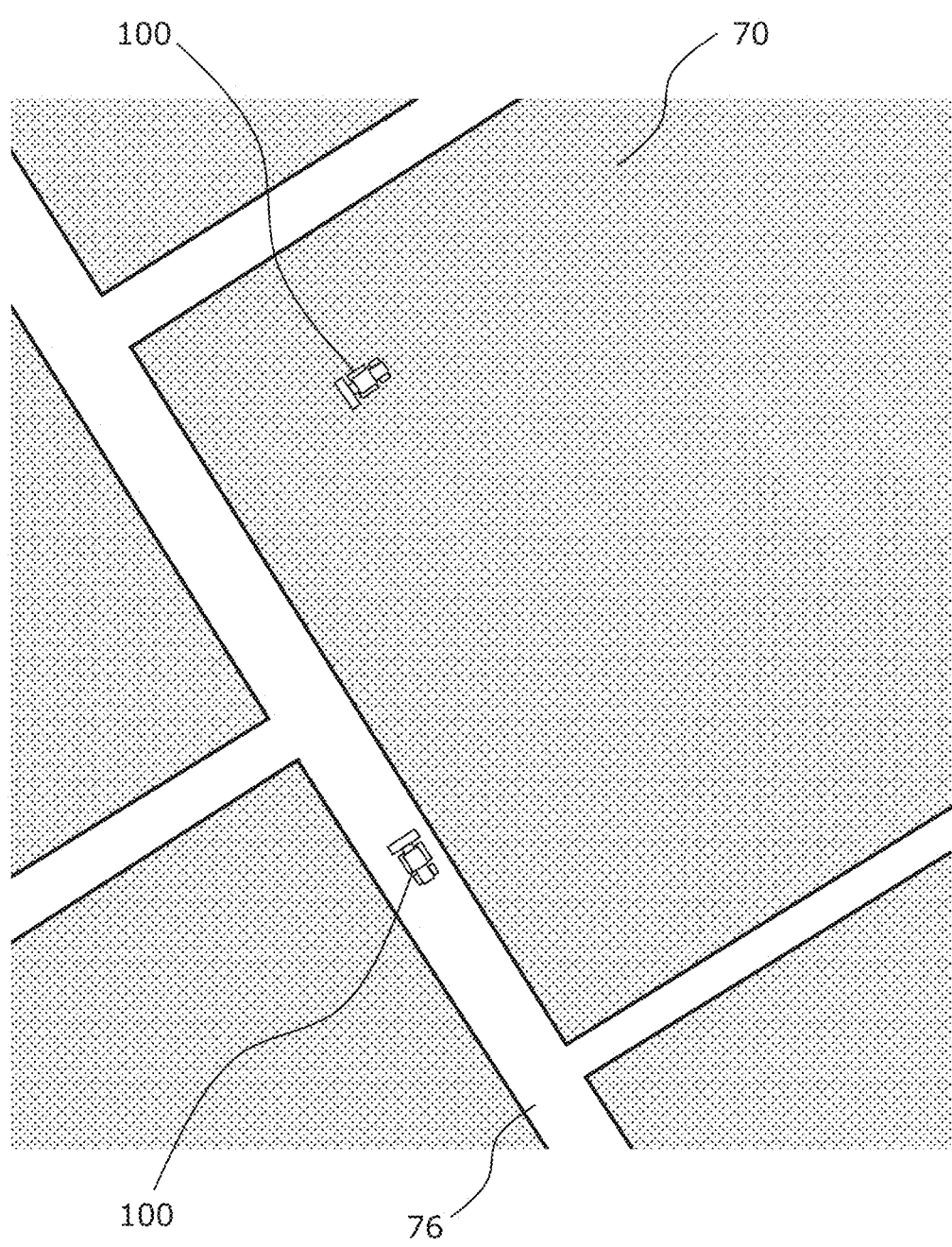
FIG. 10 is a diagram schematically showing an example of state where a plurality of the work vehicles are automatically traveling inside the field and on a road outside the field.

As described above, the work vehicle 100 according to the present example embodiment can automatically travel inside the field and outside the field in an unmanned manner. FIG. 10 is a diagram schematically showing an example of state where a plurality of the work vehicles 100 are performing self-traveling inside a field 70 and on a road 76 outside the field 70. In the storage 170, an environment map of a region including a plurality of fields and roads around the fields, and a target path, are recorded. The environment map and the target path may be generated by the management device 600 or the ECU 185. In the case of traveling on a road, the work vehicle 100 travels along the target path while sensing the surroundings thereof by use of the sensing devices such as the cameras 120 and the LiDAR sensor 140, with the implement 300 being raised. During travel, the controller 180 consecutively generates a local path and causes the work vehicle 100 to travel along the local path. This allows the work vehicle 100 to perform self-traveling while avoiding obstacles. During travel, the target path may be changed in accordance with the state.

Next, operation of the work vehicle 100 related to remotely-manipulated traveling will be described.

In the present example embodiment, the storage 170 stores the position of at least one permitted area in which remotely-manipulated traveling is permitted. Each permitted area may be a conditionally permitted area in which remotely-manipulated traveling is permitted conditionally or an unconditionally permitted area in which remote traveling is permitted unconditionally. It is previously determined what area corresponds to what type of permitted area, and a permission condition(s) for remotely-manipulated traveling in each conditionally permitted area is previously set. These pieces of information may be recorded in the storage 170. When the work vehicle 100 performs self-traveling in self-traveling areas as in the present example embodiment, the entirety of a self-traveling area may be automatically set as a permitted area. Alternatively, a portion of a self-traveling area may be set as a permitted area. The user (i.e., the operator) may set permitted areas and a permission condition for each permitted area using the terminal device 400.

When, in the remote manipulation mode, a condition under which remotely-manipulated traveling is permitted is not satisfied in a certain permitted area, the controller 180 disables the remote manipulation to cause the work vehicle 100 to travel in that permitted area. For example, when a state of the work vehicle 100 or a type or state of the implement 300 does not satisfy a permission condition for remotely-manipulated traveling in that permitted area, the controller 180 disables the remote manipulation to cause the work vehicle 100 to travel in that permitted area. Such operation can limit remotely-manipulated traveling in a situation that it is inappropriate for the work vehicle 100 to travel in that permitted area. For example, when the work vehicle 100 is holding the implement 300 at a lower position for agricultural work or when the work vehicle 100 is supplying power to the implement 300, remotely-manipulated traveling may be disabled in permitted areas that are set in public roads. Alternatively, the remote manipulation to cause the work vehicle 100 to enter a permitted area that is set in a field for which agricultural work is not scheduled in a certain work day may be disabled.

The controller 180 can obtain positional information of the work vehicle 100 from a positioning device that determines the position of the work vehicle 100, such as the GNSS unit 110, and based on the positional information, identifies an area in which the work vehicle 100 is located. As a result, the controller 180 can determine what permitted area the work vehicle 100 is located in, or whether or not the work vehicle 100 is located in a forbidden area. Positioning may be performed using the LiDAR sensor 140 or the camera 120 instead of the GNSS unit 110. In that case, the LiDAR sensor 140 or the camera 120 may serve as a portion of the positioning device.

The storage 170 may further store the positions of forbidden areas in which remotely-manipulated traveling is forbidden, in addition to the positions of permitted areas. Alternatively, areas other than permitted areas may be processed as a forbidden area. Even in the case in which the positions of only permitted areas are stored and the positions of forbidden areas are not explicitly stored, then if areas other than permitted areas are processed as a forbidden area, it is considered that the storage 170 stores (indirectly) the positions of forbidden areas. Areas in which the work vehicle 100 is not supposed to travel may be set as a forbidden area. For example, regions on both sides of roads in which vehicles are not allowed to travel, ridges around fields, waterways, high-traffic roads, roads far away from fields, private lands such as fields that are not managed by the user of the work vehicle 100, and the like may be set as a forbidden area. When the remote manipulation to cause the work vehicle 100 to enter a forbidden area is performed, the controller 180 disables that remote manipulation. As a result, remotely-manipulated traveling can be prevented in forbidden areas.

When remote manipulation is disabled, the controller 180 controls the work vehicle 100 such that the work vehicle 100 stops, for example. As a result, when the remote manipulation to cause the work vehicle 100 to enter an area in which remotely-manipulated traveling is not permitted (i.e., for-bidden areas or a portion of conditionally permitted areas) is performed, the work vehicle 100 is stopped and prevented from traveling further inside.

In the present example embodiment, the controller 180 can operate in the self-traveling mode in which the work vehicle 100 is caused to perform self-traveling in self-traveling areas and the remote manipulation mode in which travel of the work vehicle 100 is controlled by remote manipulation. The controller 180 may set at least a portion of a self-traveling area as a permitted area, set an area outside the self-traveling area as a forbidden area, and cause the storage 170 to store the positions of the permitted area and the position of the forbidden area. As a result, the work vehicle 100 can be prevented from being caused by remote manipulation to unnecessarily enter areas in which self-traveling is not scheduled.

In the remote manipulation mode, the controller 180 may cause the display 430 of the terminal device 400 to display an image indicating an area in which remotely-manipulated traveling is not permitted. For example, the controller 180 may cause the display 430 to display a conditionally per-mitted area in which remotely-manipulated traveling is not currently permitted, or a forbidden area. A conditionally permitted area in which remotely-manipulated traveling is not permitted may, for example, be determined, depending on a state of the work vehicle 100 or a type or state of the implement 300. The controller 180 may cause the display 430 to display a conditionally permitted area in which remotely-manipulated traveling is not permitted, and a for-bidden area, in such a manner that these types of areas can be distinguished from each other. As a result, a user (i.e., an operator) who performs monitoring using the terminal device 400 can recognize an area in which the work vehicle 100 is not allowed to travel.

The controller 180 may cause the display 430 to display an image in which display of an area in which remotely-manipulated traveling is not permitted overlays a camera image captured by the camera 120 mounted on the work vehicle 100. For example, the controller 180 may cause the display 430 to display an image in which display of a conditionally permitted area in which remotely-manipulated traveling is not currently permitted and which is determined, depending on a state of the work vehicle 100 or a type or state of the implement 300, or a forbidden area, overlays a camera image. As a result, the operator can recognize a state of surroundings of the work vehicle 100 and the position of an area in which remotely-manipulated traveling is not permitted while viewing an image (e.g., moving images) displayed on the display 430. The operator can, for example, cause the work vehicle 100 to travel, avoiding that area, by performing remote manipulation while viewing the dis-played image.

The controller 180 may the display 430 of the terminal device 400 used by the operator who performs remote manipulation to display a warning when the remote manipu-lation to cause the work vehicle 100 to enter an area in which remotely-manipulated traveling is not permitted (a condi-tionally permitted area or a forbidden area) is performed. For example, the message "DO NOT ENTER THIS AREA" may be displayed, or display of an area which the work vehicle 100 is trying to enter may be changed into a noticeable color or may be flickered, whereby the operator is warned. When viewing the warning, the operator can, for example, perform manipulation to cause the work vehicle 100 to move backward (by reverse motion) to a permitted area in which remotely-manipulated traveling is permitted, or manipulation of changing a state of the work vehicle 100 or the implement 300 to that which satisfies a permission condition. Alternatively, the operator can also contact a worker who is located near the work vehicle 100, and cause the worker to change a state of the work vehicle 100 or the implement 300 or replace the implement 300. When, after remote manipulation is disabled, a state of the work vehicle 100 or a type or state of the implement 300 is changed to that which satisfies a condition under which remotely-manipu-lated traveling is permitted in that permitted area, the controller 180 may enable the remote manipulation to cause the work vehicle 100 to travel in that permitted area.

The storage 170 may store the positions of a plurality of permitted areas having different conditions under which remotely-manipulated traveling is permitted. In that case, the storage 170 may further store a condition under which remotely-manipulated traveling is permitted for each of the plurality of permitted areas. When, in each of the plurality of permitted areas, a state of the work vehicle 100 or a type or state of the implement 300 does not satisfy a condition under which remotely-manipulated traveling is permitted in the permitted area, the controller 180 disables the remote manipulation to cause the work vehicle 100 to travel in the permitted area. As a result, for example, different permission conditions can be set for fields and agricultural roads, and a plurality of permitted areas having different permission conditions can be set in a single field.

The plurality of permitted areas may include a first permitted area and a second permitted area that are adjacent to each other. In that case, when a state of the work vehicle 100 or a type or state of the implement 300 satisfies a first condition under which remotely-manipulated traveling is permitted in the first permitted area, and does not satisfy a second condition under which remotely-manipulated trav-eling is permitted in the second permitted area, the controller 180 disables the remote manipulation to cause the work vehicle 100 to enter from the first permitted area into the second permitted area. As a result, the work vehicle 100 can be prevented from entering from the first permitted area into the second permitted area when a state of the work vehicle 100 or the implement 300 is not suitable for traveling in the second permitted area.

The plurality of permitted areas may include a first permitted area inside a field and a second permitted area outside the field. For example, the entirety of a field includ-ing an entrance or exit referred an (collectively to as an "entrance/exit") may be set as the first permitted area, and a road adjacent to the entrance/exit may be set as the second permitted area. In that case, when a state of the work vehicle 100 or a type or state of the implement 300 satisfies a first condition under which remotely-manipulated traveling is permitted inside a field and does not satisfy a second condition under which remotely-manipulated traveling is permitted outside the field, the controller 180 disables the remote manipulation to cause the work vehicle 100 to enter from the first permitted area inside the field into the second permitted area outside the field. As a result, when a state of the work vehicle 100 or the implement 300 is not suitable for traveling on roads outside the field, the work vehicle 100 can be prevented from moving out of the field.

In the present example embodiment, an agricultural machine is the work vehicle 100 to which an implement is attached. When the work vehicle 100 is holding the imple-ment 300 at a height lower than a reference height or the work vehicle 100 is supplying power to the implement 300, the controller 180 may determine that a state of the work vehicle 100 does not satisfy the second condition. In that case, the controller 180 disables the remote manipulation to cause the work vehicle 100 to enter from a first permitted area inside a field into a second permitted area outside the field. The state of the work vehicle 100 in which the implement 300 is held at a height lower than the reference height may, for example, be a state in which the height of the linkage portion between the three-point hitch of the work vehicle 100 and the implement 300 is lower than a preset reference height. The state of the work vehicle 100 in which the work vehicle 100 is supplying power to the implement 300 may, for example, a state in which the PTO shaft of the work vehicle 100 is rotating, so that the implement 300 is operating. By law, the work vehicle 100 in such states may not be allowed to travel on public roads outside fields. Therefore, the controller 180 may disable the remote manipulation to cause the work vehicle 100 in such states to travel on public roads outside fields.

The storage 170 may further store a type of an implement that is suitable for agricultural work that is scheduled in a field. When a type of the implement 300 attached to the work vehicle 100 is not suitable for agricultural work that is scheduled in a field, the controller 180 may disable the remote manipulation to cause the agricultural machine to enter from a second permitted area outside the field into a first permitted area in the field. As a result, the work vehicle 100 to which the implement 300 suitable for agricultural work that is scheduled in a field is not attached can be prevented from unnecessarily entering the field. Information indicating agricultural work that is scheduled in a field and a type of an implement that is suitable for the agricultural work may, for example, be included in a work plan generated by the management device 600. The controller 180 can identify agricultural work that is scheduled in a field at a certain date and time and the type of an implement suitable for the agricultural work with reference to the work plan.

The plurality of permitted areas in which remotely-manipulated traveling is permitted conditionally may include a third permitted area in which remotely-manipulated traveling is permitted only when a width of the implement 300 is in a particular range. When the width of the implement 300 is not in the particular range, the controller 180 may disable the remote manipulation to cause the work vehicle 100 to travel in the third permitted area. For example, if, only when the width of the implement 300 is smaller than a predetermined reference value, the work vehicle 100 to which the implement 300 is attached is allowed by law to travel on public roads, public roads may be set as the third permitted area. In that case, when the width of the implement 300 is smaller than the reference value, the condition that the width is "in the particular range" is satisfied. The controller 180 can, for example, obtain information about the width of the implement 300 by communication that is performed between the work vehicle 100 and the implement 300 in accordance with the ISOBUS standard.

The third permitted area may be located at an outer periphery of a field. The outer periphery of a field is an area in the field that is at or near a boundary between the field and the outside of the field. If the width of the implement 300 is great, then when the work vehicle 100 is located at the outer periphery of the field, a portion of the implement 300 may stick out of the field. To address such a problem, the outer periphery of a field is set as the third permitted area, and it is effective to permit remotely-manipulated traveling in the third permitted area only when the width of the implement 300 is in the particular range (e.g., lower than a threshold).

A width of an area at the outer periphery of a field that is set as the third permitted area may be determined, depending on a type of an implement used.

Some types of implements have a variable width. The width of such an implement 300 may be changed by operating the terminal device 400. If an implement 300 has a variable width, then when the width of the implement 300 is increased, an end of the implement 300 may stick out of a field, or hit an obstacle. To address such a problem, if an increase in the width of an implement 300 would cause an end of the implement 300 to stick out of a field or hit an obstacle, the controller 180 may disable the remote manipulation of increasing the width of the implement 300. As a result, it is possible to prevent an end of an implement 300 from sticking out of a field or hit an obstacle when the width of the implement 300 is increased by remote manipulation. The controller 180 can determine whether or not an end of an implement 300 will stick out of a field or hit an obstacle when the width of the implement 300 is increased, based on the results of positioning using the GNSS unit 110 and sensing using the camera 120 and the LiDAR sensor 140.

In the present example embodiment, the work vehicle 100 is a tractor that is capable of removing the linkage of the left and right brakes. For example, when the linkage of the left and right brakes is removed, turning with a small turning radius can be performed by applying the brakes only to the inner wheel during turning. Meanwhile, when the brakes are accidentally applied to only one of the left and right wheels, sudden sharp turning may occur. Therefore, in particular, when the work vehicle 100 travels on roads outside fields, the left and right brakes are preferably linked together. To this end, when the linkage of the left and right brakes of the work vehicle 100 is removed, the controller 180 may determine that a state of the work vehicle 100 does not satisfy the second condition, and disable the remote manipulation to cause the work vehicle 100 to enter from a first permitted area inside a field to a second permitted area outside the field. As a result, sharp turning can be prevented from occurring on roads outside fields during remote manipulation.

Conversely, when a state of the work vehicle 100 or a type or state of the implement 300 does not satisfy the first condition under which remotely-manipulated traveling is permitted in a field, the controller 180 may disable the remote manipulation to cause the work vehicle 100 to enter from a second permitted area outside a field into a first permitted area in the field. For example, when an implement 300 required for agricultural work scheduled in a field is not attached to the work vehicle 100, the remote manipulation to cause the work vehicle 100 to enter a first permitted area in the field may be disabled. As a result, the work vehicle 100 can be prevented from unnecessarily entering a field in which agricultural work is not scheduled.

The storage 170 may further store dates and times at which the work vehicle 100 is scheduled to perform agricultural work in fields. The dates and times at which the work vehicle 100 is scheduled to perform agricultural work in fields may be recorded as data of a schedule in the work plan. The controller 180 may disable the remote manipulation to cause the work vehicle 100 to enter first permitted areas in the fields during period of times other than a limited period of time including the scheduled dates and times. As a result, the work vehicle 100 can be prevented from unnecessarily entering the fields at dates and times that are not included in the above period of time.

In the present example embodiment, the work vehicle 100 can switch between two-wheel drive and four-wheel drive.

The plurality of permitted areas in which remotely-manipulated traveling is permitted conditionally may include a first permitted area excluding an exit in a field, and a second permitted area including an exit in a field. A field may be provided at a low position compared to roads around the field. In that case, the exit of the field may include an ascending slope. Four-wheel drive is suitable for traveling on ascending slopes. In this regard, the controller 180 may disable the remote manipulation to cause the work vehicle 100 to enter from a first permitted area excluding an exit in a field to a second permitted area including an exit in the field when the work vehicle 100 is in the two-wheel drive state. Thus, the work vehicle 100 is allowed to enter a second permitted area including an exit only when the work vehicle 100 is in the four-wheel drive state. As a result, the work vehicle 100 can be prevented from entering a steep ascending slope and failing to go over the slope during remote manipulation when the work vehicle 100 is in the two-wheel drive state.

In the present example embodiment, the work vehicle 100 is a tractor to which an implement 300 is attached at a rear portion thereof. The work vehicle 100 thus configured has a barycenter closer to the back of the work vehicle 100 than when the implement 300 is not attached to the work vehicle 100. As a result, when the work vehicle 100 has an attempt to travel on a steep ascending slope, the front wheels 104F may be raised, so that the work vehicle 100 cannot go over the ascending slope. In that case, the work vehicle 100 is caused to travel on such an ascending slope backward (by reverse motion). To this end, when the remote manipulation to cause the work vehicle 100 to travel forward and enter an ascending slope having a slope angle greater than or equal to a predetermined angle is performed, the controller 180 may disable the remote manipulation and stop the work vehicle 100. Meanwhile, when the remote manipulation to cause the work vehicle 100 to travel backward and enter an ascending slope having a slope angle greater than or equal to the predetermined angle is performed, the controller 180 may cause the work vehicle 100 to travel on the ascending slope backward in accordance with the remote manipulation. The position of an ascending slope having a slope angle greater than or equal to a predetermined angle may be previously recorded in the storage 170. The controller 180 can detect that the work vehicle 100 is traveling toward an ascending slope, based on the position of the ascending slope previously recorded, and information about the position and orientation of the work vehicle 100 obtained from a positioning device such as the GNSS unit 110. Such an ascending slope may be located at various places such as areas at or near exits of fields, and agricultural roads.

In the case in which a permitted area includes a field, and an exit of the field has an ascending slope having a slope angle greater than or equal to a predetermined angle, then when the remote manipulation to cause the work vehicle 100 to travel forward and enter the ascending slope at the exit, the controller 180 may disable the remote manipulation and stop the work vehicle 100. Meanwhile, when the remote manipulation to cause the work vehicle 100 to travel backward and enter the ascending slope at the exit, the controller 180 may cause the work vehicle 100 to move backward on the ascending slope in accordance with the remote manipulation. As a result, it is possible to avoid a situation in which when the work vehicle 100 travels forward on a steep ascending slope at an exit of a field, the front wheels 104F are raised, so that the work vehicle 100 cannot go over the ascending slope.

The controller 180 may set, as a forbidden area, a range in which the distance from a tree trunk included in a self-traveling area is smaller than or equal to a predetermined distance. A tree trunk existing in a self-traveling area may, for example, be previously detected by a sensing device such as the camera 120 or the LiDAR sensor 140, or a sensing device included in a mobile body other than the work vehicle 100. Each detected tree position may be recorded in the storage 170. The controller 180 may set, as a forbidden area, a range within a predetermined distance (e.g., about 1 to 3 meters)) from the previously recorded tree trunk positions. As a result, the work vehicle 100 can be prevented from colliding with a tree during remote manipulation.

The controller 180 may set, as a forbidden area, an area in which there are crop rows or earthed-up ridges in a field included in a self-traveling area. Crop rows or earthed-up ridges may, for example, be detected by the camera 120 or a camera included in a mobile body other than the work vehicle 100. By setting the detected area in which there are crop rows or earthed-up ridges as a forbidden area, the controller 180 can prevent the work vehicle 100 from trampling crop rows or earthed-up ridges during remote manipulation.

The controller 180 can generate a target path for self-traveling in fields and on roads around fields. In the self-traveling mode, the controller 180 can cause the work vehicle 100 to perform self-traveling with an area specified by a field(s) and a road(s) in which a target path is generated as a self-traveling area.

Besides permitted areas in which remotely-manipulated traveling is permitted, a limited area in which remotely-manipulated traveling is permitted with a limitation imposed thereon may be set. "Remotely-manipulated traveling is permitted with a limitation imposed thereon" means that remotely-manipulated traveling is allowed, but a limitation is imposed on the operation. For example, in limited areas, a limitation may be imposed on traveling speed, the number of revolutions of an engine, the operation of an implement, or the like during remote manipulation.

In such an example embodiment, the storage 170 may store the position of a permitted area in which remotely-manipulated traveling is permitted and the position of a limited area in which remotely-manipulated traveling is permitted with a limitation imposed thereon. In this case, permitted areas may be either a conditionally permitted area or an unconditionally permitted area. When the remote manipulation to cause the work vehicle 100 to perform enter from a permitted area into a limited area is performed, the controller 180 limits the operation of the work vehicle 100 caused by remote manipulation.

Limited areas may, for example, be set in fields or on roads around fields. Limited areas may, for example, be set in areas in which it is inappropriate for the work vehicle 100 to travel at high speed, make a loud noise, or travel with the implement 300 held at a lower position. The positions of limited areas may be stored in the storage 170 in association with details of operation limitations on the limited areas.

For example, when the remote manipulation to cause the work vehicle 100 to enter a limited area is performed, the controller 180 may limit the traveling speed of the work vehicle 100. As a result, the traveling speed of the work vehicle 100 in a limited area can be limited to at most the speed limit. For example, in the case in which a limited area is located in a field, then when the remote manipulation to cause the work vehicle 100 to enter the limited area in the field is performed, the controller 180 may limit the traveling speed of the work vehicle 100 to a speed suitable for agricultural work scheduled in the field.

The speed suitable for agricultural work scheduled in a field may be set for each type of agricultural work, and information about that may be recorded in the storage 170. For example, different speed limits may be set for different types of agricultural work, such as tilling, seeding, manure spreading, preventive pest control, or harvesting. Agricultural work scheduled in a field may be recorded in a work plan generated by the management device 600.

When the remote manipulation to cause the work vehicle 100 to enter a limited area is performed, the controller 180 may limit the number of revolutions of the engine of the work vehicle 100. For example, when a limited area includes a road or field around at least one of a house and a livestock barn, and the remote manipulation to cause the work vehicle 100 to enter the limited area is performed, the controller 180 may limit the number of revolutions of the engine of the work vehicle 100. It is inappropriate for the work vehicle 100 to travel while making a loud noise around houses and livestock barns. Therefore, it is effective to limit the number of revolutions of the engine to at most a predetermined value to reduce noise on roads around houses and livestock barns.

When the remote manipulation to cause the work vehicle 100 to enter a limited area is performed, the controller 180 may limit the operation of the implement 300 attached to the work vehicle 100. For example, when the work vehicle 100 is located in a limited area, the controller 180 may disable the remote manipulation of reducing the height of the implement 300 to a height lower than a predetermined height. Such a configuration is effective, particularly when a limited area is set in a road outside a field. When the work vehicle 100 travels on a road with the implement 300 held at a lower height, a problem that the implement 300 is in contact with the road surface may occur, for example. To avoid such a problem, it is effective to disable the remote manipulation of reducing the height of the implement 300 to a height lower than a predetermined height in a limited area set in a road outside a field.

The controller 180 may change a limitation on the operation of the work vehicle 100, depending on the position of the work vehicle 100 in a limited area. The storage 170 may store a table specifying a correspondence relationship between positions in limited areas and limitations on the operation of the work vehicle 100. The controller 180 may determine limitations on the operation of the work vehicle 100 based on such a table.

The controller 180 may cause the display 430 of a terminal device used by the operator to display information indicating a type of an operator who is permitted to perform remote manipulation, depending on the position of the work vehicle 100.

In the remote manipulation mode, the controller 180 may cause the display 430 of the terminal device 400 used by an operator who performs remote manipulation to display an image indicating a limited area. For example, the controller 180 may cause the display 430 to display an image in which display of a limited area overlays an image captured by a camera mounted on the work vehicle 100. As a result, the operator can know what area is a limited area, based on the displayed image.

When the remote manipulation to cause the work vehicle 100 to enter a limited area is performed, the controller 180 may cause the display 430 of a terminal device used by an operator who performs remote manipulation to display a warning. As a result, the operator can know that the work vehicle 100 has entered a limited area, based on the warning.

The controller 180 may set the outside of a self-traveling area as a forbidden area in which remotely-manipulated traveling is not permitted, and set at least a portion of the self-traveling area as a permitted area or limited area. As a result, the work vehicle 100 can be caused to travel in the self-traveling area by remote manipulation.

Next, operation of the controller 180 in the remote manipulation mode will be more specifically described with reference to FIG. 11.

FIG. 11 is a diagram showing an example of setting of a permitted area in an environment in which the work vehicle 100 travels. FIG. 11 shows an example of an environment map including a plurality of fields 70 in which the work vehicle 100 performs agricultural work, and roads 76 around the fields 70. The environment map shown in FIG. 11 indicates a storage place 90 for the work vehicle 100, and a waiting place 96 where the work vehicle 100 temporarily waits. The storage place 90 and the waiting place 96 are optionally set.

In the example shown in FIG. 11, two types of permitted areas (i.e., first permitted areas and second permitted areas) having different permission conditions for remotely-manipulated traveling are set. The first permitted areas are set in a portion of the fields 70 in which the work vehicle 100 performs agricultural work. The second permitted areas are set in a portion of the roads 76 in which the work vehicle 100 may travel. In FIG. 11, the first permitted areas are represented by a dotted pattern, and the second permitted areas are represented by a hatching pattern. Areas other than these permitted areas may be processed as a forbidden area.

The map shown in FIG. 11 may, for example, be displayed on the operation terminal 200 or the display 430 of the terminal device 400. The user can recognize the positions of each permitted area and each forbidden area while viewing the displayed map. The user can set permitted areas and forbidden areas while viewing the displayed map.

In this example, the storage 170 stores the positions of the first permitted areas in the field 70, the second permitted areas on the roads 76, and a permission condition for remotely-manipulated traveling in each permitted area. The position of each permitted area and the permission condition for each permitted area may, for example, be set by the user operating the operation terminal 200 or the terminal device 400. Alternatively, the position of each permitted area and the permission condition for each permitted area may be automatically determined by the controller 180 based on a work plan created by the management device 600. For example, the controller 180 may determine a portion of self-traveling areas delimited by a target path generated based on a work plan that are included in the fields 70, as the first permitted areas, and a portion of the self-traveling areas that are included in the roads 76 outside the fields 70, as the second permitted areas.

FIG. 12 is a table showing an example of permission conditions for remotely-manipulated traveling in each of the first permitted area and the second permitted area. In this example, remotely-manipulated traveling may be permitted in the first permitted area set in the field 70 if conditions (a1) and (a2) below are satisfied.

(a1) An implement 300 suitable for agricultural work scheduled in the field 70 is attached to the work vehicle 100.

(a2) The current date and time are within a scheduled period of time including the scheduled dates and times of agricultural work specified in a work plan.

Concerning condition (a1), the type of an implement 300 suitable for agricultural work performed by the work vehicle 100 in each field 70 is previously recorded in the storage 170. The controller 180 determines whether or not the type of an implement 300 attached to the work vehicle 100 is suitable for agricultural work scheduled in the field 70, with reference to data recorded in the storage 170. If the type of an implement 300 is not suitable for agricultural work scheduled in the field 70, the controller 180 disables the remote manipulation to cause the work vehicle 100 to enter the first permitted area in the field 70. In other words, even when the remote manipulation to cause the work vehicle 100 to enter from the road 76 into the field 70, the controller 180 ignores the remote manipulation, and stops the work vehicle 100 before an entrance of the field 70, for example.

Concerning condition (a2), a work plan specifies a schedule of agricultural work that is to be performed by the work vehicle 100. FIG. 13 shows an example of a work plan. The work plan shown in FIG. 13 may include information indicating the dates and times, fields, tasks, and the types of implements used that are specified for scheduled agricultural work, for each registered agricultural machine including the work vehicle 100. Such a work plan may be created by the processor 660 of the management device 600. The processor 660 is configured or programmed to generate a target path for the work vehicle 100 along a road on a map in accordance with a work plan. The controller 180 of the work vehicle 100 downloads data of the work plan and data of the target path from the management device 600, and stores these pieces of data into the storage 170. In the self-traveling mode, the work vehicle 100 automatically travels along the target path in accordance with the schedule indicated by the work plan. The controller 180 may be configured or programmed to permit remotely-manipulated traveling in each field 70 only during a relatively short period of time (e.g., several hours, several tens of hours, several days, or several weeks) including the scheduled period of time of agricultural work specified in the work plan.

In the example shown in FIG. 12, remotely-manipulated traveling may be permitted in the second permitted area set in the road 76 if all conditions (b1) to (b3) below are satisfied.

(b1) The work vehicle 100 is holding the implement 300 at a height greater than or equal to a reference height.

(b2) The supply of power from the work vehicle 100 to the implement 300 is stopped.

(b3) The left and right brakes of the work vehicle 100 are linked together.

Concerning condition (b1), when the implement 300 is held at a low position, e.g., the three-point hitch is lowered, the implement 300 may be partially in contact with the road, or lighting devices of the work vehicle 100 may be hidden and may not be seen from other vehicles, so that a safety standard specified in a law may not be satisfied. Therefore, in the example of FIG. 12, when the work vehicle 100 is holding the implement 300 at a height lower than the reference height, the controller 180 disables remotely-manipulated traveling in the second permitted area set in the road 76. In this case, the remote manipulation to cause the work vehicle 100 to enter from an exit of the field 70 into the road 76 is disabled, so that the work vehicle 100 stops at or near the boundary between the exit and the road 76.

Concerning condition (b2), it is inappropriate for the work vehicle 100 to travel on the road 76 with the implement 300 driven with power supplied from the work vehicle 100, e.g., with PTO on. Therefore, in the second permitted area on the road 76, for example, a permission condition for remotely-manipulated traveling may be that PTO is off and the supply of power to the implement 300 is stopped.

Concerning condition (b3), the work vehicle 100 can apply brakes to the left and right wheels separately in order to perform turning with a small turning radius at headlands in fields and the like. This state is referred to as "the linkage of the left and right brakes is removed". Meanwhile, on the road 76, the left and right brakes are desirably linked together so as not to apply brakes to only one of the left and right sides, so that sudden sharp turning is avoided. Therefore, for the road 76, a permission condition for remotely-manipulated traveling may be that the left and right brakes are linked together.

By imposing the conditions shown in FIG. 12, remotely-manipulated traveling is permitted in the first permitted area of the field 70 and the second permitted area of the road 76 only when the work vehicle 100 or the implement 300 is in the appropriate state. As a result, in the remote manipulation mode, the work vehicle 100 can be prevented from entering areas in which it is inappropriate for the work vehicle 100 to travel.

Next, an example of operation of switching between the self-traveling mode and the remotely-manipulated traveling mode will be described.

In the present example embodiment, the work vehicle 100 automatically travels and performs agricultural work in fields 70 in accordance with a previously created work plan and target path, for each work day. In the example of FIG. 11, the work vehicle 100 leaves the storage place 90, automatically travels along roads 76, enters a plurality of fields 70, performs predetermined agricultural work on each field 70, and thereafter, moves to the waiting place 96. On the next work day, the work vehicle 100 leaves the waiting place 96, automatically travels along roads 76, sequentially enters another plurality of fields 70, performs agricultural work, and moves to the waiting place 96 or another waiting place, or the storage place 90, in accordance with the work plan again. Such operation may be performed for each work day. Although, in this example, the storage place 90 and the waiting place 96 are provided at different places, the waiting place 96 may not be provided. In that case, the work vehicle 100 moves back to the storage place 90 after completing all agricultural work for a day. Alternatively, a plurality of waiting places 96 may be provided at different places. By provided one or more waiting places 96, agricultural work can be more efficiently performed on fields 70 scattered in a wide range.

When the work vehicle 100 is performing self-traveling, the user can perform remote monitoring and remote manipulation on the work vehicle 100 using the terminal device 400. When the work vehicle 100 is performing self-traveling, the controller 180 transmits an image (e.g., moving images) captured by at least one camera 120 mounted on the work vehicle 100 to the terminal device 400 through the communication device 190. The terminal device 400 causes the display 430 to display the image. The user can check a state of surroundings of the work vehicle 100 and optionally start remotely-manipulated traveling while viewing the displayed image.

Figure 14A:
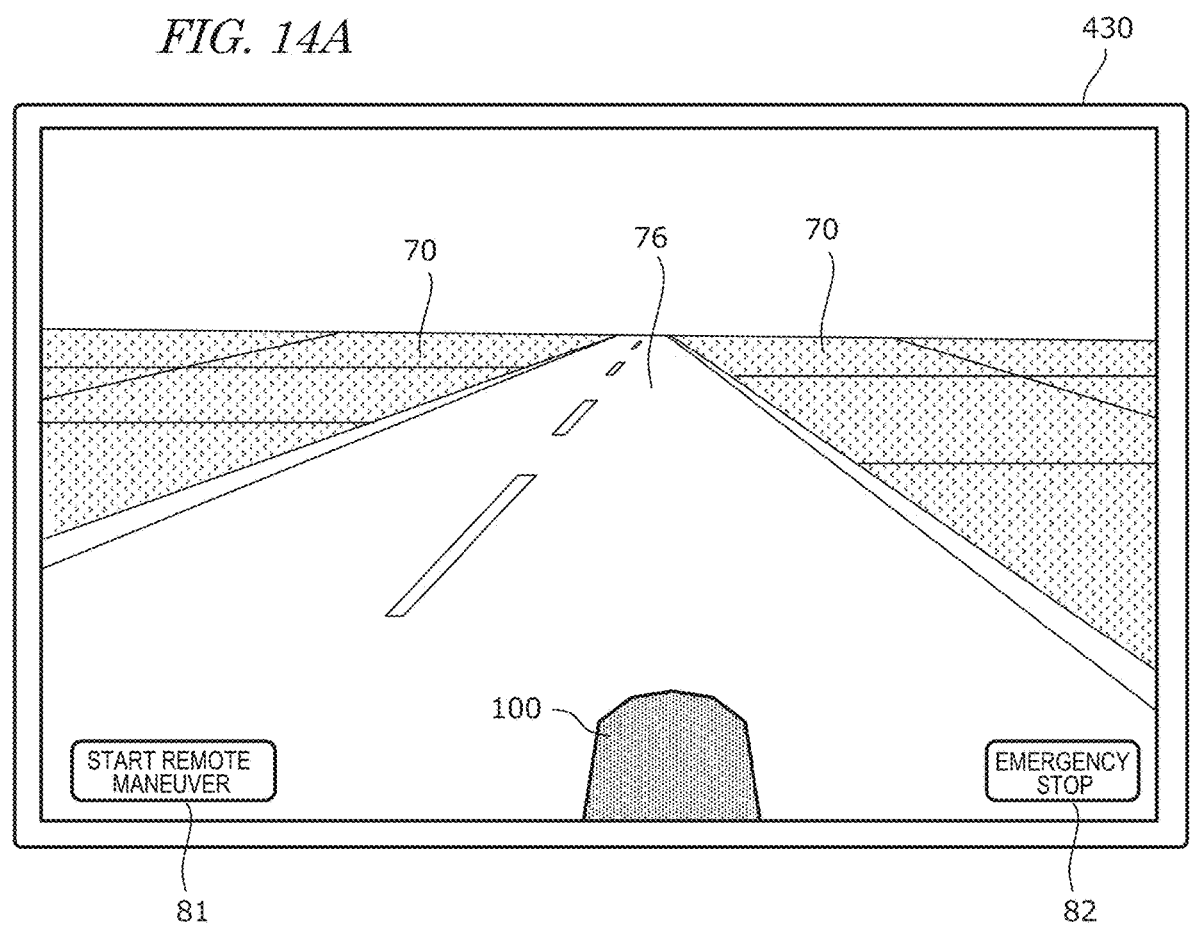
FIG. 14A is a diagram showing an example of a display screen in a self-traveling mode.

FIG. 14A is a diagram showing an example of an image displayed on the display 430 of the terminal device 400. The image shown in FIG. 14A shows a field 70, a road 76, and a front portion of the work vehicle 100. The image is captured by the camera 120 that shoots an area in front of the work vehicle 100. In addition to the camera 120 that shoots an area in front of the work vehicle 100, an image captured by a camera 120 that shoots an area to the rear, right, or left of the camera 120 may be displayed on the display 430, for example. The display 430 displays moving images having a frame rate of, for example, at least 3 fps (typically, 30 fps or 60 fps, etc.). It should be noted that a plurality of images captured by a plurality of cameras 120 may be displayed on a plurality of displays. In that case, a user (operator) who is a checker can check details of a state of surroundings of the work vehicle 100 while viewing a plurality of images displayed on a plurality of displays. In addition to images captured by the cameras 120, a map of a region including the work vehicle 100 may be displayed on a display.

In the example shown in FIG. 14A, the displayed image includes a button (remote maneuver start button) 81 for instructing to start remote manipulation (also referred to as "remote maneuver"), and a button (emergency stop button) 82 for causing the work vehicle 100 to stop immediately. The user can cause transition from the self-traveling mode to the remote manipulation mode by touching or clicking the remote maneuver start button 81. The user can also immediately stop the work vehicle 100 by touching or clicking the emergency stop button 82.

Figure 14B:
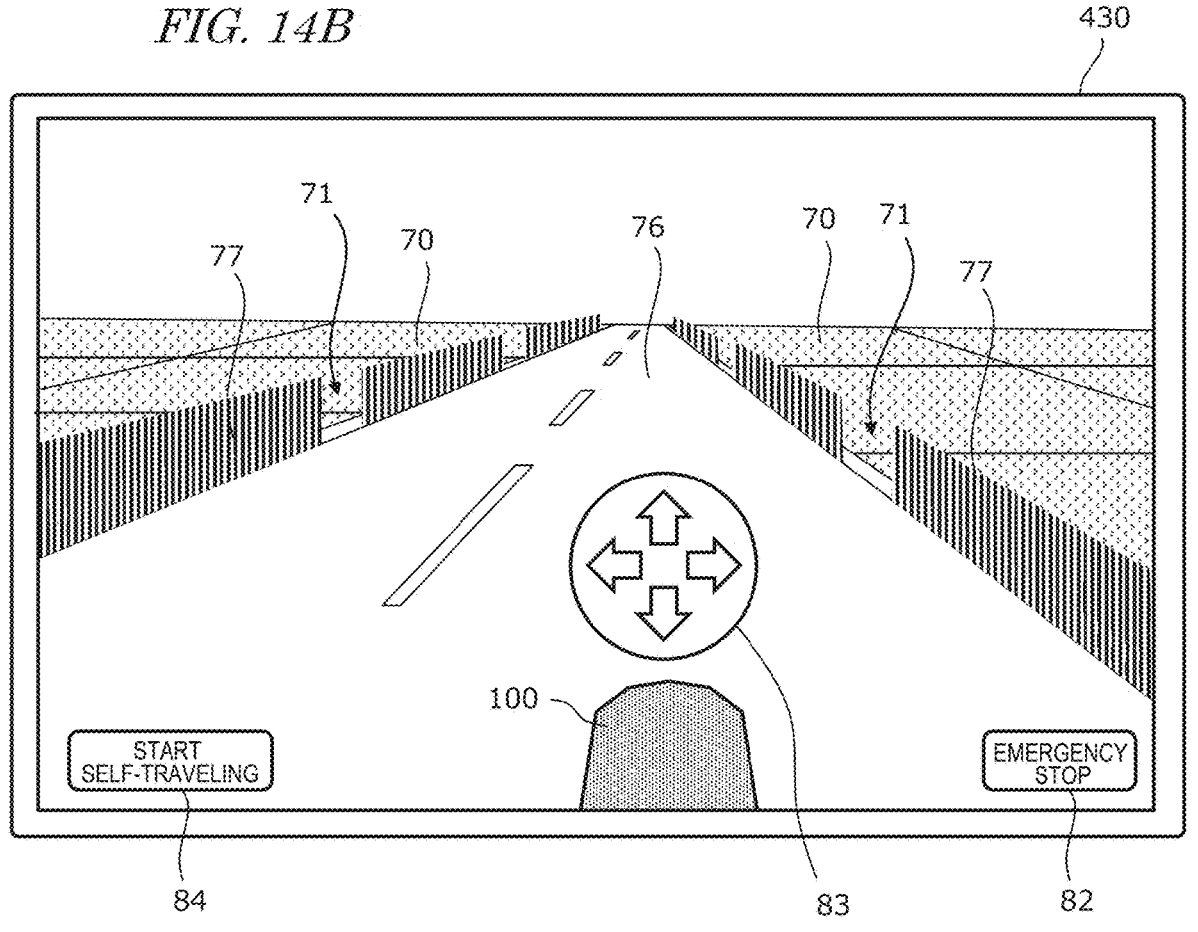
FIG. 14B is a diagram showing an example of a display screen in a remote manipulation mode.

FIG. 14B is a diagram showing an example of a display screen displayed after the remote maneuver start button 81 is pressed. In this example, when the remote maneuver start button 81 is pressed, a plurality of arrows 83 for remotely maneuvering the work vehicle 100 are displayed. An up arrow indicates a button for instructing to accelerate. A down arrow indicates a button for instructing to decelerate. A right arrow indicates a button for instructing to turn right. A left arrow indicates a button for instructing to turn left. The user can maneuver the work vehicle 100 by touching or clicking these arrows 83. The controller 180 causes the work vehicle 100 to perform an instructed operation in response to the user's operation. The user can switch on/off the display of the arrows 83 by performing a predetermined operation. In the example of FIG. 14B, since the work vehicle 100 is traveling on a road 76, the button for instructing to raise or lower the implement 300, the button for instructing to switch on/off the implement 300, and the like are not displayed. When the work vehicle 100 is located in a field 70, the button for instructing to raise or lower the implement 300 and the button for instructing to switch on/off the implement 300 may be displayed. Instead of the display of the arrows 83 in FIG. 14B, remote maneuver may be able to be performed by operating a controller such as a maneuver instrument or joystick connected to the terminal device 400, for example. The user can switch from the remote manipulation mode to the self-traveling mode by touching or clicking the self-traveling start button 84 in the screen shown in FIG. 14B.

In this example, when the remote maneuver start button 81 shown in FIG. 14A is pressed, barriers 77 indicating areas in which the work vehicle 100 is not currently permitted to perform remotely-manipulated traveling are displayed as shown in FIG. 14B. The barriers 77 indicate boundaries between forbidden areas or permitted areas in which a permission condition for remotely-manipulated traveling is not satisfied and areas in which the work vehicle 100 is permitted to perform remotely-manipulated traveling. The barrier 77 can also be referred to as a "geofence". The barriers 77 illustrated in FIG. 14B are displayed at the boundaries between a road 76 and fields 70, except for entrances/exits 71 of the fields 70. The display of the barriers 77 may vary depending on various conditions such as a state of the work vehicle 100, a type or state of the implement 300, a date and time, and the like. For example, on some work day, no barrier 77 may be displayed at an entrance/exit 71 of a field 70 on which the work vehicle 100 is scheduled to perform agricultural work, and a barrier 77 may be displayed at entrances/exits of other fields. In addition, when an implement 300 suitable for agricultural work that is to be performed on the work day is attached to the work vehicle 100, no barrier 77 may be displayed at the entrance/exit 71 of the field 70, and when an implement 300 suitable for agricultural work that is to be performed on the work day is not attached to the work vehicle 100, a barrier 77 may be displayed at the entrance/exit 71 of the field 70.

Figure 14C:
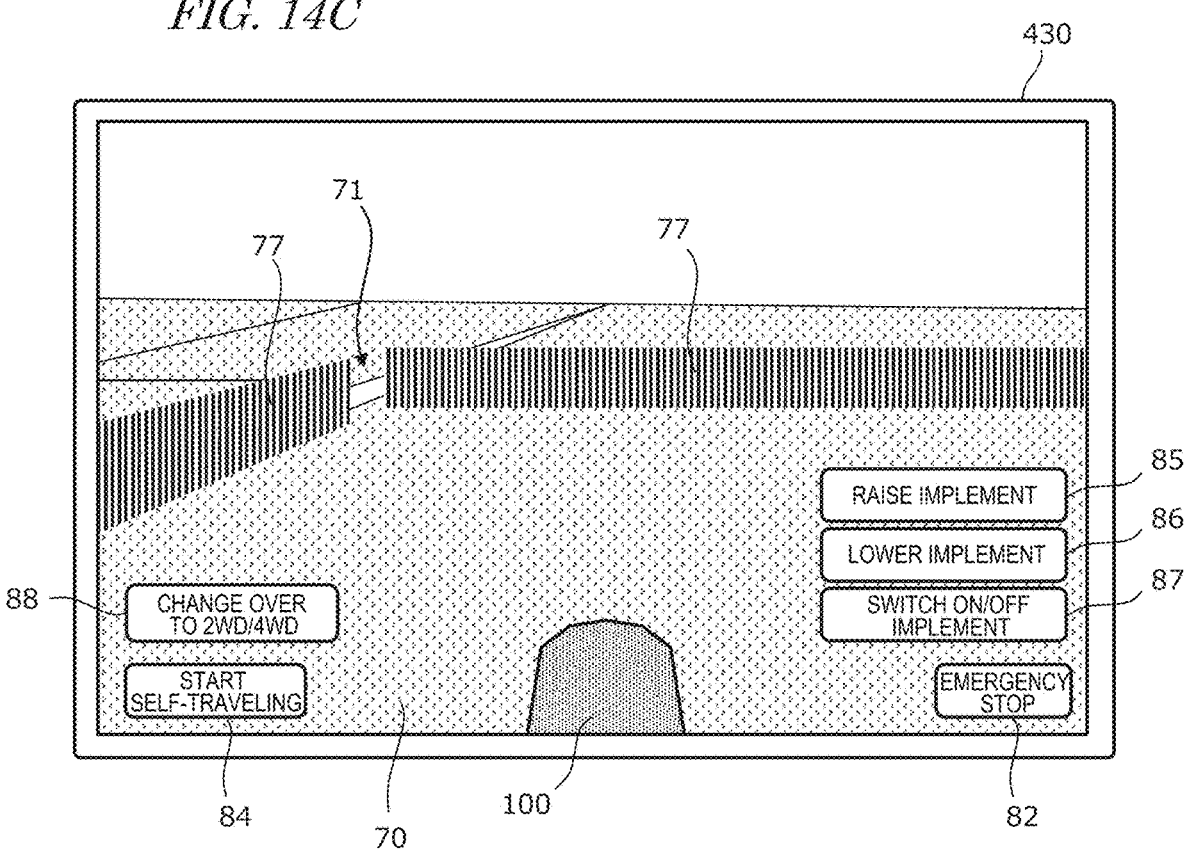
FIG. 14C is a diagram showing another example of a display screen in a remote manipulation mode.

FIG. 14C is a diagram showing an example of a display screen displayed in the remote manipulation mode when the work vehicle 100 is located in a field 70. In this example, buttons 85 to 87 for switching raising/lowering of the implement 300 and on/off of the implement 300 are displayed. These buttons can be used to change the position, orientation, or operating state of the implement 300.

In the example of FIG. 14C, barriers 77 are displayed at an outer periphery of the field 70, except for an entrance/exit 71. The display of the barriers 77 may be changed when a state of the work vehicle 100 or the implement 300 is changed. For example, in a state in which the linkage of the left and right brakes of the work vehicle 100 is removed, a state in which the implement 300 is held at a low position, or a state in which the implement 300 is being driven, a barrier 77 may also be displayed at the entrance/exit 71. The remote manipulation to cause the work vehicle 100 to move out of the barriers 77 is disabled by the controller 180.

The above display control is performed by the processor 460 of the terminal device 400 based on information obtained from the controller 180 of the work vehicle 100 or the management device 600. The controller 180 transmits, to the terminal device 400, information indicating the position and orientation of the work vehicle 100 and information obtained by the camera 120. The management device 600 transmits, to the terminal device 400, information indicating the scattering of permitted areas and/or forbidden areas in an environment in which the work vehicle 100 travels. Based on these pieces of information, a processor of the terminal device 400 can cause the display 430 to display an image with which an area in which the work vehicle 100 is currently permitted to perform remotely-manipulated traveling can be distinguished from an area in which the work vehicle 100 is not currently permitted to perform remotely-manipulated traveling.

Next, operation of the controller 180 in the remote manipulation mode will be more specifically described with reference to FIG. 15.

Figure 15:
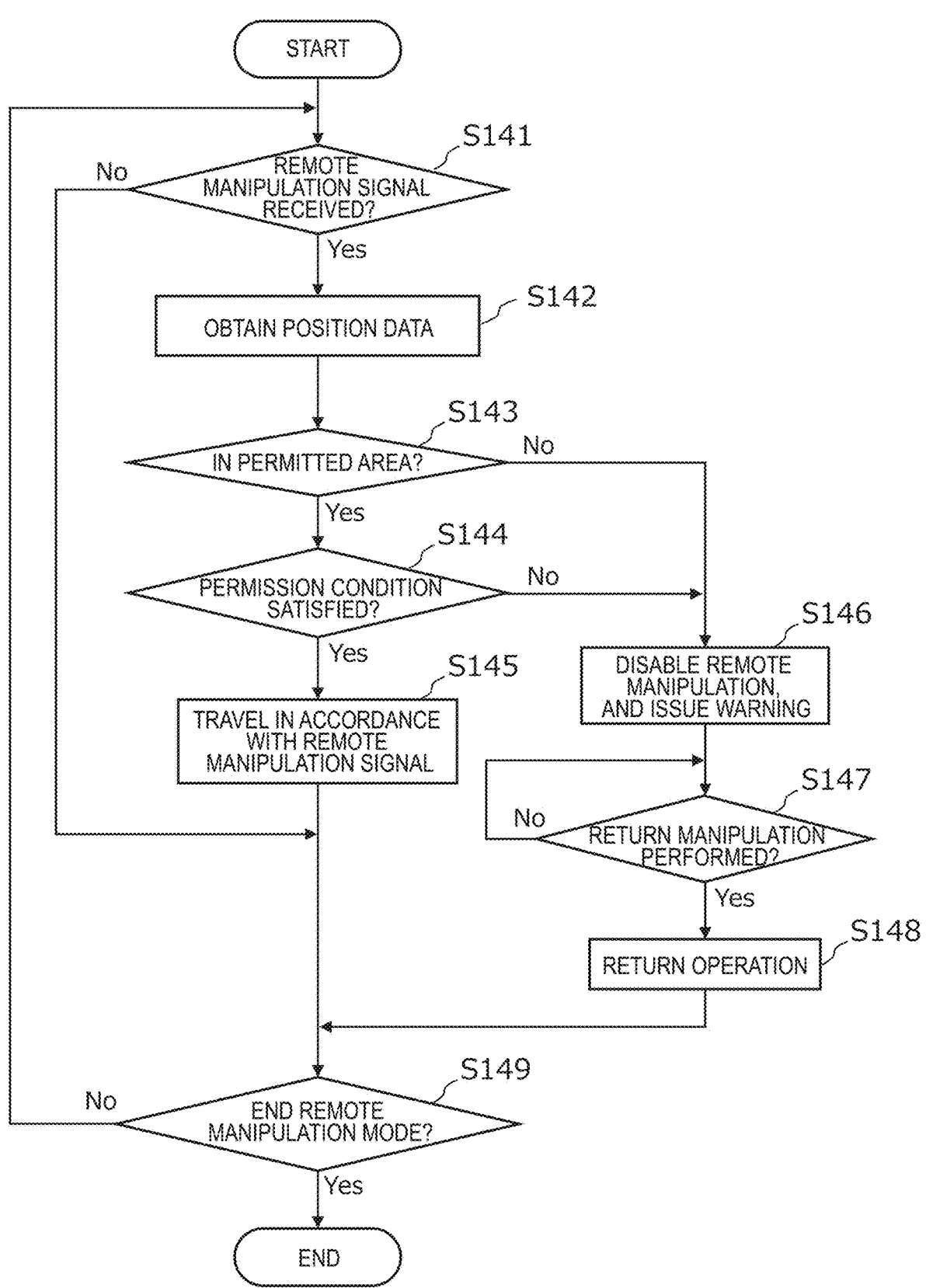
FIG. 15 is a flowchart showing an example of operation of a controller in a remote manipulation mode.

FIG. 15 is a flowchart showing an example of operation of the controller 180 in the remote manipulation mode. The ECU 184 of the controller 180 performs operations of steps S141 to S149 shown in FIG. 15 in the remote manipulation mode. The operation shown in FIG. 15 is started when the user instructs to start the remote manipulation mode by operating the terminal device 400.

In step S141, the controller 180 determines whether or not the controller 180 has received a remote manipulation signal from the terminal device 400 through the communication device 190. The remote manipulation signal includes an instruction to the work vehicle 100 to travel. The remote manipulation signal may, for example, include an instruction to the work vehicle 100 to change the traveling speed or traveling direction. The remote manipulation signal may include an instruction to change the position or orientation of the implement 300, or an instruction to change an operating state of the implement 300. If the remote manipulation signal has been received, control goes to step S142. If the remote manipulation signal has not been received, control goes to step S149.

In step S142, the controller 180 obtains position data of the work vehicle 100 from a positioning device such as the GNSS unit 110 (step S142). In the case in which the controller 180 performs localization of the work vehicle 100 using sensor data output from the LiDAR sensor 140 instead of the GNSS unit 110, the controller 180 obtains position data based on the sensor data.

In step S143, the controller 180 determines whether or not the position of the work vehicle 100 indicated by the obtained position data is in any permitted area. The position of each permitted area is recorded in the storage 170. The controller 180 determines whether or not the work vehicle 100 is located in any permitted area, based on the position data of the work vehicle 100 and the position data of permitted areas. If the work vehicle 100 is located in a permitted area, control goes to step S144. If the work vehicle 100 is not located in any permitted area (i.e., the work vehicle 100 is located in a forbidden area), control goes to step S146.

In step S144, the controller 180 determines whether or not a permission condition for remote manipulation is satisfied in the permitted area in which the work vehicle 100 is located. For example, in the example of FIG. 12, if the permitted area is a first permitted area in a field, the controller 180 determines whether or not conditions (a1) and (a2) are satisfied. Specifically, the controller 180 determines whether or not the implement 300 attached to the work vehicle 100 is suitable for scheduled agricultural work and whether or not the current date and time is in the scheduled period of time of work. Meanwhile, if the permitted area is a second permitted area in a road, the controller 180 determines whether or not conditions (b1) to (b3) are satisfied. Specifically, the controller 180 determines whether or not the three-point hitch is higher than the reference height, whether or not the PTO shaft is rotating, and whether or not the left and right brakes are linked together. If the permission conditions are satisfied, control goes to step S145. If the permission conditions are not satisfied, control goes to step S146.

In step S145, the controller 180 controls the drive device 240 including a travel device in accordance with the remote manipulation signal. Based on the remote manipulation signal, the controller 180 controls the engine, transmission, accelerator, brake, steering, PTO shaft, three-point hitch, or the like. As a result, the controller 180 causes the work vehicle 100 to perform the desired operation in accordance with the user's remote manipulation.

If it is determined that the work vehicle 100 is not located in any permitted area or if it is determined that the work vehicle 100 is located in a permitted area and a predetermined permission condition is not satisfied, control goes to step S146. In step S146, the controller 180 disables the remote manipulation to cause the work vehicle 100 to travel in the area and stops the work vehicle 100, and transmits a warning signal to the terminal device 400. The terminal device 400, when receiving the warning signal, displays, on the display 430, a warning indicating that the work vehicle 100 is located in an area in which remote manipulation is not permitted. By viewing the warning display, the user can know that the work vehicle 100 has entered an area in which remote manipulation is not permitted. In this case, the user can, for example, perform a return manipulation to cause the work vehicle 100 to move backward and return to an area in which remote manipulation is permitted, or changing a state of the work vehicle 100 or the implement 300 so that a permission condition is satisfied. The return manipulation may, for example, include the manipulation of stopping the rotation of the PTO shaft to stop supply of power to the implement 300, or lowering the three-point hitch so that the height of the implement 300 is lower than the reference height.

In step S147, the controller 180 determines whether or not return manipulation has been performed, based on a signal transmitted from the terminal device 400. If return manipulation has been performed, control goes to step S148.

In step S148, the controller 180 controls the drive device 240 based on a signal instructing to perform return manipulation. As a result, the work vehicle 100 performs the instructed return manipulation.

In step S149, the controller 180 determines whether or not a signal instructing to end the remote manipulation mode has been issued. The signal instructing to end the remote manipulation mode may, for example, be transmitted from terminal device 400 when the user performs an operation of ending the remote manipulation mode using the terminal device 400. The controller 180, when receiving the signal, ends the remote manipulation mode. After the end of the remote manipulation mode, the controller 180 transitions to the self-traveling mode or stops traveling in accordance with the signal transmitted from the terminal device 400. If the signal instructing to end the remote manipulation mode has not been received, control returns to step S141.

The above operations may be repeatedly performed until an instruction to end the remote manipulation mode is issued. As a result, the work vehicle 100 can travel in a permitted area in accordance with the user's remote manipulation. According to the present example embodiment, only when a permission condition for an area in which the work vehicle 100 is located is satisfied, the remote manipulation to cause the work vehicle 100 to travel in that area is enabled. Therefore, the work vehicle 100 can be prevented from performing inappropriate traveling due to remote manipulation when a state of the work vehicle 100 or the implement 300 is not appropriate for performance of remote manipulation.

Although, in the present example embodiment, the controller 180 of the work vehicle 100 performs the process of disabling the remote manipulation to cause the work vehicle 100 to travel in an area in which remotely-manipulated traveling is not permitted, the terminal device 400 may instead perform that process. Alternatively, in the case in which the remote manipulation signal from the terminal device 400 is transmitted to the controller 180 of the work vehicle 100 through the management device 600, the processor 660 of the management device 600 may perform the above process. In such an example embodiment, the processor of the terminal device 400 or the management device 600 is configured or programmed to define and function as the controller that controls remotely-manipulated traveling.

The setting of permitted areas and permission conditions is not limited to the above examples. For example, there may be a single type of permitted area or at least three types of permitted areas. In addition to permitted areas in which remotely-manipulated traveling is permitted conditionally, permitted areas in which remotely-manipulated traveling is permitted unconditionally may be set. Another example of setting of permitted areas and permission conditions will be described below.

Figure 16:
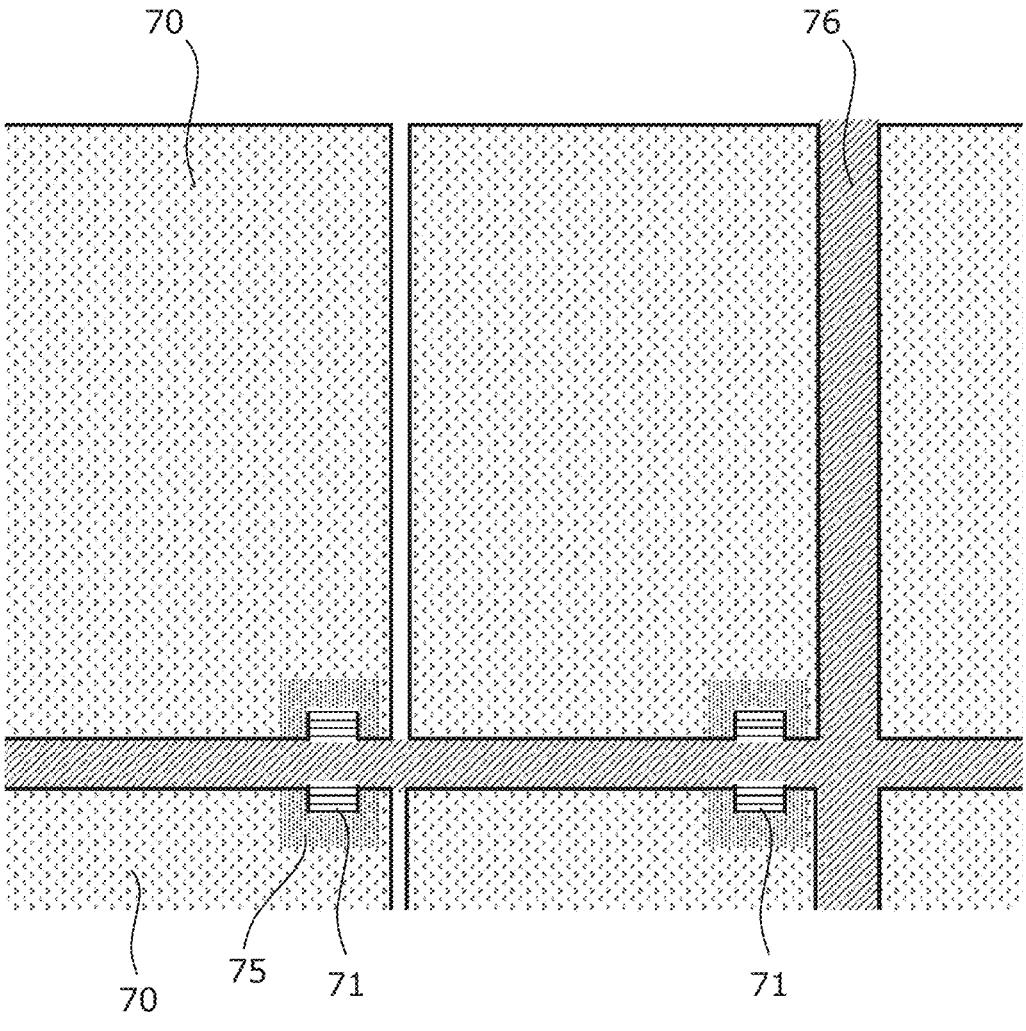
FIG. 16 is a diagram showing another example of setting of a permitted area and a permission condition.

FIG. 16 is a diagram showing another example of setting of permitted areas and permission conditions. In this example, fields 70 are located at positions lower than those of roads 76 around the fields 70, and have an ascending slope at entrances/exits 71 thereof. In such a case, when the work vehicle 100 is in the two-wheel drive state, the controller

Figure 17:
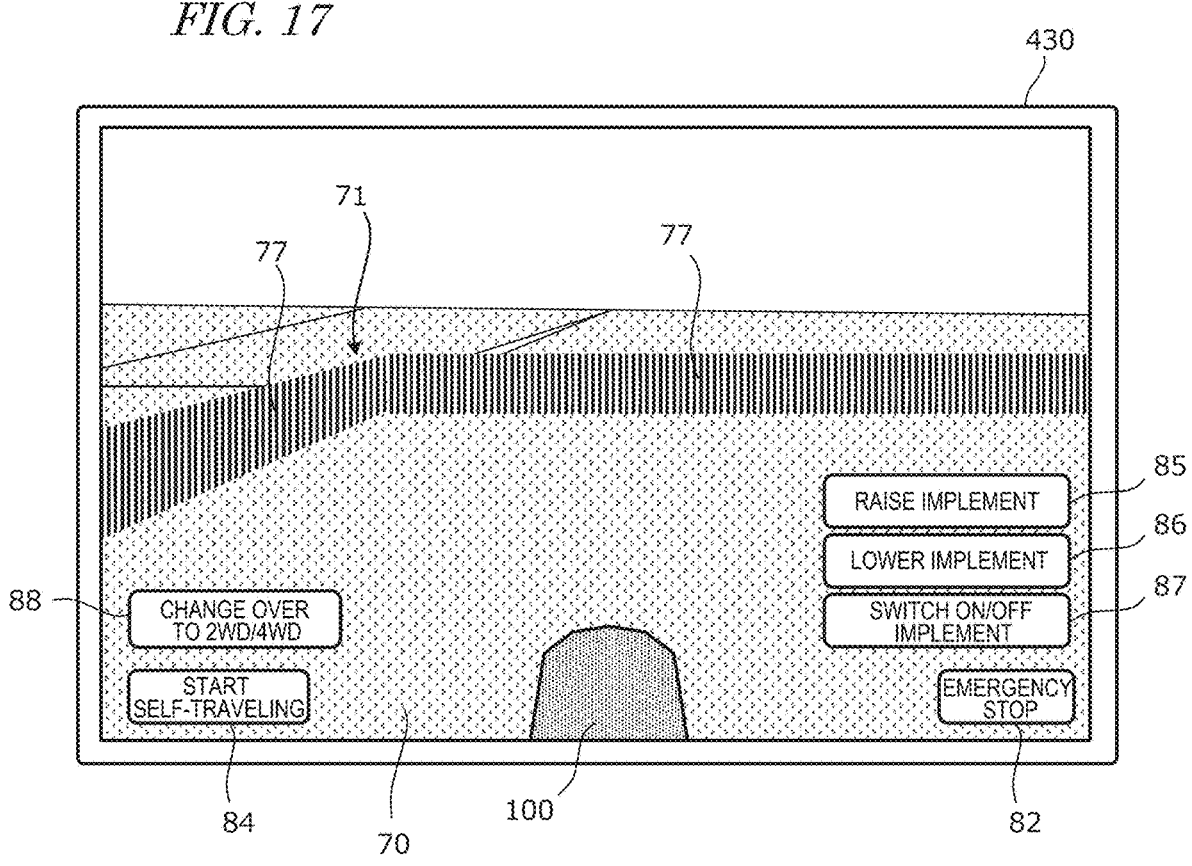
FIG. 17 is a diagram showing another example of a display screen in a remote manipulation mode.

180 may disable the remote manipulation to cause the work vehicle 100 to travel in areas 75 around the entrances/exits 71. For example, in the example of FIG. 14C, when the remote manipulation of changing the work vehicle 100 from the four-wheel drive state to the two-wheel drive state is performed, as shown in FIG. 17 a barrier 77 may be displayed at or near the entrances/exit 71 on the display screen. In the shown example, the display screen includes a button 88 that is used to perform switching between two-wheel drive (2WD) and four-wheel drive (4WD). The user can perform switching between the two-wheel drive state and the four-wheel drive state by touching or clicking the button 88. In the example of FIG. 17, when the state is changed from two-wheel drive to four-wheel drive, remotely-manipulated traveling is enabled at or near the entrances/exit 71, and as shown in FIG. 14C, the display of the barrier 77 at the entrances/exit 71 is removed. As a result, it is possible to avoid a situation that the work vehicle 100 makes an attempt to move out of a field 70 in the two-wheel drive state and fails to go over an ascending slope.

In the example of FIG. 16, a first permitted area is set in fields 70, and a second permitted area is set in roads 76. It should be noted that for areas 75 at or near entrances/exits 71 of the fields 70, a permission condition different from that for the other areas in the fields 70 is set. For the areas 75 at or near the entrances/exits 71, the above permission condition that the work vehicle 100 should be in the four-wheel drive state may be added. As a result, the work vehicle 100 can travel at or near the entrances/exits 71 including an ascending slope in accordance with remote manipulation only when the work vehicle 100 is in the four-wheel drive state. Similar permission conditions may, for example, be set for areas in which the ground is in bad conditions such as muddy conditions in addition to the entrances/exits 71. A particular area in a field 70 or on a road 76 may be set as a permitted area in which only four-wheel drive traveling is permitted, by the user using the terminal device 400.

Figure 18:
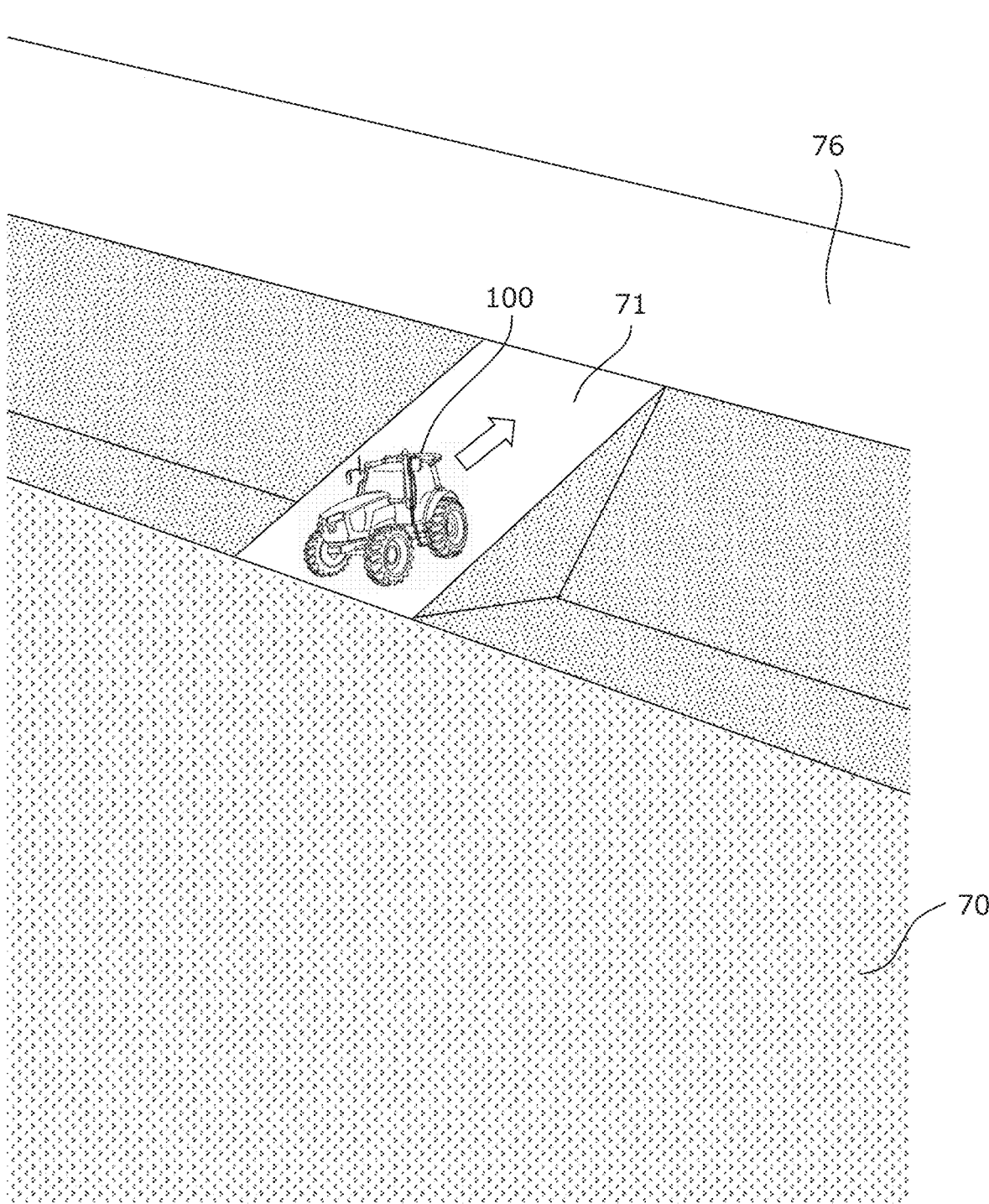
FIG. 18 is a perspective view schematically showing an example of a work vehicle located at an entrance/exit of a field.

FIG. 18 is a perspective view schematically showing an example of the work vehicle 100 located at an entrance/exit 71 of a field 70. In this example, the work vehicle 100 is permitted to move only backward (by reverse motion) to exit through the entrance/exit 71 of the field 70 and then enter a road 76 in accordance with remote manipulation. The controller 180 disables the remote manipulation to cause the work vehicle 100 to enter the entrance/exit 71 including an ascending slope when the work vehicle 100 is moving forward. As a result, it is possible to avoid a situation that the work vehicle 100 with the implement 300 attached thereto moves forward and enters an ascending slope, so that the front wheels are raised and therefore the work vehicle 100 is unbalanced. Similar permission conditions may be set for areas including any ascending slope having a slope angle greater than or equal to a predetermined angle in addition to entrances/exits 71 of fields. Areas including such an ascending slope may be previously set and stored in the storage 170. As in this example, the controller 180 may determine whether or not remotely-manipulated traveling is permitted, based on a relationship between a state of the work vehicle 100 and a state of a field.

Figure 19:
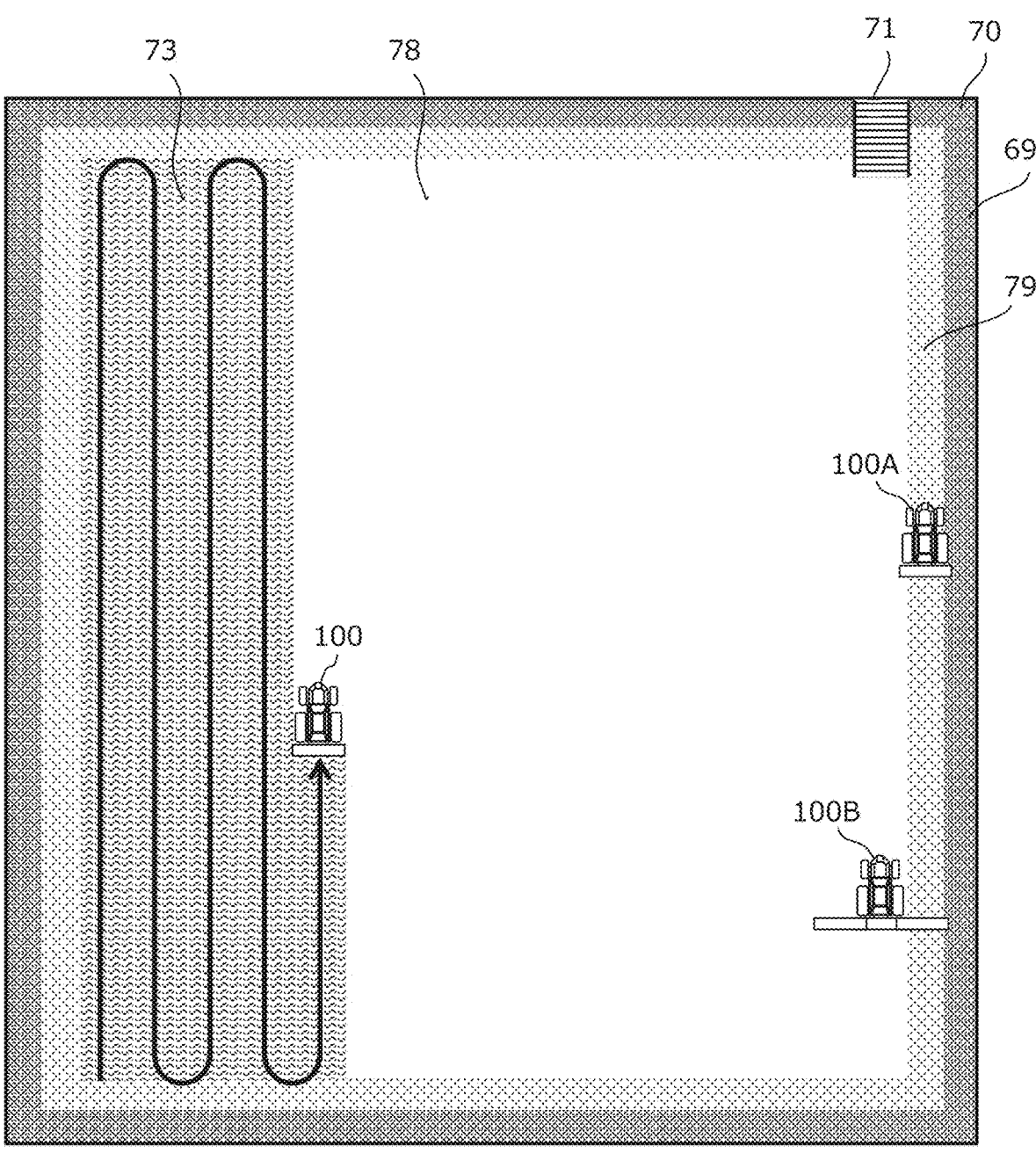
FIG. 19 is a diagram showing another example in which a plurality of permitted areas are set in a field.

FIG. 19 is a diagram showing another example in which a plurality of permitted areas are set in a field 70. In this example, the permitted areas include a permitted area 79 in which remotely-manipulated traveling is permitted only when the width of the implement 300 is in a particular range. The permitted area 79 is set at an outer periphery of the field. It should be noted that an outermost periphery 69 of the field 70 is set as a forbidden area, and the permitted area 79 is located further inside than the outermost periphery 69. If the width of the implement 300 is great, then when the work vehicle 100 is located at or near the outer periphery of the field, a portion of the implement 300 may stick out of the field. For example, in FIG. 19, an implement 300 having a width greater than that of a work vehicle 100A is attached to a work vehicle 100B. When the work vehicle 100B travels in the permitted area 79, an end of the implement 300 may stick out of the field, or hit an obstacle such as a ridge around the field. To address such a problem, in the example of FIG. 19, the controller 180 permits remotely-manipulated traveling in the permitted area 79 only when the width of the implement 300 is smaller than a threshold. As a result, it is possible to avoid a situation that the work vehicle 100B to which the implement 300 having a great width is attached travels at or near an outer periphery of the field 70, so that an end of the implement 300 sticks out of the field 70 or hits an obstacle.

The implement 300 may be a type of implement that has a variable width. In that case, the width of the implement 300 may be changed by operating the terminal device 400. However, when the width of the implement 300 is increased at an outer periphery of a field 70, an end of the implement 300 may stick out of the field 70, or hit an obstacle. To address such a problem, if an increase in the width of an implement 300 would cause an end of the implement 300 to stick out of a field or hit an obstacle, the controller 180 may disable the remote manipulation of increasing the width of the implement 300.

In the example of FIG. 19, the work area of the field 70 other than the outermost periphery 69 and the permitted area 79 may be set as a permitted area in which remotely-manipulated traveling is permitted, only when agricultural work has not yet been performed on that work area. In FIG. 19, the work vehicle 100 performs predetermined agricultural work while shuttling back and forth in the work area of the field 70. The work area shown includes a worked area 73 in which agricultural work has already been finished, and an unworked area 78 in which agricultural work has not yet been finished. If the work vehicle 100 tramples the worked area 73, the effect of agricultural work already performed is impaired. To address such a problem, in the example of FIG. 19, the controller 180 disables the remote manipulation to cause the work vehicle 100 to travel in the worked area 73. In the unworked area 78, the work vehicle 100 is allowed to perform remotely-manipulated traveling. It may be determined whether the work vehicle 100 is located in the worked area 73 or the unworked area 78, based on the log data of travel and agricultural work of the work vehicle 100. In this example, the work vehicle 100 can be prevented from trampling the worked area 73 by remotely-manipulated traveling. As in this example, when a state of a field 70 satisfies a predetermined condition (e.g., agricultural work has not yet been performed), the controller 180 may permit the work vehicle 100 to perform remotely-manipulated traveling.

As described above, in the present example embodiment, the management device 600 generates a target path for the work vehicle 100 in roads and fields on a map in accordance with a previously created work plan or the user's instruction. The controller 180 of the work vehicle 100 sets a region specified by the target path as a self-traveling area, and causes the work vehicle 100 to travel in the self-traveling area. The controller 180 may set all or a portion of the self-traveling area as an area in which remotely-manipulated traveling is permitted, and set areas outside the self-traveling area as a forbidden area. By such setting, the work vehicle 100 can be prevented from being caused by remote manipulation to unnecessarily enter an area in which self-traveling is not scheduled.

In such an example embodiment, the controller 180 may set a forbidden area inside a self-traveling area. For example, a range in which the distance from a tree trunk included in a self-traveling area is shorter than or equal to a predetermined distance may be set as a forbidden area.

Figure 20:
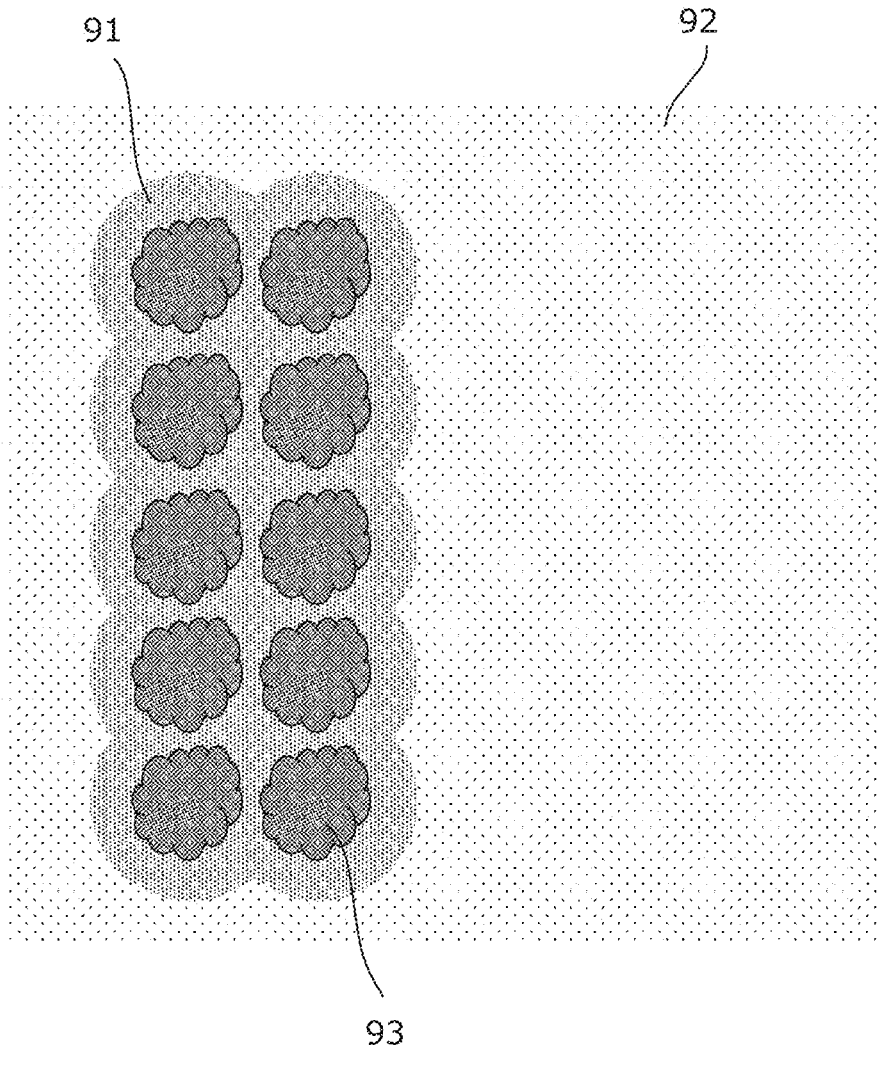
FIG. 20 is a schematic diagram showing an example in which a forbidden area is set when there are a plurality of trees in a self-traveling area.

FIG. 20 is a schematic diagram showing an example of a situation that there are a plurality of trees 93 in a self-traveling area 92. In this example, the controller 180 sets, as a forbidden area 91, a range in which the distance from the trunk of each tree 93 is shorter than or equal to a predetermined distance. In this example, map data includes the positional information of each tree 93. The controller 180 can identify the position of the trunk of each tree 93 existing in the self-traveling area 92 based on the positional information. The controller 180 sets, as a forbidden area 91, the range of a predetermined distance from the position of each tree trunk 93. As a result, the work vehicle 100 can be prevented from colliding with a tree during remote manipulation.

Figure 21:
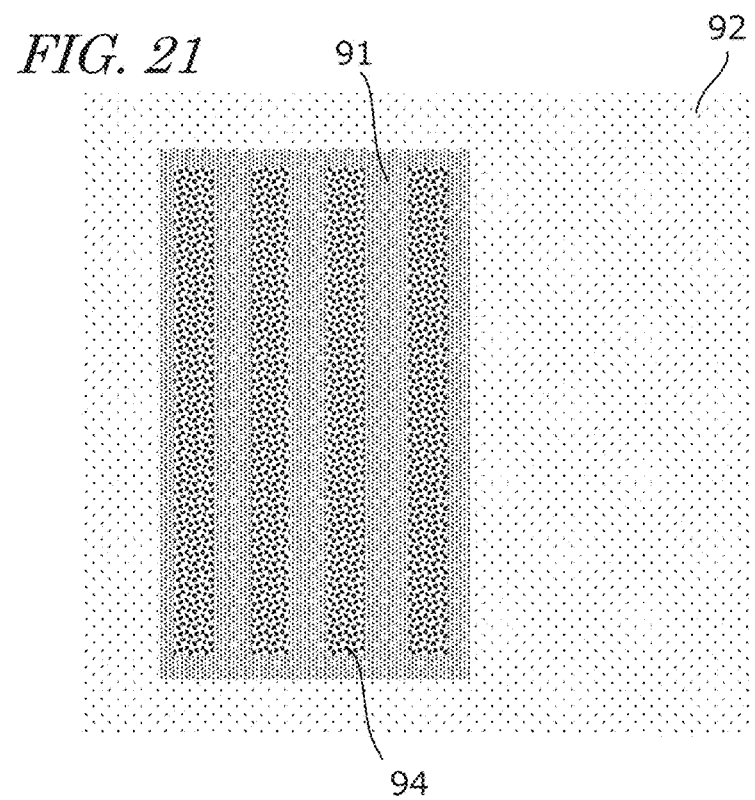
FIG. 21 is a schematic diagram showing an example in which a forbidden area is set when there are earthed-up ridges in a self-traveling area.

FIG. 21 is a schematic diagram showing an example of a forbidden area that is set when which there are earthed-up ridges 94 in a self-traveling area 92. As shown in FIG. 21, the controller 180 may set, as a forbidden area 91, an area in which there are the earthed-up ridges 94 in a field included in the self-traveling area 92. As a result, the work vehicle 100 can be prevented from accidentally trampling the earthed-up ridges 94 in the remote manipulation mode.

Figure 22:
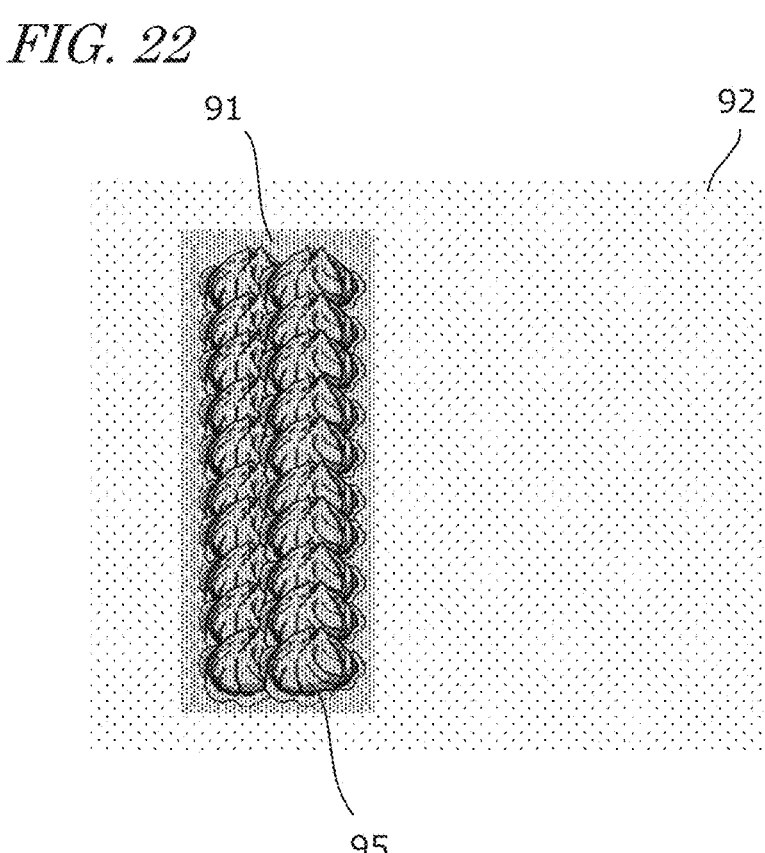
FIG. 22 is a schematic diagram showing an example in which a forbidden area is set when there are crop rows in a self-traveling area.

FIG. 22 is a schematic diagram showing an example of a forbidden area that is set when there are crop rows 95 in a self-traveling area 92. As shown in FIG. 22, the controller 180 may set, as a forbidden area 91, an area in which there are crop rows 95 in a field included in the self-traveling area 92. As a result, the work vehicle 100 can be prevented from accidentally trampling the crop rows 95 in the remote manipulation mode.

The controller 180 can identify the positions of the earthed-up ridges 94 or the crop rows 95 based on data output from the camera 120 and the GNSS unit 110 of the work vehicle 100. The controller 180 may also identify the positions of the earthed-up ridges 94 or the crop rows 95 based on data previously obtained by a sensing device mounted on a mobile body other than the work vehicle 100. The controller 180 sets a forbidden area 91 that covers all the earthed-up ridges 94 or the crop rows 95.

In the above example embodiments, in each permitted area, the work vehicle 100 is permitted to perform remotely-manipulated traveling if a permission condition set for the permitted area is satisfied. If the permission condition is satisfied, any particular limitation is not imposed on remotely-manipulated traveling in the permitted area. Meanwhile, in a permitted area for which a permission condition is not satisfied, the controller 180 disables remotely-manipulated traveling and stops the work vehicle 100. In each of the above example embodiments, instead of or in addition to permitted areas, a limited area in which a limitation is imposed on operation of remotely-manipulated traveling may be set. In the limited area, remotely-manipulated traveling is allowed, and a limitation is imposed on operation of the work vehicle 100 or the implement 300 during remotely-manipulated traveling. For example, the traveling speed, the number of revolutions of the engine, the operation of the three-point hitch, the operation of the PTO shaft, or the like of the work vehicle 100 may be limited. In each of the above example embodiments, all or a portion of permitted areas may be replaced with a limited area. In such example embodiments, the work vehicle 100, when entering a limited area by remote manipulation, may continue to perform remotely-manipulated traveling with a limitation instead of stopping.

A limited area may be set inside fields and on roads outside fields. For example, in a limited area set inside a field, the traveling speed of the work vehicle 100 may be limited to a speed suitable for agricultural work scheduled in that field. Alternatively, an operation of lowering the implement 300 to a height or depth that exceeds that which is suitable for agricultural work scheduled for the field (e.g., tillage or chemical spraying) may be limited. In addition, when it is preferable that the work vehicle 100 should perform work in a field in the four-wheel drive state, then if the work vehicle 100 is in the two-wheel drive state, the controller 180 transmits a warning to the terminal device 400 through the communication device 190. For example, the massage "PLEASE USE 4WD" may be displayed on the display 430 of the terminal device 400. As a result, the user can be prompted to switch from two-wheel drive to four-wheel drive. The controller 180 may also set, outside fields, a limited area in which traveling speed is limited. For example, traveling speed may be set in a limited area set in each road outside fields so as not to exceed a speed limit set for the road. In addition, the number of revolutions of the engine or traveling speed may be limited on roads or fields close to houses or livestock barns to reduce loud noise. Such a limitation may be imposed only at nighttime. The controller 180 can, for example, determine whether or not the current time is nighttime with reference to a clock such as a real-time clock.

FIG. 23 is a schematic diagram showing an example of setting of limited areas. FIG. 24 is a table showing an example of details of operation limitations in each limited area. In this example, three types of limited areas having different operation limitations are set. Fields 70 are set as a first limited area. Roads 76 (not including regions around houses 97 or livestock barns 98) are set as a second limited area. Regions 99 around the houses 97 or the livestock barns 98 are set as a third limited area. In the first limited areas in the fields 70, traveling speed is limited to a speed lower than that which is suitable for scheduled agricultural work, for example. In addition to or instead of this limitation, in the first limited areas, the implement 300 may be forbidden to be lowered beyond a height or depth suitable for scheduled agricultural work. In the second limited areas, traveling speed may be limited to a speed lower than or equal to a speed limit set for the road 76, for example. In addition or instead of this limitation, the operation of lowering the implement 300 may be forbidden in the second limited areas. In the third limited areas, in addition to the limitation in the second limited area, the number of revolutions of the engine is limited to a value lower than or equal to a threshold. Although, in the example of FIG. 23, the third limited areas are set in roads around the houses 97 or the livestock barns 98, the third limited areas may include a portion of the fields 70. In that case, in the third limited area in the field 70, the number of revolutions of the engine may be limited in addition to the limitation on the first limited areas. The number of revolutions of the engine may be limited only during a preset period of time such as nighttime.

Figure 25:
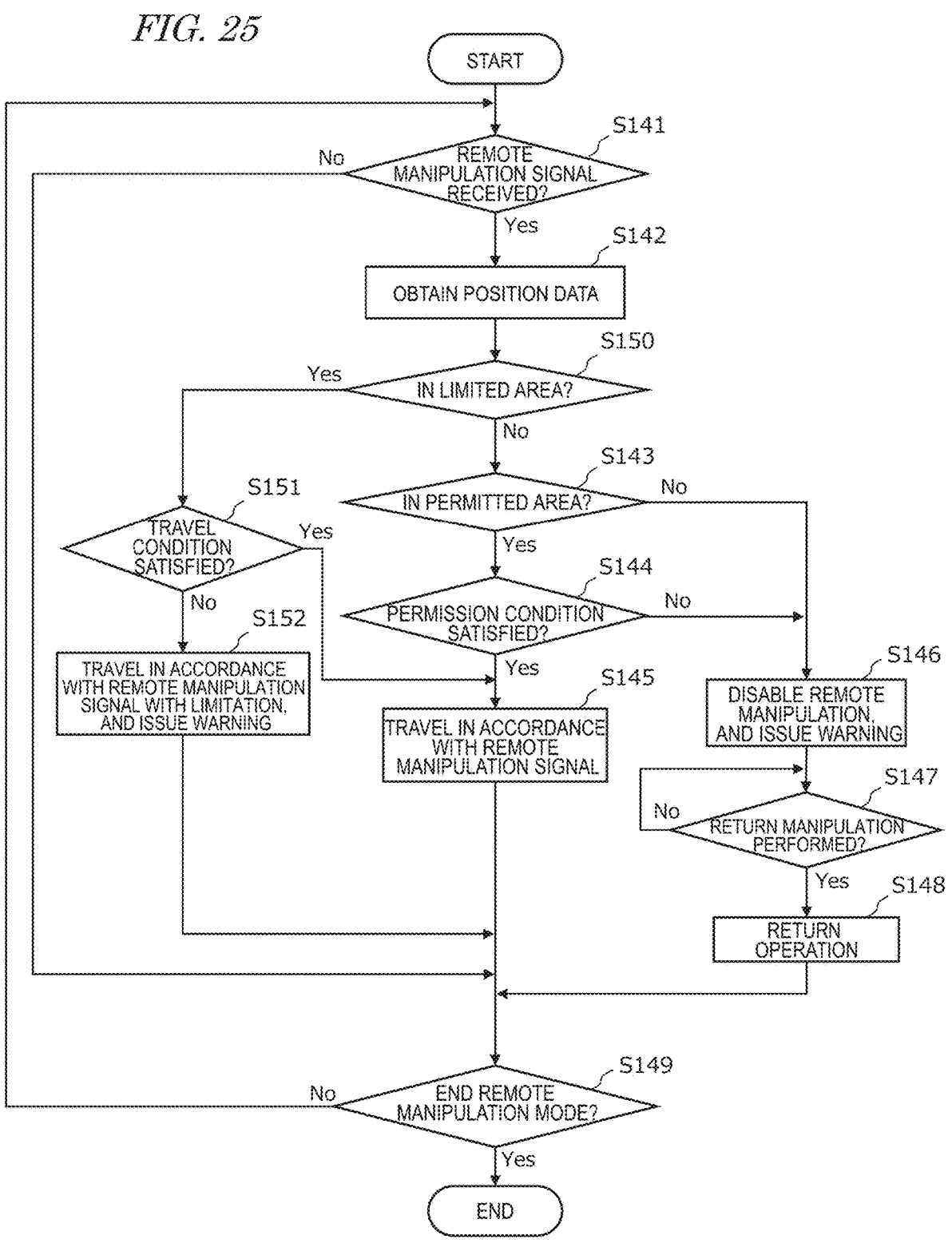
FIG. 25 is a flowchart showing an example of operation of a controller performed when a permitted area and a limited area are included in an environment in which a work vehicle travels.

FIG. 25 is a flowchart showing an example of operation of the controller 180 in the case in which an environment in which the work vehicle 100 travels includes a permitted area and a limited area. The flowchart of FIG. 25 is similar to that which is shown in FIG. 15, except that steps S150, S151, and S152 are added. Differences from the operation of FIG. 15 will be described below.

In the example of FIG. 25, after step S142, the controller determines whether or not the work vehicle 100 is located in a limited area. If the work vehicle 100 is located in a limited area, control goes to step S151. If the work vehicle 100 is not located in any limited area, control goes to step S143, in which the operations of step S143 and the following steps of FIG. 15 are performed.

In step S151, the controller 180 determines whether or not a travel condition related to the limited area that it has been determined the work vehicle 100 is located in is satisfied. For example, the controller 180 reads out, from the storage 170, data of the table shown in FIG. 24 that specifies a correspondence relationship between the positions of limited areas and details of limitations, or the like. Based on the data, the controller 180 can determine whether or not a travel state indicated by the remote manipulation signal satisfies a travel condition for the limited area. If the travel condition is satisfied, control goes to step S145, in which the drive device 240 is controlled in accordance with the remote manipulation signal so that the work vehicle 100 travels as instructed. If the travel condition is not satisfied, control goes to step S152.

In step S152, the controller 180 is configured or programmed to control the drive device 240 with a limitation imposed on operation in accordance with the remote manipulation signal so as to satisfy the travel condition. For example, as illustrated in FIG. 24, the traveling speed, the height or depth of the implement, and/or the number of revolutions of the engine or the like are controlled so as to fall within a predetermined range. At this time, the controller 180 may transmit a signal indicating that a limitation is imposed on operation to the terminal device 400. The terminal device 400 may display a warning based on the signal.

Figure 26:
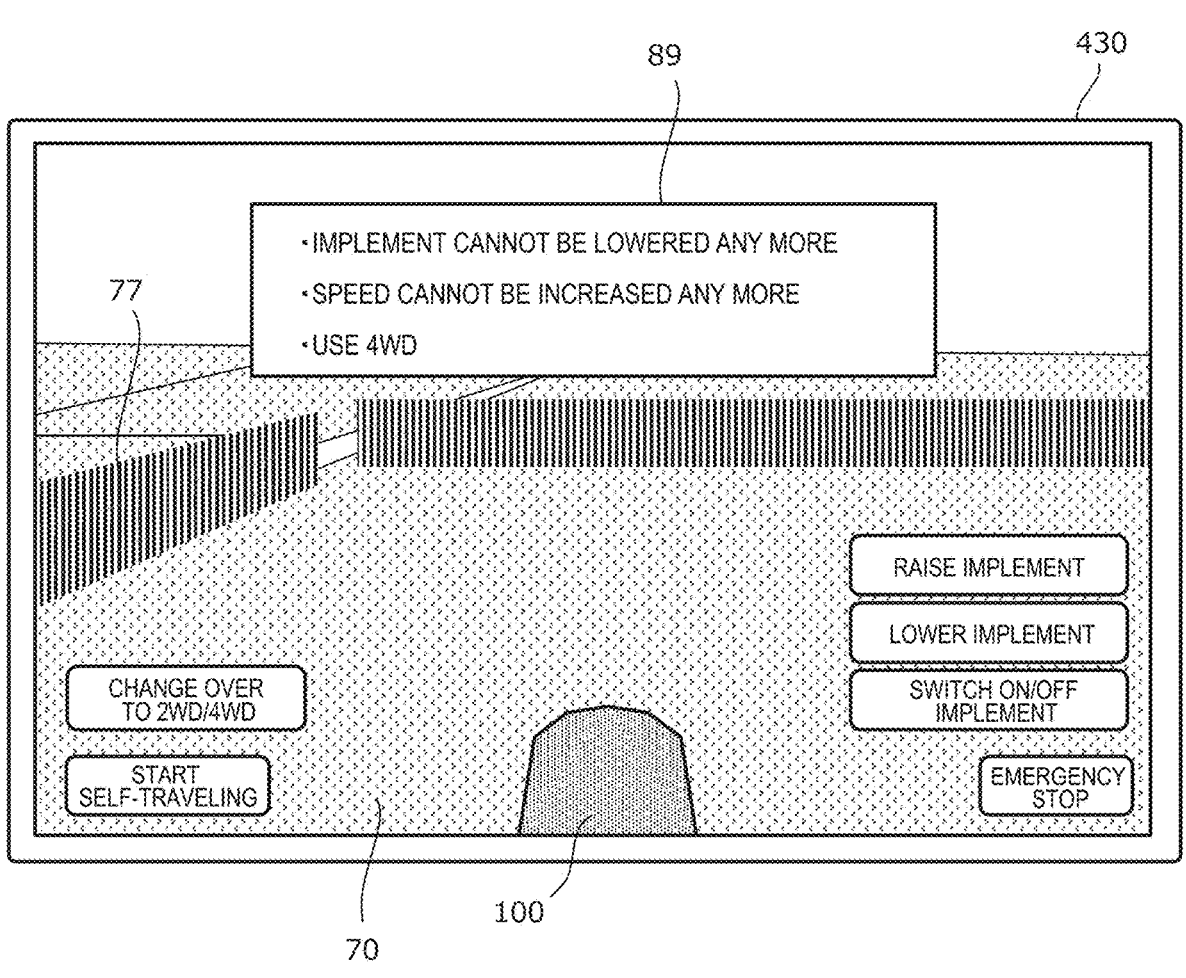
FIG. 26 is a diagram showing an example of warning display.

FIG. 26 is a diagram showing an example of warning display. In this example, warning display 89 includes the messages "IMPLEMENT CANNOT BE LOWERED ANY MORE", "SPEED CANNOT BE INCREASED ANY MORE", and "USE 4WD". Such warning display allows the user to know that the work vehicle 100 is being remotely manipulated with a limitation. In the display screen shown in FIG. 26, an area in a field 70 or the like that is set as a limited area may, for example, be displayed and emphasized in a noticeable color. Such display allows the user to know what area is a limited area. In addition, as in the above example embodiments, barriers 77 indicating areas in which remotely-manipulated traveling is not permitted may also be displayed.

After step S152, control goes to step S149. Thereafter, the operations shown in FIG. 25 may be repeatedly performed until an instruction to end the remote manipulation mode is issued.

By the above operations, the controller 180 can limit operation of remotely-manipulated traveling, depending on each limited area. As a result, travel appropriate for characteristics of each limited area can be performed during remote manipulation.

It should be noted that the above details of operation flows, setting of permitted areas and limited areas, permission conditions and operation limitations are merely illustrative, and various modifications and changes can be made thereto. For example, only a portion of the permission conditions for each permitted area shown in FIG. 12 may be applied. Only a portion of the operation limitations for each limited area shown in FIG. 24 may be applied. The determination of what area is set as a permitted area or a limited area, the presence or absence of a conditionally permitted area, a permission condition for each conditionally permitted area, the presence or absence of a limited area, and details of operation limitations for each limited area, and the like may be set, as appropriate, depending on a system.

In each of the above examples, the controller 180 may cause the display 430 of the terminal device 400 to display information indicating the type of an operator who is permitted to perform remote manipulation, depending on the position of the work vehicle 100. FIG. 27 is a diagram showing an example of such display. FIG. 27 shows an example of information that is displayed when the work vehicle 100 is performing remotely-manipulated traveling on a public road. In this example, the message that "A SKILLED PERSON SHALL PERFORM REMOTE MANEUVER ON PUBLIC ROADS" is displayed. If the user, when viewing this display, determines that the user themselves does not have skills in performing remote maneuver on public roads, the user can take action to ask a skilled person to perform remote maneuver. The type of an operator who is permitted to perform remote manipulation may vary depending on the place where the work vehicle 100 is located. For example, it is preferable that a highly skilled operator should perform remote maneuver such as causing the work vehicle 100 to enter and exit a garage, operation at an entrance/exit of a field, and traveling on a public road having relatively much traffic. Therefore, it is effective to cause the terminal device 400 to display information indicating the type of an operation corresponding to the difficulty in remote maneuver at a place where the work vehicle 100 is located.

In the example of FIG. 27, data specifying a correspondence relationship between places where the work vehicle 100 is located, and types of operators who are permitted to perform remote manipulation or are recommended may be previously stored in the storage 170. FIG. 28 is a diagram showing an example of such data. The data shown in FIG. 28 is a table that specifies a relationship between types of places where the work vehicle 100 is located, and types of operators who are recommended for remote maneuver. Based on such data, the controller 180 can determine the type of an operator suitable for the place where the work vehicle 100 is located. In the example of FIG. 28, it is recommended that an experienced person having high remote maneuver skills should perform remote maneuver at entrance/exits of fields, public roads having much traffic, and garages. On agricultural roads, it is recommended that an intermediate-level or experienced person having intermediate or higher remote maneuver skills should perform remote maneuver. In areas other than the entrances/exits of fields and the user's private land other than a garage, a beginner having low remote maneuver skills is permitted to perform remote maneuver. It should be noted that the correspondence relationship between areas and operators shown in FIG. 28 is merely illustrative, and can be modified or changed as appropriate. Fields, entrances/exits of fields, public roads having much traffic, agricultural roads, the user's private lands, garages, and the like are previously identified and recorded on a map. The controller 180 can determine the type of an operator suitable for the position of the work vehicle 100 based on the data shown in FIG. 28, the result of determination of the position of the work vehicle 100, and the map. The controller 180 transmits an instruction to the display 430 to display information indicating the determined operator type, to the terminal device 400 through the communication device 190. The display 430 can display the message shown in FIG. 27 in response to the instruction. It should be noted that, instead of the controller 180, the processor 660 of the management device 600 may specify the type of an operator suitable for the area in which the work vehicle 100 is located, based on the data shown in FIG. 28, and transmit a display instruction to the terminal device 400.

In the above example embodiments, as illustrated in FIG. 1, the terminal device 400 that is a consumer computer can be used to remotely maneuver the work vehicle 100. Remote maneuver may be performed using other devices, instead of the terminal device 400. For example, as shown in FIG. 29, a computer provided in a facility such as a remote monitoring center may be used to perform remote maneuver.

Figure 29:
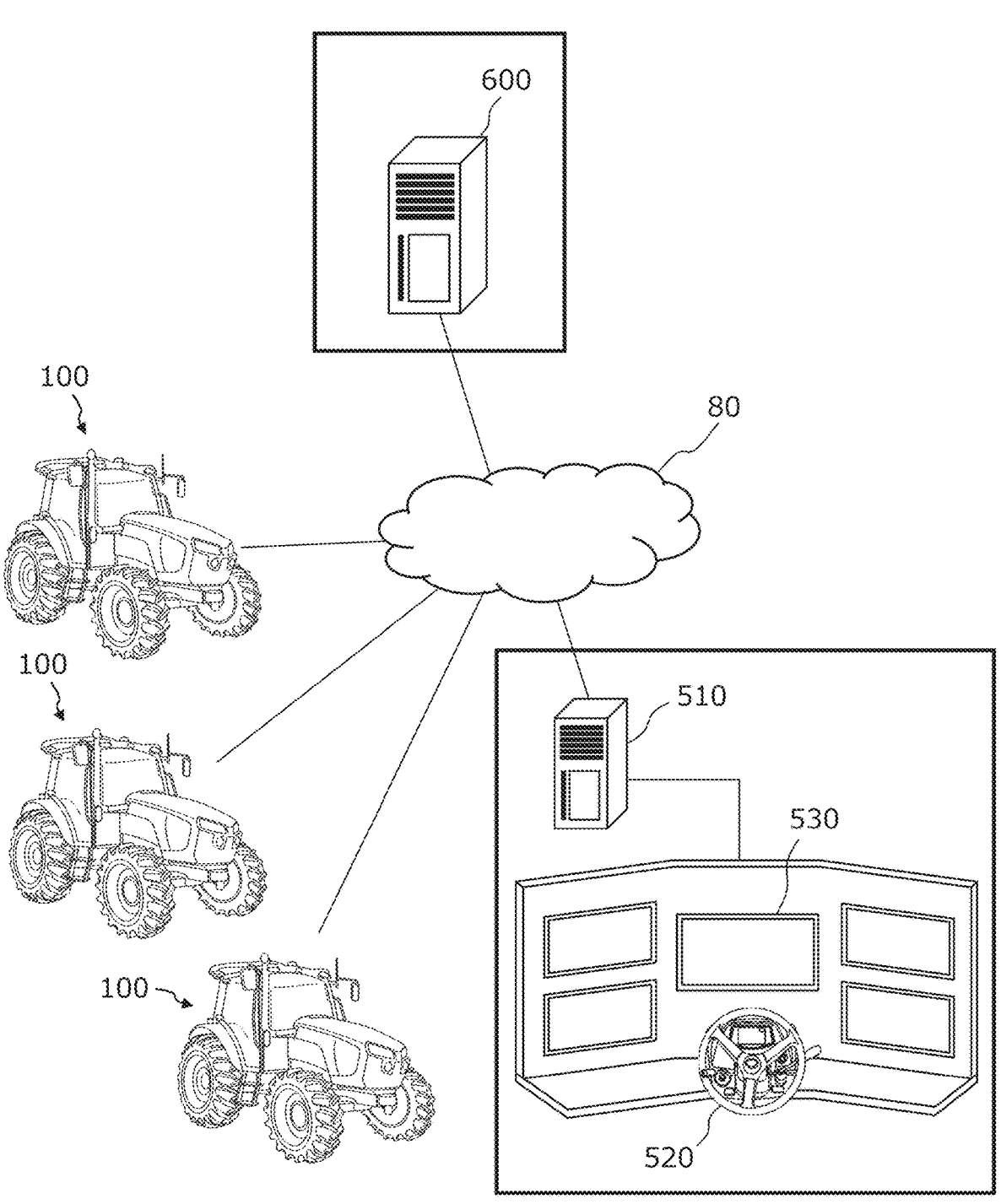
FIG. 29 is a diagram showing another example of an agricultural management system.

An agricultural management system shown in FIG. 29 includes a plurality of work vehicles 100. Although FIG. 29 shows three work vehicles 100, the number of work vehicles 100 is not particularly limited. An agricultural machine (e.g., an agricultural drone) different from the work vehicle 100 may be included in the system. In this example, a remote device 510 provided in a remote monitoring center for an agricultural machine transmits a remote manipulation signal to each work vehicle 100. The remote device 510 is a computer that is connected to a remote maneuver machine 520 and at least one display (display device) 530, which are used by an operator in the remote monitoring center. Although FIG. 29 illustrates five displays 530, the number of displays 530 is not particularly limited. The remote maneuver machine 520 may include various apparatuses for remotely maneuvering the work vehicle 100 (e.g., a steering wheel, an accelerator pedal, left and right brake pedals, a clutch pedal, and various switches or levers). Although the remote maneuver machine 520 shown in FIG. 29 is a device that simulates an operation apparatus used in manual operation of the work vehicle 100, the remote maneuver machine 520 is not limited to such a device. For example, remote maneuver may be performed using a controller such as a joystick. Each display 530 can display, for example, an environment map of a region including a field in which the work vehicles 100 perform agricultural work, and images (e.g., moving images) captured by at least one camera mounted on the work vehicles 100. The operator can recognize a state of surroundings of the work vehicles 100 while viewing images displayed on the displays 530. The operator can remotely maneuver each agricultural machine, such as switching between the self-traveling mode and the remote manipulation mode, depending on a state of surroundings of each work vehicle 100. The operator can remotely maneuver the work vehicle 100 by operating the remote maneuver machine 520 as in the above example in which the terminal device 400 is used.

The configurations and operations of the above example embodiments are merely illustrative. The present disclosure is not limited to the above example embodiments. For example, the above various example embodiments may be combined, as appropriate, to provide other example embodiments.

In the above example embodiments, the processor 660 of the management device 600 is configured or programmed to create a work plan, generate an environment map, and set a global path plan and a permitted area, a forbidden area, or a limited area for the work vehicle 100, and the controller 180 in the work vehicle 100 is configured or programmed to perform local path planning and travel control for the work vehicle 100. Instead of such an example embodiment, a portion of the operations of the management device 600 may be performed by the controller 180, the operation terminal 200, the remote device 510, or the terminal device 400. For example, a global path may be generated by the controller 180, the operation terminal 200, or the terminal device 400.

Although, in the above example embodiments, an agricultural machine performs self-driving, the agricultural machine may not have the function of performing self-driving. The techniques and example embodiments according to the present disclosure are applicable to a wide range of agricultural machines that can be remotely maneuvered.

The travel control system that controls self-traveling and/or remotely-manipulated traveling according to the above example embodiments can be mounted on an agricultural machine lacking such functions, as an add-on. Such a system may be manufactured and sold separately from agricultural machines. A computer program for use in such a system may also be manufactured and sold separately from agricultural machines. The computer program may be stored and provided in a non-transitory computer-readable storage medium, for example. The computer program may also be downloaded and provided via telecommunication lines (e.g., the Internet).

The techniques and example embodiments according to the present disclosure are applicable to travel control systems for agricultural machines that perform self-traveling, such as tractors, harvesters, rice transplanters, vehicles for crop management, vegetable transplanters, mowers, seeders, spreaders, or agricultural robots.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A travel control system for an agricultural machine capable of performing remotely-manipulated traveling, the travel control system comprising:

a storage to store the position of a permitted area in which the remotely-manipulated traveling is permitted conditionally; and a controller operable in a remote manipulation mode in which travel of the agricultural machine is controlled by remote manipulation; wherein in the remote manipulation mode, when a state of the agricultural machine, or a type or state of an implement attached to the agricultural machine does not satisfy a condition under which the remotely-manipulated traveling is permitted in the permitted area, the controller is configured or programmed to disable a remote manipulation to cause the agricultural machine to travel in the permitted area;

the storage is operable to store a position of a forbidden area in which the remotely-manipulated traveling is forbidden; and the controller is configured or programmed to disable a remote manipulation to cause the agricultural machine to enter the forbidden area.

2. The travel control system of claim 1, wherein the controller is configured or programmed to, when disabling the remote manipulation, stop the agricultural machine.

3. The travel control system of claim 1, wherein when, after the disabling of the remote manipulation, the state of the agricultural machine or the type or state of the implement changes to satisfy the condition under which the remotely-manipulated traveling is permitted in the permitted area, the controller is configured or programmed to enable the remote manipulation to cause the agricultural machine to travel in the permitted area.

4. The travel control system of claim 1, wherein
the storage is operable to store positions of a plurality of permitted areas having different conditions under which the remotely-manipulated traveling is permitted; and
in each of the plurality of permitted areas, when the state of the agricultural machine or the type or state of the implement does not satisfy the condition under which the remotely-manipulated traveling is permitted in the permitted area, the controller is configured or programmed to disable the remote manipulation to cause the agricultural machine to travel in the permitted area.

5. The travel control system of claim 4, wherein
the plurality of permitted areas include a first permitted area and a second permitted area adjacent to each other; and
when the state of the agricultural machine or the type or state of the implement satisfies a first condition under which the remotely-manipulated traveling is permitted in the first permitted area, and does not satisfy a second condition under which the remotely-manipulated traveling is permitted in the second permitted area, the controller is configured or programmed to disable a remote manipulation to cause the agricultural machine to enter from the first permitted area into the second permitted area.

6. The travel control system of claim 4, wherein
the plurality of permitted areas include a first permitted area in a field and a second permitted area outside the field; and
when the state of the agricultural machine satisfies a first condition under which the remotely-manipulated traveling is permitted in the field, and does not satisfy a second condition under which the remotely-manipulated traveling is permitted outside the field, the controller is configured or programmed to disable a remote manipulation to cause the agricultural machine to enter from the first permitted area in the field into the second permitted area outside the field.

7. The travel control system of claim 6, wherein
the agricultural machine is a work vehicle having an implement attached thereto; and
when the work vehicle is holding the implement at a height lower than a reference height, or the work vehicle is supplying power to the implement, the controller is configured or programmed to determine that the state of the agricultural machine does not satisfy the second condition, and disable the remote manipulation to cause the agricultural machine to enter from the first permitted area into the second permitted area.

8. The travel control system of claim 6, wherein
the agricultural machine is a work vehicle capable of removing linkage of a left brake and a right brake; and
when the linkage of the left and right brakes is removed by the work vehicle, the controller is configured or programmed to determine that the state of the agricultural machine does not satisfy the second condition, and disable the remote manipulation to cause the agricultural machine to enter from the first permitted area into the second permitted area.

9. The travel control system of claim 4, wherein
the plurality of permitted areas include a first permitted area excluding an exit in a field, and a second permitted area including the exit in the field;

the agricultural machine is a work vehicle capable of switching between two-wheel drive and four-wheel drive; and
when the work vehicle is in the two-wheel drive, the controller is configured or programmed to disable a remote manipulation to cause the work vehicle to enter from the first permitted area into the second permitted area.

10. The travel control system of claim 4, wherein
the plurality of permitted areas include a first permitted area in a field and a second permitted area outside the field;
the storage is operable to store the type of an implement suitable for agricultural work scheduled in the field; and
when the type of the implement attached to the agricultural machine is not suitable for the scheduled agricultural work in the field, the controller is configured or programmed to disable a remote manipulation to cause the agricultural machine to enter from the second permitted area into the first permitted area.

11. The travel control system of claim 4, wherein
the plurality of permitted areas include a third permitted area in which the remotely-manipulated traveling is permitted only when a width of the implement is in a particular range; and
when the width of the implement is not in the particular range, the controller is configured or programmed to disable a remote manipulation to cause the agricultural machine to travel in the third permitted area.

12. The travel control system of claim 11, wherein
the third permitted area is located at an outer periphery of a field;
the width of the implement is variable; and
if, when the width of the implement is increased, an end of the implement will stick out of the field or hit an obstacle, the controller is configured or programmed to disable a remote manipulation of increasing the width of the implement.

13. The travel control system of claim 1, wherein in the remote manipulation mode, the controller is configured or programmed to cause a display of a terminal device used by an operator who performs the remote manipulation to display an image of an area in which the remotely-manipulated traveling is not permitted, the area being determined, depending on the state of the agricultural machine or the type or state of the implement.

14. The travel control system of claim 1, wherein
the plurality of permitted areas include a first permitted area in a field and a second permitted area outside the field; and
when the state of the agricultural machine does not satisfy a first condition under which the remotely-manipulated traveling is permitted in the field, the controller is configured or programmed to disable a remote manipulation to cause the agricultural machine to enter from the second permitted area into the first permitted area.

15. The travel control system of claim 14, wherein
the storage is operable to store a date and time for which the agricultural machine is scheduled to perform agricultural work in the field; and
the controller is configured or programmed to disable a remote manipulation to cause the agricultural machine to enter the first permitted area in the field, except for during the scheduled date and time.

16. The travel control system of claim 1, wherein the controller is operable in a self-traveling mode in which the agricultural machine is caused to perform self-traveling in a self-traveling area;

the controller is configured or programmed to set an outside of the self-traveling area as a forbidden area in which the remotely-manipulated traveling is not permitted; and the controller is configured or programmed to set at least a portion of the self-traveling area as the permitted area.

17. The travel control system of claim 1, wherein the controller is configured or programmed to obtain positional information of the agricultural machine from a positioning device to determine the position of the agricultural machine, and identify an area in which the agricultural machine is located, based on the positional information.

18. An agricultural machine comprising:

the travel control system of claim 1; and a travel device to be controlled by the controller.

19. A travel control method for an agricultural machine capable of performing remotely-manipulated traveling, the method comprising:

obtaining positional information of a permitted area in which the remotely-manipulated traveling is permitted conditionally and a forbidden area in which the remotely-manipulated traveling is forbidden;

obtaining information indicating a state of the agricultural machine;

when, in a remote manipulation mode in which travel of the agricultural machine is controlled by remote manipulation, the state of the agricultural machine, or a type or state of an implement attached to the agricultural machine does not satisfy a condition under which the remotely-manipulated traveling is permitted in the permitted area, disabling a remote manipulation to cause the agricultural machine to travel in the permitted area; and disabling a remote manipulation to cause the agricultural machine to enter the forbidden area.

\* \* \* \* \*